United States Patent [19]
Suzuki et al.

[11] Patent Number: 5,999,278
[45] Date of Patent: Dec. 7, 1999

[54] IMAGE SCANNING DEVICE HAVING A LINEAR IMAGE SENSOR AND A SCANNING SYSTEM

[75] Inventors: Minoru Suzuki; Mikio Horie, both of Tokyo, Japan

[73] Assignee: Asahi Kogaku Kogyo Kabushiki Kaisha, Tokyo, Japan

[21] Appl. No.: 08/878,551

[22] Filed: Jun. 19, 1997

[30] Foreign Application Priority Data

Jun. 20, 1996 [JP] Japan ................... 8-181405

[51] Int. Cl.⁶ ................... H04N 1/56
[52] U.S. Cl. ................... 358/512
[58] Field of Search ................... 358/512, 518, 358/521, 461, 455, 474, 494; 382/274

[56] References Cited

U.S. PATENT DOCUMENTS

| | | | |
|---|---|---|---|
| 5,012,089 | 4/1991 | Kurusu et al. ................... | 250/235 |
| 5,263,698 | 11/1993 | Higuchi et al. ................... | 270/53 |
| 5,541,740 | 7/1996 | Mori ................... | 358/447 |
| 5,581,377 | 12/1996 | Shimizu et al. ................... | 358/450 |

*Primary Examiner*—Thomas D. Lee
*Assistant Examiner*—Stephen Brinich
*Attorney, Agent, or Firm*—Greenblum & Bernstein P.L.C.

[57] ABSTRACT

An image scanning device is provided that includes: an imaging lens; a linear image sensor; a rotating scanning system; and a shading correction system that corrects each pixel image signal for shading in accordance with image height and a magnification of the imaging lens. The magnification of the imaging lens changes according to the rotational position of the scanning system. The image scanning device may further include a color filter and a color correction system for correcting the pixel image signals for changes of wavelength transmittance of the color filter in accordance with image height and the magnification of the imaging lens.

14 Claims, 38 Drawing Sheets

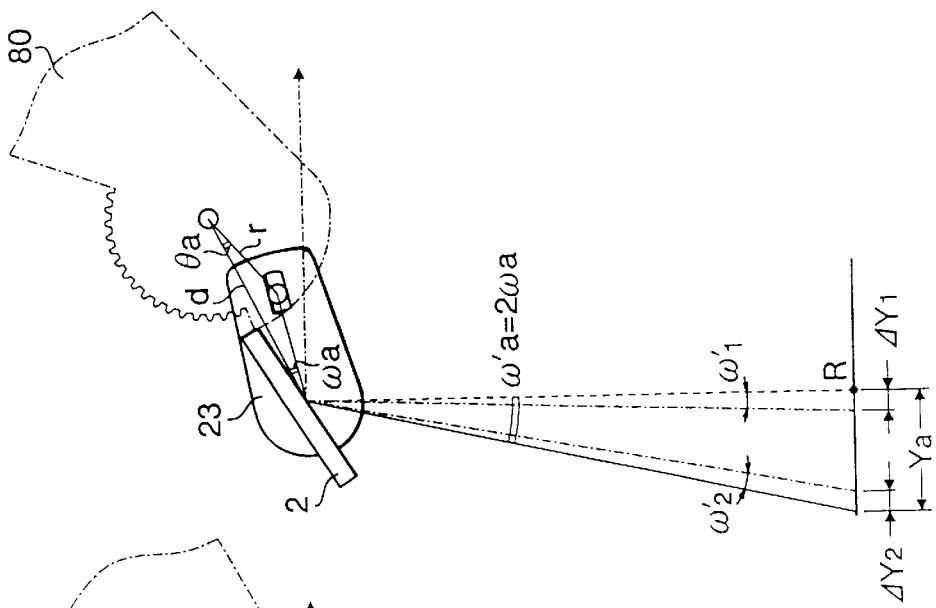
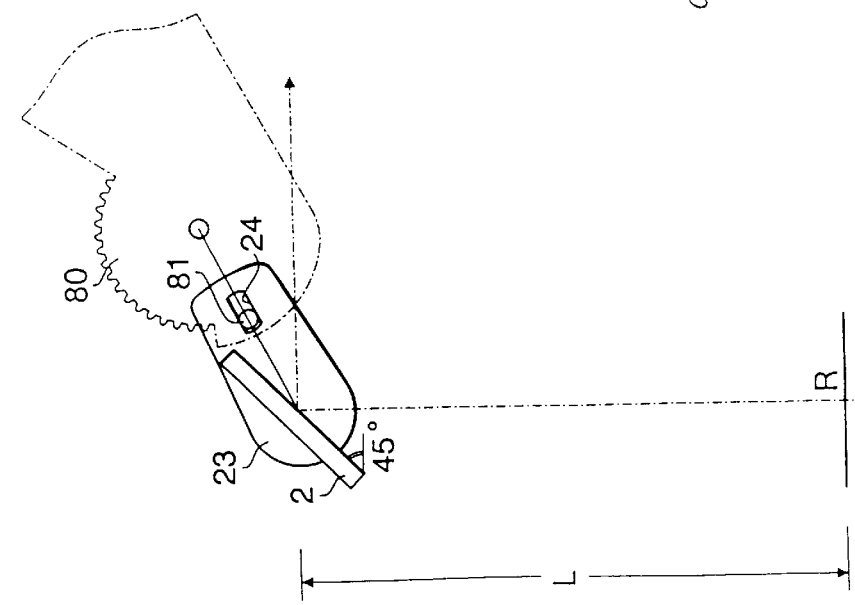
FIG. 11A  FIG. 11B  FIG. 11C

FIG. 18A
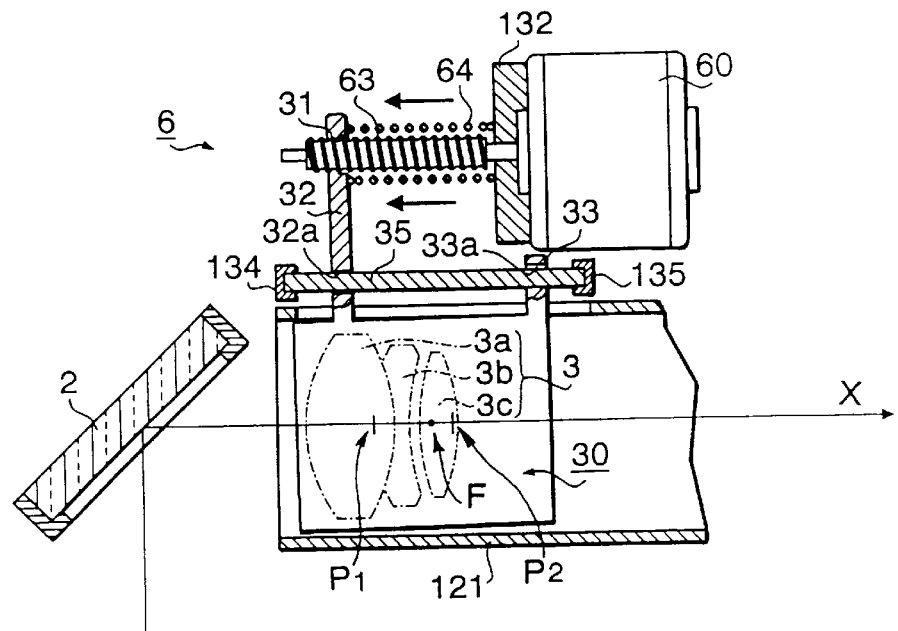
FIG. 18B
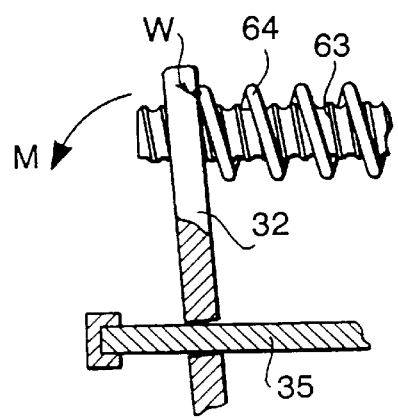
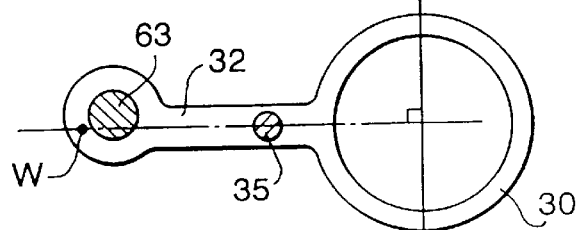
FIG. 18C

IMAGE SCANNING DEVICE HAVING A LINEAR IMAGE SENSOR AND A SCANNING SYSTEM

BACKGROUND OF THE INVENTION

The present invention relates to an image scanning device that is provided with a linear image sensor and a scanning system for capturing a two dimensional image of an object.

A conventional image scanning device of this type includes a linear image sensor, such as a CCD sensor (Charge Coupled Device sensor), which includes a predetermined number of photodiodes (representing pixels) arranged in a line and aligned in a predetermined direction. The image scanning device also includes an imaging lens for forming an image on the image sensor. The image sensor captures an image of one line (a scanning line) of the object and the scanning system operates to scan the object with the linear image sensor such that the linear image sensor captures a plurality of scanning lines until an image of the entire object is captured.

Generally, the scanning system operates such that the image sensor is driven in a direction perpendicular to the alignment direction of the image sensor.

In one conventional image scanning device, the imaging lens is combined with the image sensor as a scanning unit. The scanning system then operates such that either the scanning unit is driven to scan the object ("flatbed scanner") or the object is driven such that it is scanned by the scanning unit ("portable-style scanner"). In the first case, the object is placed, for example, on a transparent plate, and then the scanning unit is moved relative to the transparent plate. Generally, the transparent plate is located closer to the scanning unit, and the range of movement of the scanning unit generally must be as large as the object, such that the image scanning device is large and bulky. In the second case, since the object is moved past the scanning unit, a structure for moving the object must be provided. A well-known example of such a scanner is generally provided with a sheet feeder, and the object is generally a sheet of paper. Also in this case, the object moves past at a relatively close position to the scanning unit.

There is also known another type of scanning system with which an image of an object apart from the scanning system can be captured. In such a scanning system ("camera-style scanner"), an imaging lens is provided that forms an image of the entire object and then the image sensor is moved along a line representing the position of the image formed by the imaging lens. In such a system, the imaging lens is required to have an effective diameter corresponding to a diagonal line of the object. Such an image scanning device may be bulky and the imaging lens may be expensive to manufacture. Further, the system must have enough internal space to allow the movement of the image sensor and the moving mechanism therefor.

Further, when using a linear image sensor in a camera-style image scanning device, an image of the object may be subject to shading near the ends of the linear image sensor, and this shading should be corrected in order to obtain a high quality image. Also, since the object distance may vary within a wide range, the shading correction may vary depending on the object distance.

Still further, in a color camera-style image scanning device that uses color filters to generate a color image, an image of the object for a particular color may be subject to variations in brightness near the ends of the linear image sensor, due to variations in wavelength transmittance of the filters according to incident angle. Thus, color correction should also be performed in order to obtain a high quality image.

SUMMARY OF THE INVENTION

It is therefore an object of the invention to provide an improved image scanning device which is compact and includes the capability of shading correction and color correction.

According to an aspect of the present invention, there is provided, an image scanning device that includes: an imaging lens; an image sensor having linearly aligned image receiving elements, each image receiving element representing an image height and outputting a pixel image signal; a scanning mirror located between an object and the image sensor; a scanning system for rotating the scanning mirror about a scanning axis parallel to the image sensor to scan images onto the image sensor via the imaging lens to form a two-dimensional image of the object; and a shading correction system for correcting each pixel image signal for shading in accordance with image height and a magnification of the imaging lens.

In a particular case, the image scanning device may further include a quantization system for determining a maximum brightness pixel image signal and for quantizing the pixel image signals based on the maximum brightness pixel image signal.

In this case, the image scanning device may further include at least one color filter and a color correction system for correcting the pixel image signals for changes of wavelength transmittance of the color filter in accordance with image height.

Further, the color correction system may also correct the pixel image signals for changes of wavelength transmittance of the color filter in accordance with the magnification of the imaging lens.

In particular, the imaging lens has a predetermined focal length, and the magnification of the imaging lens may be determined in accordance with the focal length, a distance of the object, and a rotational position of the scanning mirror.

In another particular case, the image scanning device may further include: at least one color filter located between the imaging lens and the image sensor, light rays from the imaging lens contacting the at least one color filter at a plurality of incidence angles; and a color correction system for correcting the pixel image signals for changes of wavelength transmittance of the color filter in accordance with the plurality of incidence angles.

In the above particular cases, the at least one color filter may include red, blue and green color filters and the color correction system may operate such that, when the red filter is used, the color correction system reduces the pixel image signals as image height increases. Further, when the blue filter is used, the color correction system increases the pixel image signals as image height increases, and, when the green filter is used, the color correction system makes no changes to the pixel image signals.

Also, in the above particular cases, the color correction system may first divide the pixel image signals into a plurality of groups in accordance with image height and identical correction is performed for the pixel image signals within each group.

According to another aspect of the present invention, there is provided, an image scanning device that includes: an imaging lens; an image sensor having linearly aligned image receiving elements, each image receiving element representing an image height and outputting a pixel image signal; a scanning mirror located between an object and the image sensor; a scanning system for rotating the scanning mirror about a scanning axis parallel to the image sensor to scan images onto the image sensor via the imaging lens to form a two-dimensional image of the object; at least one color filter; and a color correction system for correcting the pixel image signals for changes of wavelength transmittance of the color filter in accordance with image height.

In a particular case, the color correction system may further correct the pixel image signals for changes of wavelength transmittance of the color filter in accordance with the magnification of the imaging lens.

In this case, since the imaging lens has a predetermined focal length, the magnification of the imaging lens is determined in accordance with the predetermined focal length, a distance of the object, and a rotational position of the scanning mirror.

Also, in this case, the at least one color filter may include red, blue and green color filters, and the color correction system may operate such that, when the red filter is used, the color correction system reduces the pixel image signals as image height increases. Further, when the blue filter is used, the color correction system increases the pixel image signals as image height increases and, when the green filter is used, the color correction system makes no changes to the pixel image signals.

BRIEF DESCRIPTION OF THE DRAWINGS

FIG. 11A shows a relationship between a driving member and a scanning mirror when the scanning mirror is at a reference scanning position;

FIG. 11B shows a relationship between the driving member and the scanning mirror when the scanning mirror is scanning at the finder side of the reference scanning position;

FIG. 11C shows the relationship between the driving member and the scanning mirror when the scanning mirror is scanning at the lens side of the reference scanning position;

FIG. 18A is a plan view showing a lens driving mechanism;

FIG. 18B is a plan view showing detail of the lens driving mechanism;

FIG. 18C is a side cross-section view showing detail of the lens driving mechanism;

DETAILED DESCRIPTION OF THE PREFERRED EMBODIMENTS

An image scanning device according to an embodiment of the present invention, in particular, a scanner, is described with reference to FIGS. 1 to 41.

General

Figure 1:
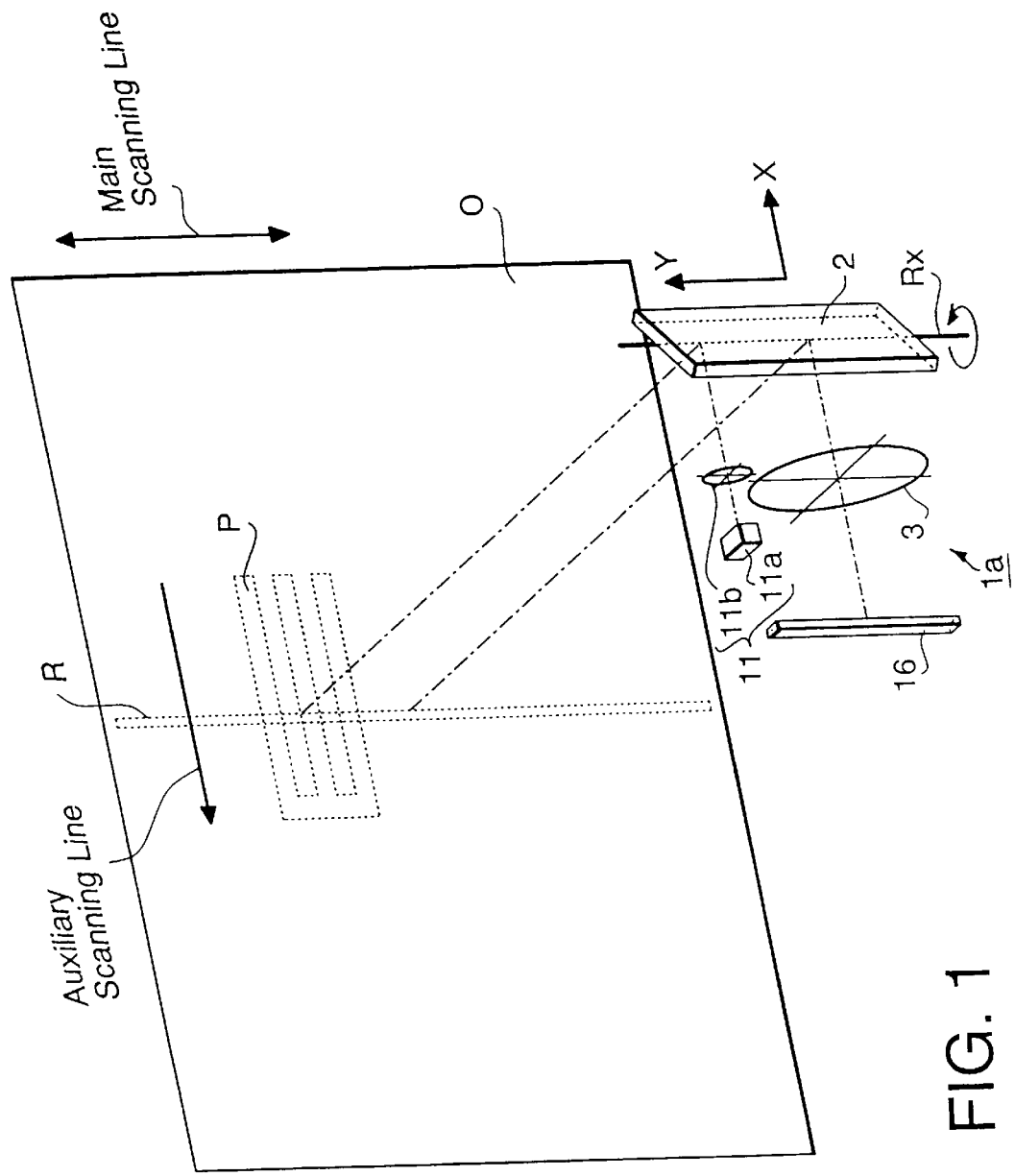
FIG. 1 shows an optical system of a scanner according to an embodiment of the present invention.

The scanner 1 (shown in FIG. 2) is a camera-type scanner that creates a digital image of an object O placed at a distance therefrom. The digital image is captured by scanning the object O using a line-type CCD image sensor 16. FIG. 1 is a schematic view showing an imaging optical system 1*a* or the scanner 1. The imaging optical system 1*a* includes a scanning mirror 2, an imaging lens 3, and the image sensor 16. When capturing an image, the scanning mirror 2 reflects light rays received from the object O toward the imaging lens 3 and the imaging lens 3 focuses the light rays to form an image on the image sensor 16. The image sensor 16 receives the image, representing one scanning line for the object O. Then, by rotating the scanning mirror 2 about a rotation axis Rx (parallel to the length of the image sensor 16 i.e., longitudinal direction of the image receiving elements), the scanning line is moved perpendicular to the image sensor 16 in order to scan the whole object O. Thus, the image sensor 16 reads a two-dimensional image of the object O one scanning line at a time. In the embodiment, as a particular example, the image sensor 16 includes 2088 pixels arranged along the length thereof (i.e., in a longitudinal direction) and a scanning range of the scanning mirror 2 includes 2870 scanning lines. Thus, the resolution of the scanner 1 is almost 6,000,000 pixels (2088×2870). This resolution corresponds to 300 dpi (dots per inch) for an object having maximum dimensions of approximately 240 mm×180 mm positioned at 23 cm from the scanner 1.

In the following description, a coordinate system is defined in which an X-axis is a direction of the optical axis of the imaging lens 3 and a Y-axis is a direction parallel to the image sensor 16. Further, the Y-axis direction, i.e., the direction of the image sensor 16, is referred to as a "main scanning direction" and the X-axis direction, i.e., the direction in which the scanning line moves during scanning, is referred to as an "auxiliary scanning direction". Still further, when the scanning mirror 2 is positioned such that the optical axis of the imaging lens 3 is deflected at a right angle, the position of the scanning mirror 2 and of the scanning line are referred to as a "reference scanning position". Other scanning positions within the scanning range along the Y-axis direction are generally defined in relation to the reference scanning position. Still further, the term "magnification" is used in relation to the effect of the imaging lens 3 on the size of an image of the object O formed on the image sensor 16 even though, in this embodiment, the optical system is a reduction optical system, and the "magnification" is less than one.

FIG. 1 also shows a projecting mechanism 11 for projecting a contrast pattern P onto the object O. The projecting mechanism 11 and the contrast pattern P are described in more detail below.

In the present embodiment, the scanning mirror 2 is rotated to scan the object O. This arrangement has an advantage in that light is incident on the imaging lens 3 at the same angle irrespective of the scanning position along the Y-axis direction. Thus, the required size of the imaging lens 3 is relatively small. This may be compared with a scanner in which the image sensor 16 is rotated to scan an object, in which case the direction of light incident on the imaging lens changes according to the scanning position and the required size of the imaging lens is relatively large due to the problem of vignetting.

However, when the scanning mirror 2 is rotated to scan the object O, the conjugate surface of the image sensor 16 is a cylindrical surface, which causes the following three problems: (1) if the imaging lens 3 is focused for the reference scanning position, the periphery of the scanning range will be out of focus; (2) a magnification of a scanning line at the reference scanning position will be larger than that of a scanning line at the periphery of the scanning range; (3) the interval between scanning lines in the vicinity of the reference scanning position will be smaller than the interval between scanning lines near the periphery of the scanning range.

Detailed descriptions of the solutions to the above problems are provided below, however, generally, in order to solve problem (1), the imaging lens is moved along the optical axis thereof according to the scanning position, in order to solve problem (2), the scanner compensates for the difference in magnification by adjusting the digital image data at the periphery of the scanning range, and in order to solve problem (3), the rotational speed of the scanning mirror 2 is arranged to vary depending on scanning position so that the interval between scanning lines is substantially constant.

Physical Structure

Figure 2:
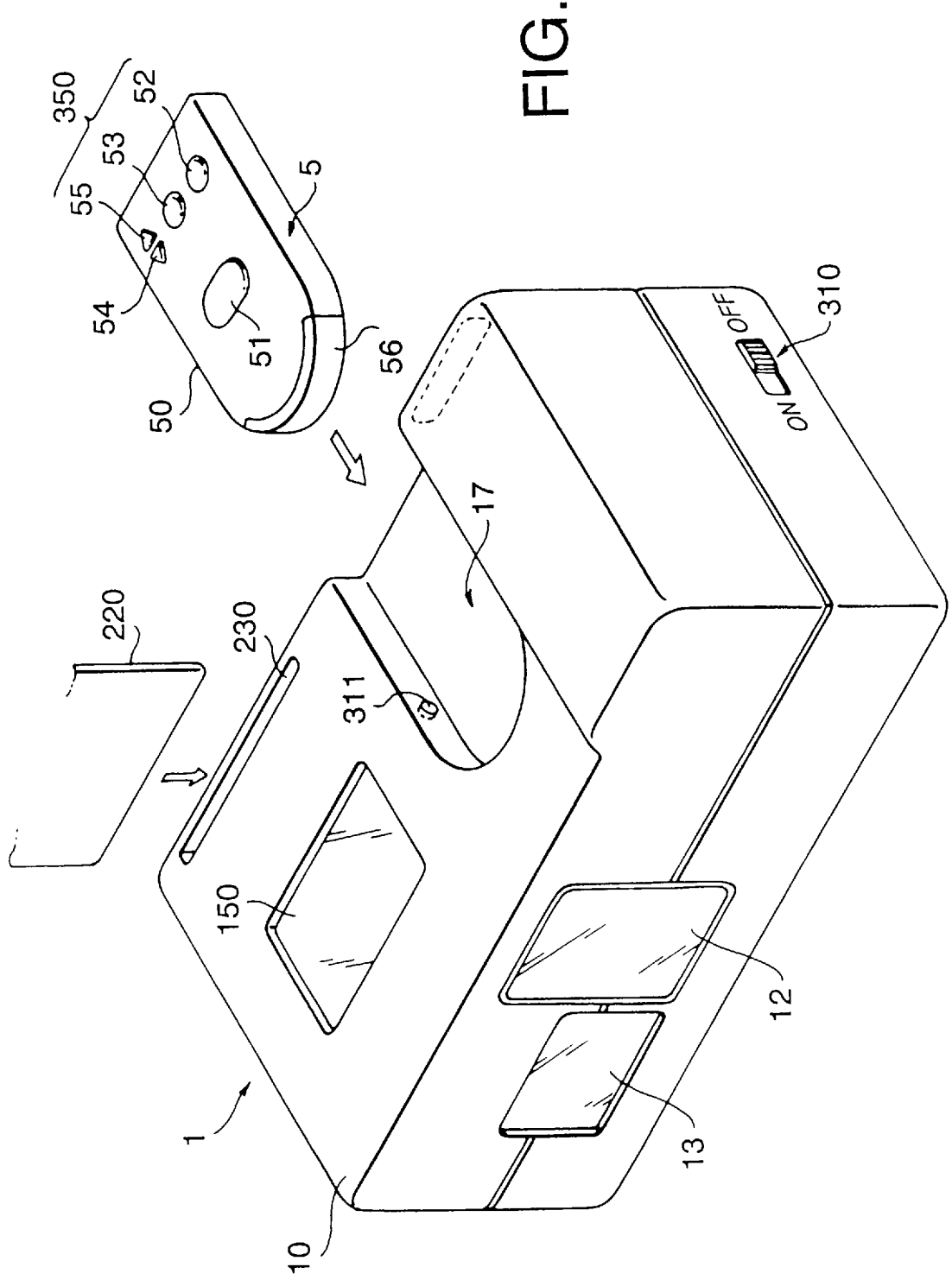
FIG. 2 is an external perspective view of the scanner of the embodiment.
Figure 3:
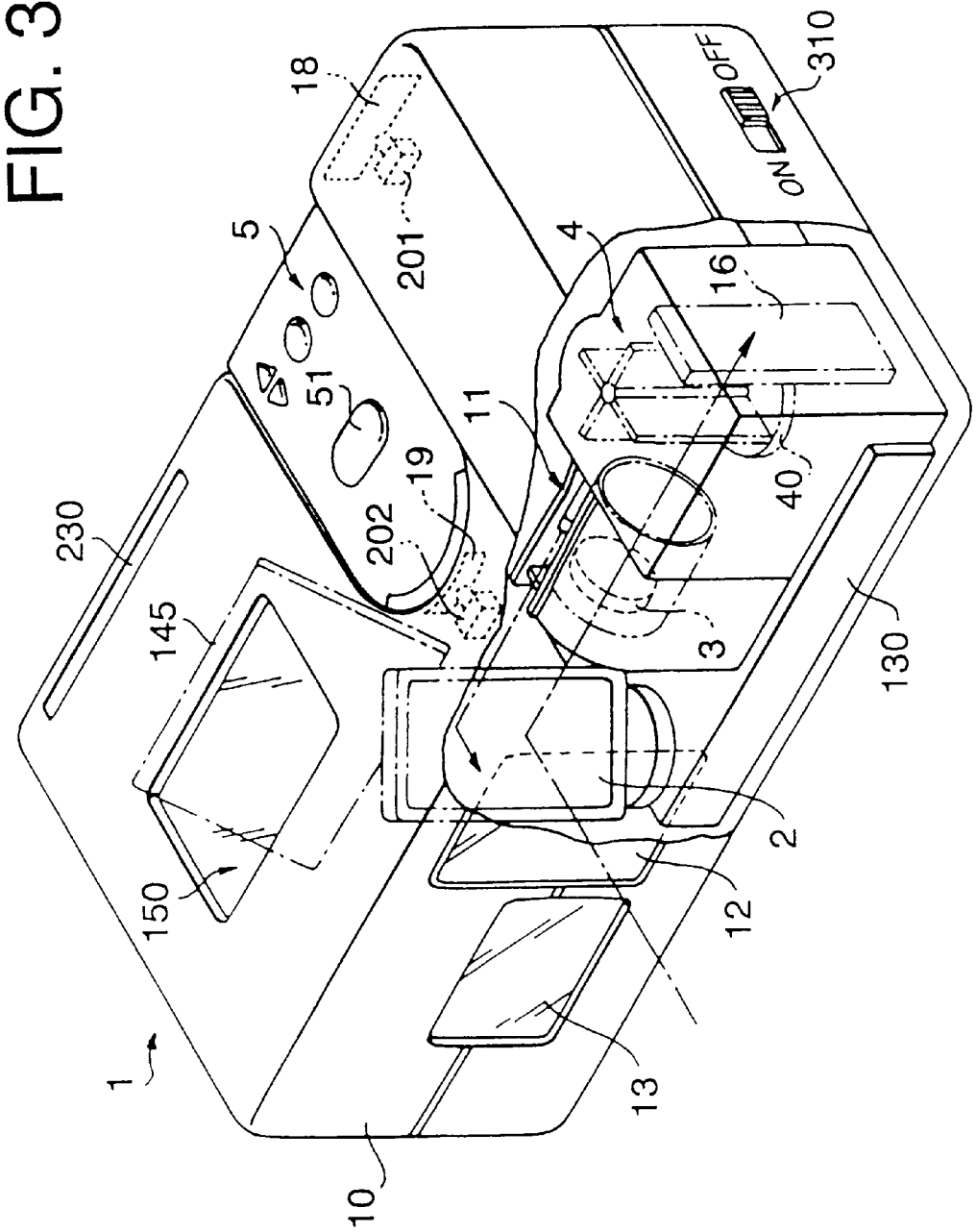
FIG. 3 is a broken-away perspective view of the scanner of FIG. 2 showing an arrangement of some internal elements.

FIGS. 2 and 3 are perspective views showing exemplary external and internal structures of the scanner 1, respectively. As shown in FIG. 2, the scanner 1 has a box-shaped body 10. As shown in FIG. 3, the image sensor 16, the scanning mirror 2, and the imaging mirror 3 are provided in the body 10. Also as shown in FIG. 3, the body 10 includes a window 12 for providing light from the object O to the scanning mirror 2 and a finder window 13 for providing light from the object O to a finder system 150. The body 10 is further provided with a main switch 310 for turning the scanner ON and OFF.

In this embodiment, the image sensor 16 is a monochrome type CCD image sensor 16. As such, a color filter unit 4 is provided between the scanning mirror 2 and the image sensor 16 to allow a color image to be captured. However, a color CCD may also be used, in which case, the color filter unit 4 would not be required.

Figure 4:
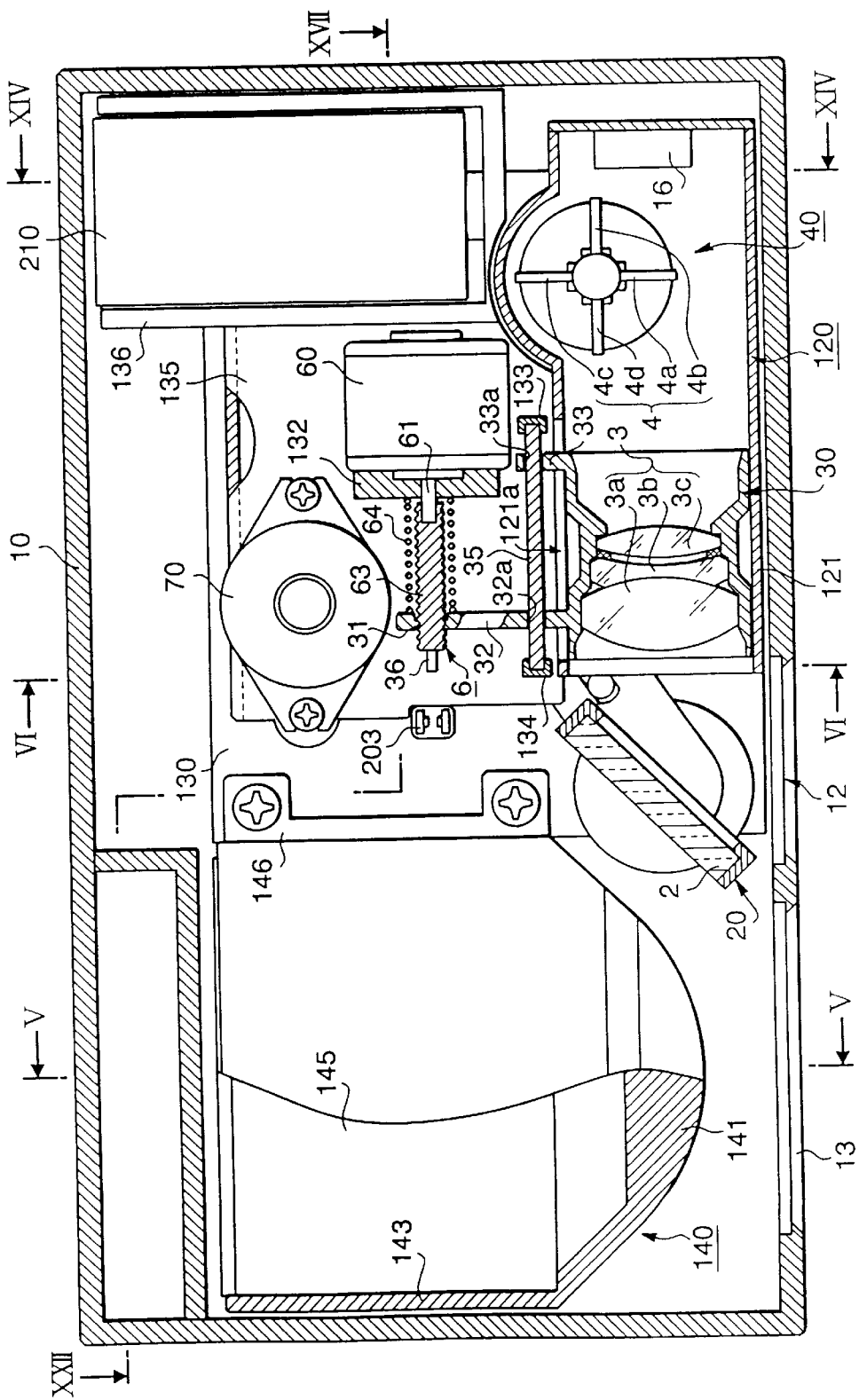
FIG. 4 is a plan view of the camera type scanner of the embodiment showing internal construction.

FIG. 4 is a plan view showing the internal structure of the scanner 1 in more detail.

The scanning mirror 2 is held by a mirror holder 20. The mirror holder 20 is rotated by a scanning motor 70 (described below) clockwise and counterclockwise in the view of FIG. 4.

A housing 120, provided adjacent to the scanning mirror 2, houses the imaging lens 3 and the image sensor 16. The housing 120 includes a cylindrical portion 121 that houses a lens barrel 30. The lens barrel 30 supports the imaging lens 3 which includes three lenses 3*a*, 3*b* and 3*c*. The lens barrel 30 is moved toward and away from the scanning mirror 2 by a lens driving motor 60.

The color filter unit 4 includes, for example, a colorless filter 4*a*, a red filter 4*b*, a green filter 4*c*, and a blue filter 4*d* and is provided between the imaging lens 3 and the image sensor 16. The color filter unit 4 further includes a filter holder 40 which supports the filters 4*a*, 4*b*, 4*c* and 4*d* at, for example, 90 degree angles with respect to each other. The filter holder 40 is rotated about an axis parallel to the image sensor 16 by the scanning motor 70 in order to change the filter positioned in the optical path from the scanning mirror 2 to the image sensor 16.

The mirror holder 2 and the housing 120 are supported on a support frame 130 provided at the bottom of the body 10. The support frame 130 also supports a motor frame 135 for supporting the scanning motor 70 and lens driving motor 60 and a battery frame 136 for supporting a battery 210.

Finder

Figure 5:
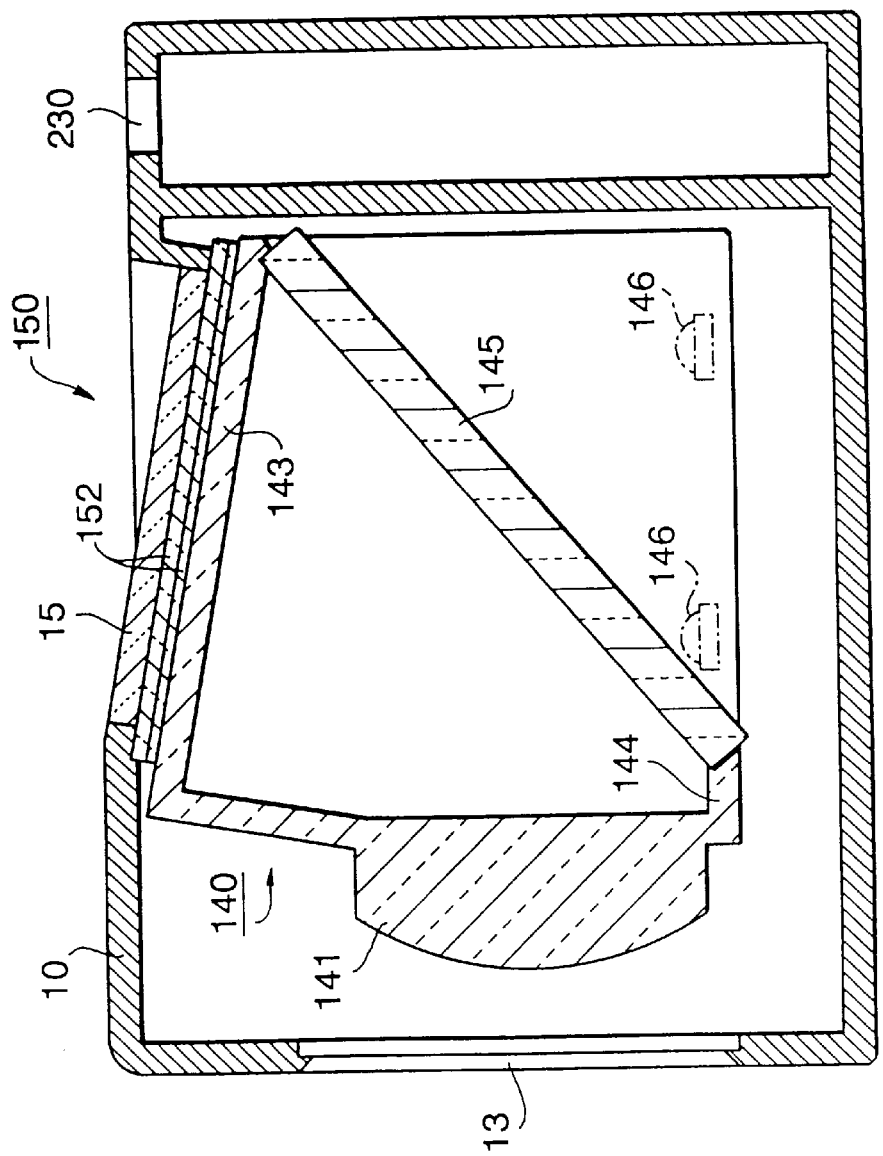
FIG. 5 is a sectional view along a line V—V in FIG. 4.

FIG. 5 is a sectional view taken along a line V—V of FIG. 4. As shown in FIGS. 5, the finder system 150 includes a finder window 13, an object lens 141, a finder mirror 145, a fresnel lens 143, a cover glass 15 and an LCD (Liquid Crystal Display) panel 152. The object lens 141 and the fresnel lens 143 are unitarily formed as a lens unit 140, which is fixed on the support frame 130 via bolts at two fixing portions 146.

Remote Control Device

The scanner 1 is operated by a remote control device 5 (shown in FIG. 2). The remote control device 5 is provided with operation buttons 350 that include a start button 51, an up/tele button 54, a down/wide button 55, a mode button 53, and a stop/delete button 52. The remote control device 5 is storable in a recess 17 provided at the top of the body 10.

The remote control device 5 has a signal sending portion 56 for emitting infrared rays representing predetermined commands. The body 10 is provided with a first LED sensor 201 for receiving infrared rays from the remote control device 5. The body 10 also includes a second LED sensor 202 provided in the recess 17 and located so as to confront the signal sending portion 56 when the remote control device 5 is stored in the recess 17. Since the second LED sensor 202 will be much closer to the remote control device 5 during use, the second LED sensor 202 may have lower sensitivity compared with the first LED sensor 201.

In order to detect if the remote control device 5 is detached from or mounted on the body 10, the body 10 is provided with a remote control sensor 311 at the recess 17. The remote control sensor 311 emits an ON signal when the remote control device 5 is detected. The scanner 1 is so arranged that the first LED sensor 201 receives signals from the remote control device 5 when the remote control device 5 is detached from the body 10 and the second LED sensor 202 receives signals from the remote control device 5 when the remote control device 5 is mounted at the recess 17.

Scanning Mirror Driving Mechanism

Figure 6:
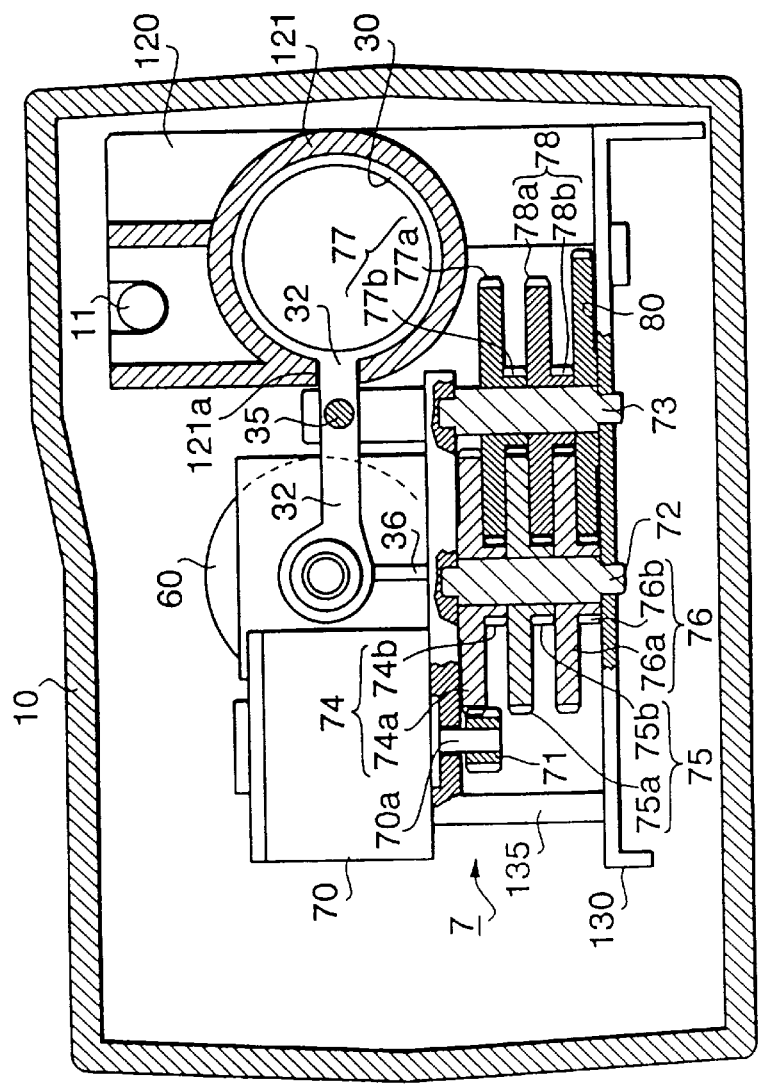
FIG. 6 is a sectional view along a line VI—VI in FIG. 4.

FIG. 6 is a sectional view of the scanner 1 taken along line VI—VI of FIG. 4. The scanning motor 70 for rotating the scanning mirror 2 is provided on the motor frame 135. A driving mechanism 7 includes five reduction gear pairs 74, 77, 75, 78, and 76 are provided to reduce the output rotation speed of the scanning motor 70. Each gear pair 74, 77, 75, 78, and 76 includes unitarily formed large gears 74a, 77a, 75a, 78a, and 76a, and small gears 74b, 77b, 75b, 78b, and 76b.

The first, third and fifth gear pairs 74, 75 and 76 are rotatably supported by a first shaft 72 and the second and fourth gear pairs 77 and 78 are rotatably supported by a second shaft 73. The first shaft 72 and the second shaft 73 are supported between the motor frame 135 and the support frame 130. A drive gear 71 fixed to an output shaft 70a of the scanning motor 70 engages the large gear 74a of the first gear pair 74. The small gear 74b of the first gear pair 74 engages the large gear 77a of the second gear pair 77. The small gear 77b of the second gear pair 77 engages the large gear 75a of the third gear pair 75. The small gear 75b of the third gear pair 75 engages the large gear 78a of the fourth gear pair 78. The small gear 78b of the fourth gear pair 78 engages the large gear 76a of the fifth gear pair 76. As constructed above, the rotational speed of the scanning motor 70 is reduced with a reduction ratio of 1/1000 to drive a driving member 80 that is engaged with the small sear 76b of the fifth gear pair 76.

Figure 7:
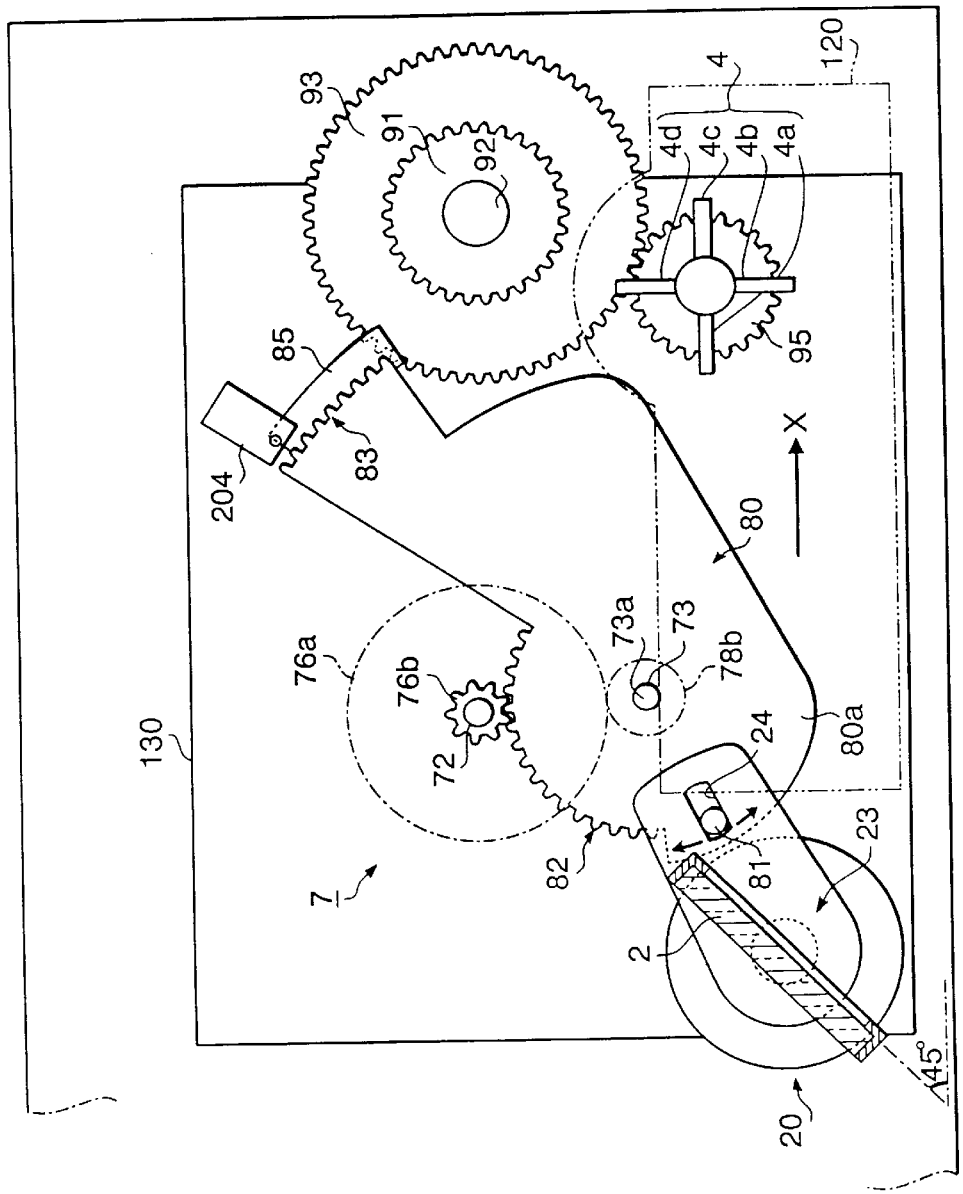
FIG. 7 is a schematic view showing a driving mechanism.

FIG. 7 is a plan view showing further elements of the driving mechanism 7. The driving member 80 includes a first sector gear 82 and a second sector gear 83 and is rotatably supported by the second shaft 73. The first sector gear 82 has a sector angle of approximately 120° with respect to the center of the second shaft 73 and the second sector gear 83 has a sector angle of approximately 20°.

The first sector gear 82 engages the small gear 76b of the fifth gear pair 76 such that the driving member 80 is rotated by the rotation of the fifth gear pair 76. The driving member 80 further includes a driving pin 81 positioned on an extended line of the pitch circle of the sector gear 82.

Figure 8:
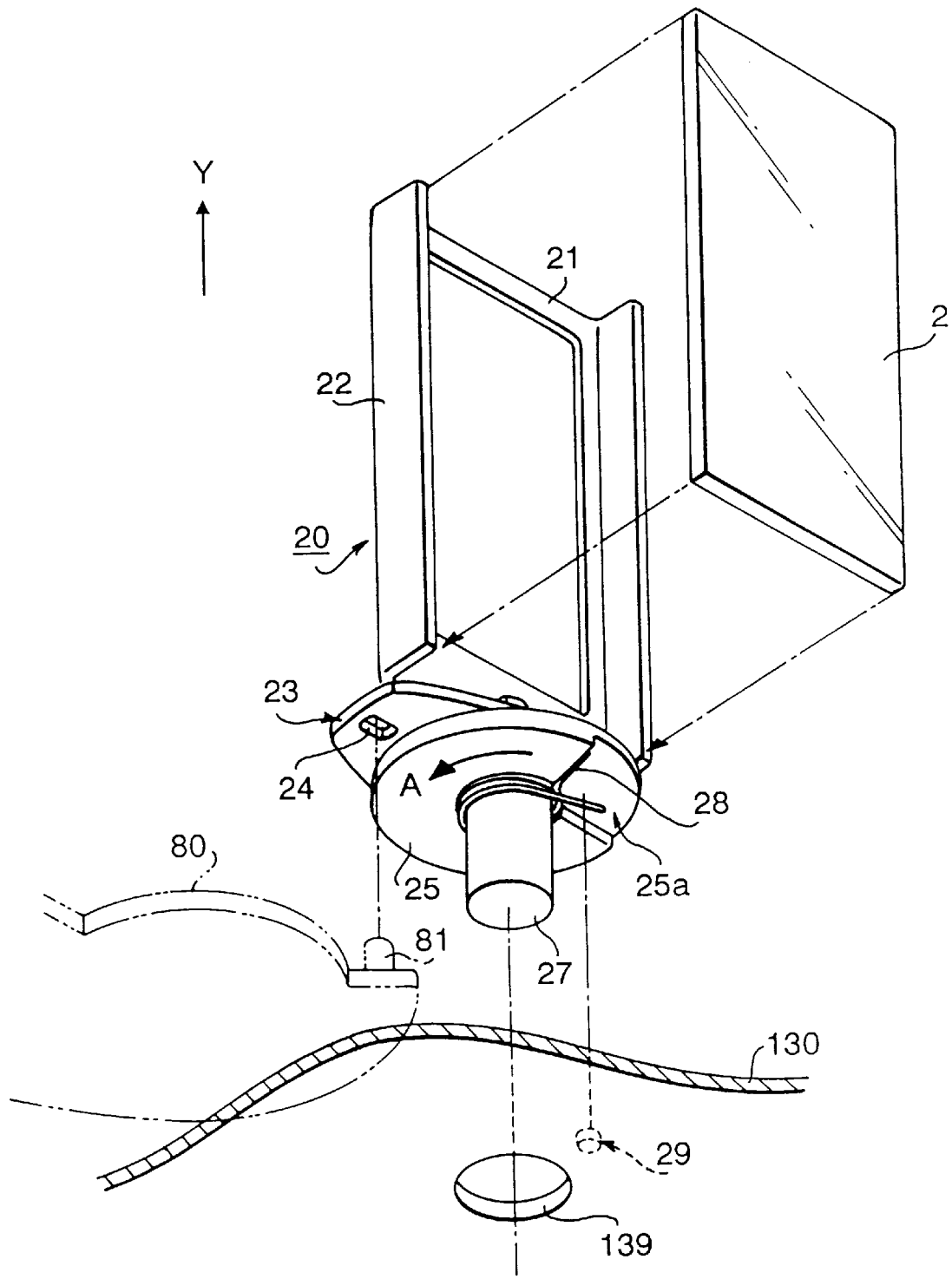
FIG. 8 is a perspective view of a mirror holding portion.

The driving pin 81 engages with the mirror holder 20 to drive the scanning mirror 2. FIG. 8 is a perspective view showing the engagement of the driving pin 81 with the mirror holder 20. The mirror holder 20 includes a mirror frame 21 for mounting the scanning mirror 2. The mirror frame 21 is supported on a disk 25, which is unitarily formed with a rotating shaft 27. The rotating shaft 27 fits into a hole 139 formed on the support frame 130, such that the rotating shaft 27 (and therefore, the mirror holder 20) can rotate. The rotation axis coincides with a center axis of the surface of the scanning mirror 2 when the scanning mirror 2 is mounted on the mirror frame 21.

The disk 25 is further provided with a driven member 23 that is driven by the driving member 80. The driven member 23 is provided with a groove 24, extending in the direction of the radius of the disk 25, with which the driving pin 81 (of the driving member 80) engages.

Since there may be clearance between the driving pin 81 and the groove 24, in order to reduce backlash, a torsion spring 28 is provided around the shaft 27 to bias the mirror holder 20 in a predetermined direction. The disk 25 has a sector-shaped cut-away portion 25a in which both ends of the coil spring 28 extend. One end of the coil spring 28 abuts a side of the shaped cut-away portion 25a and the other end of the coil spring 28 abuts a boss 29 provided to the support frame 130. In this embodiment, the mirror holder 2 is biased in the direction shown by an arrow A in FIG. 8.

Figure 9:
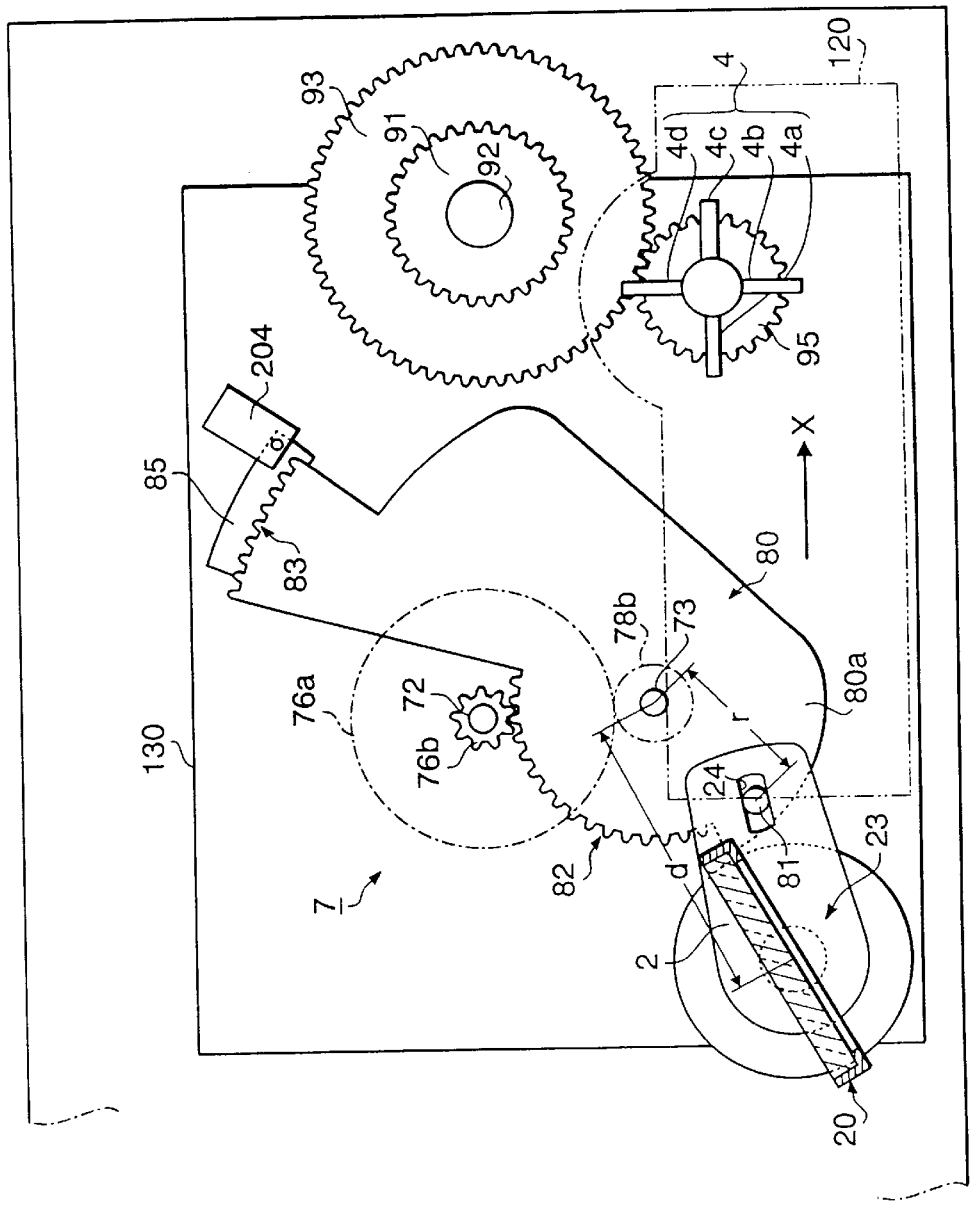
FIG. 9 is a schematic view showing the driving mechanism of FIG. 7 in a different state.
Figure 10:
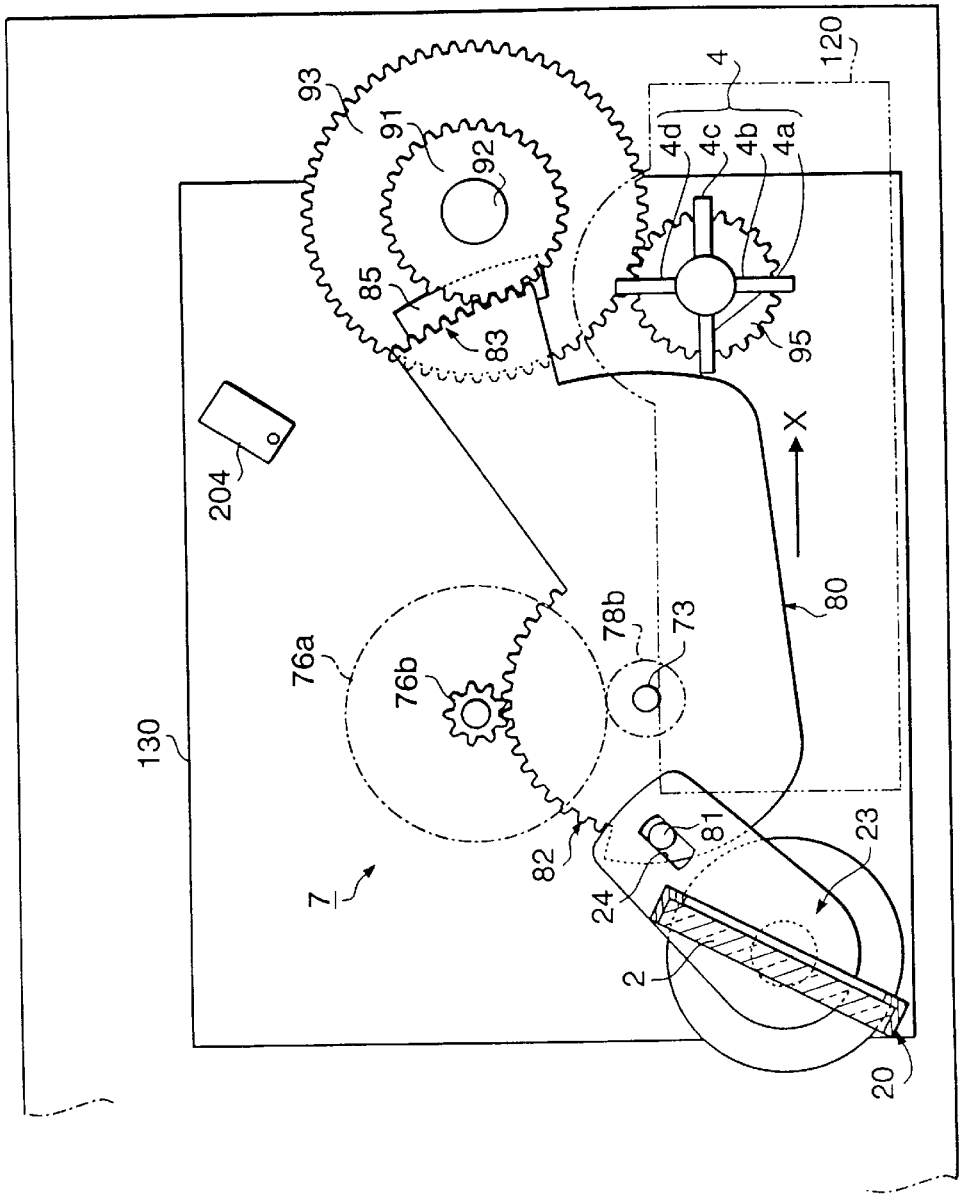
FIG. 10 is a schematic view showing the driving mechanism of FIG. 7 in another different state.

FIGS. 9 and 10 illustrate the rotation of the driving member 80 from the state shown in FIG. 7 in a counter-clockwise and a clockwise direction, respectively.

As described briefly above, in this embodiment, the scanning speed of the scanning mirror 2 is adjusted depending on the scanning position. A detailed explanation is now provided.

FIGS. 11A, 11B, and 11C are schematic views of the driving member 80 and the scanning mirror 2. FIG. 11A shows a state in which the rotation center of the driving member 80, the center of the driving pin 81, and the rotation center of the mirror holder 20 are all arranged in a straight line (the same state as that shown in FIG. 7). In this state, the angle of the scanning mirror 2 with respect to the X-axis is 45° and the scanning mirror 2 is at the reference scanning position R (FIG. 1).

As shown in FIGS. 11B and 11C, as the driving member 80 rotates in either the counterclockwise or the clockwise direction, a distance between the center of the driving pin 81 and the rotation center of the mirror holder 20 increases.

The distance between the rotation centers of the driving member 80 and the scanning mirror 2 is referred to as "d". The distance between the rotation center of the driving member 80 and the center of the driving pin 81 is referred to as "r". A rotational angle of the driving member 60 (with respect to the state of FIG. 11A) is referred to as θ and a rotational angle of the scanning mirror 2 (also with respect to the state of FIG. 11A) is referred to as ω. In particular, FIGS. 11B and 11C illustrate a state in which the scanning mirror 2 is scanning near the periphery of the scanning range, i.e. at predetermined angles θa, ωa, and ω'a.

The equation (1) describes a relationship between the rotational angles θ and ω of the driving member 80 and the scanning mirror 2.

$$\tan \omega = r \sin\theta / (d - r\cos\theta) \tag{1}$$

Further, equation (2) describes a relationship between the rotational angle ω of the scanning mirror 2 and a scanning angle ω' of the scanning line.

$$\omega'=2\omega \tag{2}$$

A scanning position Y of the scanning line on the surface of the object O with respect to the reference scanning position R is determined by Y=Ltanω', where L is a distance between the object O and the scanning mirror 2 at the reference scanning position. Referring to FIG. 11B, if we consider the driving of the scanning motor 70 between two scanning lines, the driving member 80 moves through an angle Δθ (not shown) and, when scanning near the reference scanning position R, the scanning line moves through a scanning angle ω'1 producing an interval between scanning lines ΔY1. Similarly, when scanning at the periphery of the scanning range, a movement of the driving member 80 through an angle Δθ results in a scanning angle ω'2 and an interval between scanning lines ΔY2. The intervals between scanning lines ΔY1 and ΔY2 are:

$$\Delta Y1 = L \tan(\omega'1-0) \tag{3}$$

$$\Delta Y2 = L \tan \omega'a - L \tan(\omega'a-\omega'2) \tag{4}$$

where ω'a is a scanning angle of the scanning line from the reference scanning position to the periphery of the scanning range.

In order to ensure that ΔY1=ΔY2 (that is, that the intervals at the center and the periphery of the scanning range are the same), the following equation (5) must be satisfied:

$$\tan \omega'1 = \tan \omega'a - \tan(\omega'a-\omega'2) \tag{5}$$

Substituting the equations (1) and (2) gives the equation (6):

$$\tan(\omega'\tfrac{1}{2}) = r\sin\Delta\theta/(d - r\cos\Delta\theta) \tag{6}$$

By selecting a maximum scanning angle ω'a and a desired interval between scanning lines as the scanning angle at the periphery ω'2, ω'1 can be determined from equation (5). Then, based on a desired drive amount of the drive member 80, the appropriate ratio of d/r to maintain a substantially constant interval between scanning lines can be determined prom equation (6).

As a numerical example, we assume ω'a=27.2° (based on a desired scannable object size, as described below) and ω'2=0.6°. Thus, ω'1 is determined to be 0.82° by equation (5). Further, assuming a drive amount Δθ=1°, the ratio d/r is determined to be 2.2 from the equation (6). Thus, by arranging the driving member 80 and the mirror holder 20 so as to satisfy d/r=2.2, the intervals of the scanning lines at the center and at the periphery of the scanning range will be substantially the same.

Figure 12:
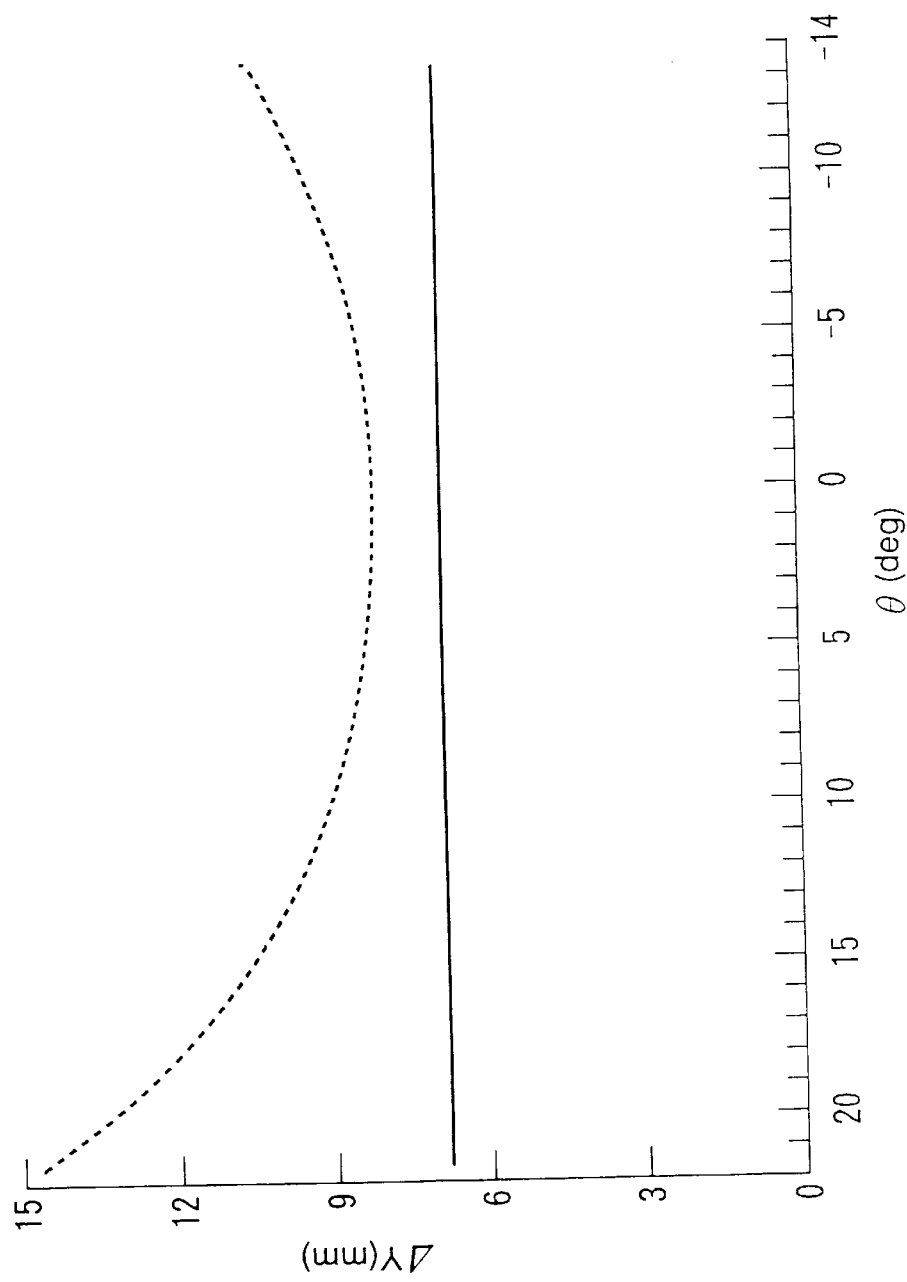
FIG. 12 is a graph of scanning line interval versus rotational angle.

The above described drive method may be compared to a situation in which the scanning mirror 2 is driven in 1° steps about the axis thereof. FIG. 12 shows the change in the interval between scanning lines when the driving member 80 is rotated by 1° steps (solid line), i.e., using the method of the embodiment as compared to the case in which the scanning mirror 2 is directly rotated by 1° steps (dotted line).

In the embodiment, the interval between scanning lines is in a range from 6.86 mm up to 6.76 mm. On the other hand, in the case in which the scanning mirror 2 is directly rotated, the interval between scanning lines ranges between 14.68 mm to 8.13 mm. Thus, in the embodiment, the intervals of the scanning lines at the center and at the periphery of the object surface are substantially the same.

The setting of the scanning range of the scanning mirror 2 is now described.

Figure 13:
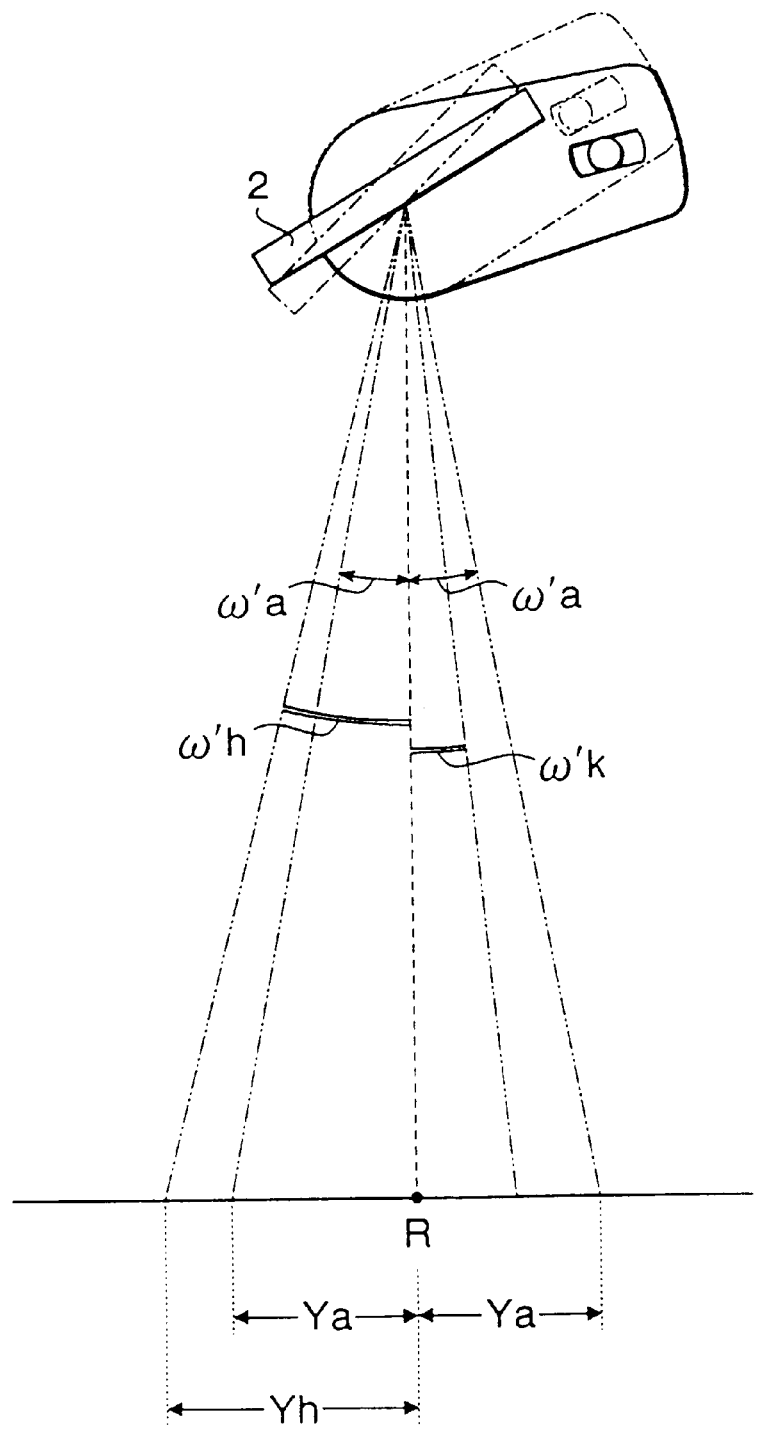
FIG. 13 is a schematic view showing a relationship between a scanning angle and a scanning range.

FIG. 13 is a schematic view showing the relationship between a maximum scanning angle ω'a and a position of the scanning line Ya. The relationship is defined as follows:

$$\omega'a = \arctan(Ya/L) \tag{7}$$

where L is a distance between the object O and the scanning mirror 2.

In the embodiment, as a numerical example, a desired object size in the auxiliary scanning direction is Ya=120 mm at L=23 cm. Thus, from equation (7) the scanning angle ω'a of the scanning line is set to 27.2°. From equation (2), the rotating angle ωa of the scanning mirror 2 is determined to be 13.6°. Further, by solving equation (1) for θ, equation (8) is obtained;

$$\theta = \arcsin(d/r \sin\omega) - \omega \tag{8}$$

and the rotating angle θa of the driving member 80 is determined to be 17.5°.

However, since in the scanner 1, the finder system 150 and the imaging optical system 1a are separate, the scanner 1 is further arranged to compensate for parallax by adjusting a start of scanning position Xs based on a distance to the object O, as described below. Thus, although the scanning range will remain constant, the operating range of the scanning mirror 2 must be set somewhat larger to allow for this compensation. In particular, the scanning range is shifted within the operating range such that the scanning range at the finder side of the reference scanning position ("finder-side scanning range") is larger than the scanning range at the lens side of the reference scanning position ("lens-side scanning range"). In the embodiment, when L=23 cm (i.e., the minimum object distance) the finder-side scanning range must be set to 147 mm in order to compensate for parallax. Thus, using the following equation (9):

$$\omega'h = \arctan(Yh/L) \tag{9}$$

the finder-side scanning angle ω'h at the is 32.3° and further, since the scanning range is constant at 54.4°, the lens-side scanning angle ω'k in the is set to −22.1°. Accordingly, the rotating angle of the driving member 80 in the finder side θh is 21.5° and the rotating angle of the driving member 80 in the lens side θk is −14.5°.

The setting of the scanning mirror 2 at the mirror home position is now described. Since the rotation of the driving member 80 is controlled by the scanning motor 70 using "open-loop" control, it is necessary to set the scanning mirror 2 at the home position accurately. As shown in FIG. 7, a positioning sensor 204 is provided to allow the scanning mirror 2 to be accurately positioned at the home position. The positioning sensor 204 is, for example, a transmission type photo sensor which is arranged to turn OFF whew interrupted by a shutter plate 85 provided to the driving member 80.

The positioning sensor 204 is positioned such that when the angle of the scanning mirror 2 with respect to the X-axis is significantly less than 45° as shown in FIG. 9 (i.e., the finder-side scanning range), the shutter plate 85 interrupts the positioning sensor 204 and the positioning sensor 204 is OFF. Also, when the angle of the scanning mirror 2 with respect to the X-axis is substantially greater than 45° (the lens-side scanning range) as shown in FIG. 10, the shutter plate 85 moves out from the positioning sensor 204, which turns the positioning sensor 204 ON. In particular, the positioning sensor 204 is positioned such that the transition between the OFF to ON states occurs just prior to the reference scanning position as the scanning mirror 2 moves from the finder side of the reference scanning position.

As explained in more detail below, the scanning mirror 2 is set accurately at the home position by counting a predetermined center correction pulse Xc after the positioning sensor 204 turns ON. In manufacturing the scanner 1, the center correction pulse Xc is determined for each scanner 1 depending on particular characteristics such as the assembled position of the positioning sensor 204.

Color Filter Unit

Figure 14:
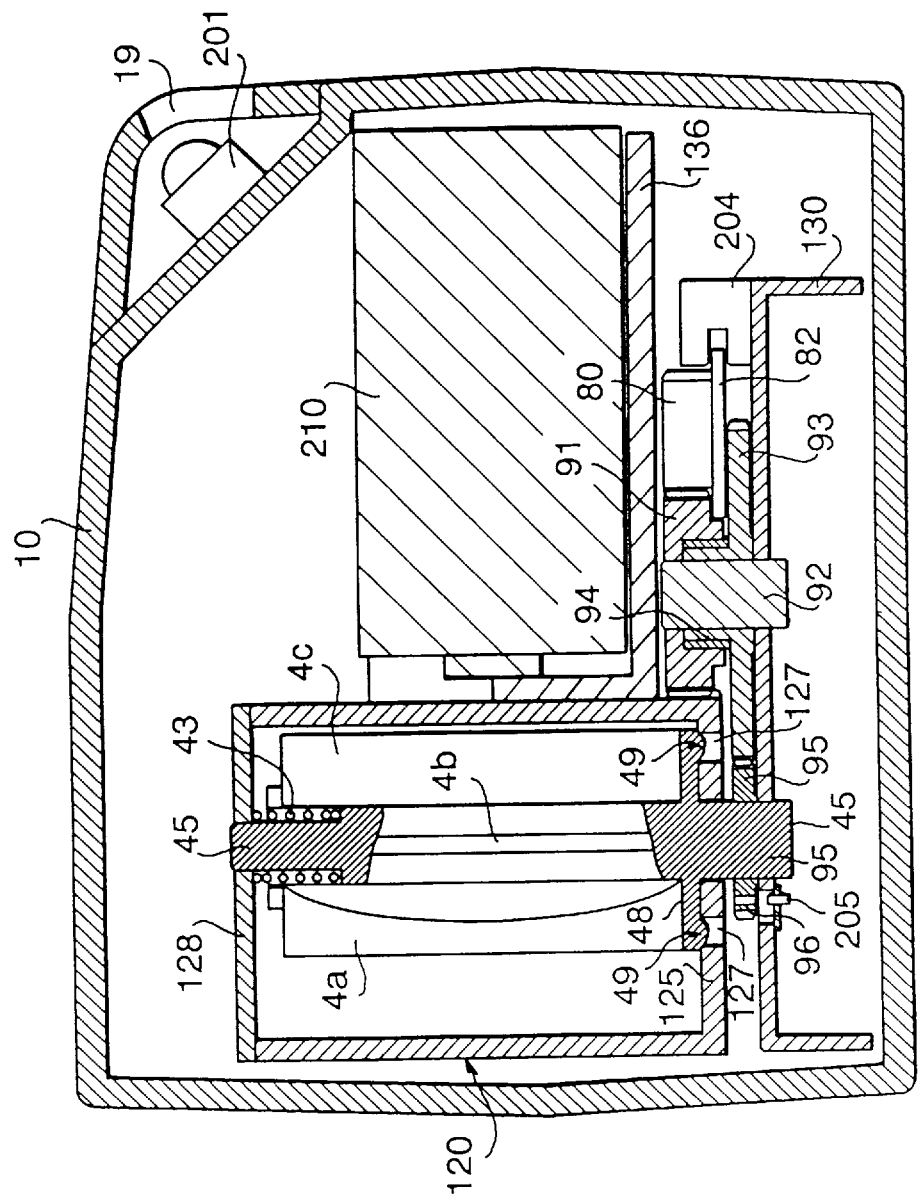
FIG. 14 is a sectional view along a line XIV—XIV in FIG. 4.

As shown in FIG. 10, when the driving member 80 rotates to the end of the rotating area for scanning, the second sector gear 83 of the driving member 80 moves into engagement with a transmission gear 91 for switching the color filter unit 4. FIG. 14 is a sectional view of the scanner 1 taken along a line XIV—XIV of FIG. 4. As shown in FIG. 14, the transmission gear 91 is rotatably supported by a shaft 92 provided on the support frame 130. A filter drive gear 93 is also rotatably supported by the shaft 92, with a one-way clutch 94 interposed between the filter drive gear 93 and the transmission gear 91. The one-way clutch 94 transmits only the counterclockwise rotation (in the view of FIG. 10) of the transmission gear 91 to the filter drive gear 93.

Figure 15:
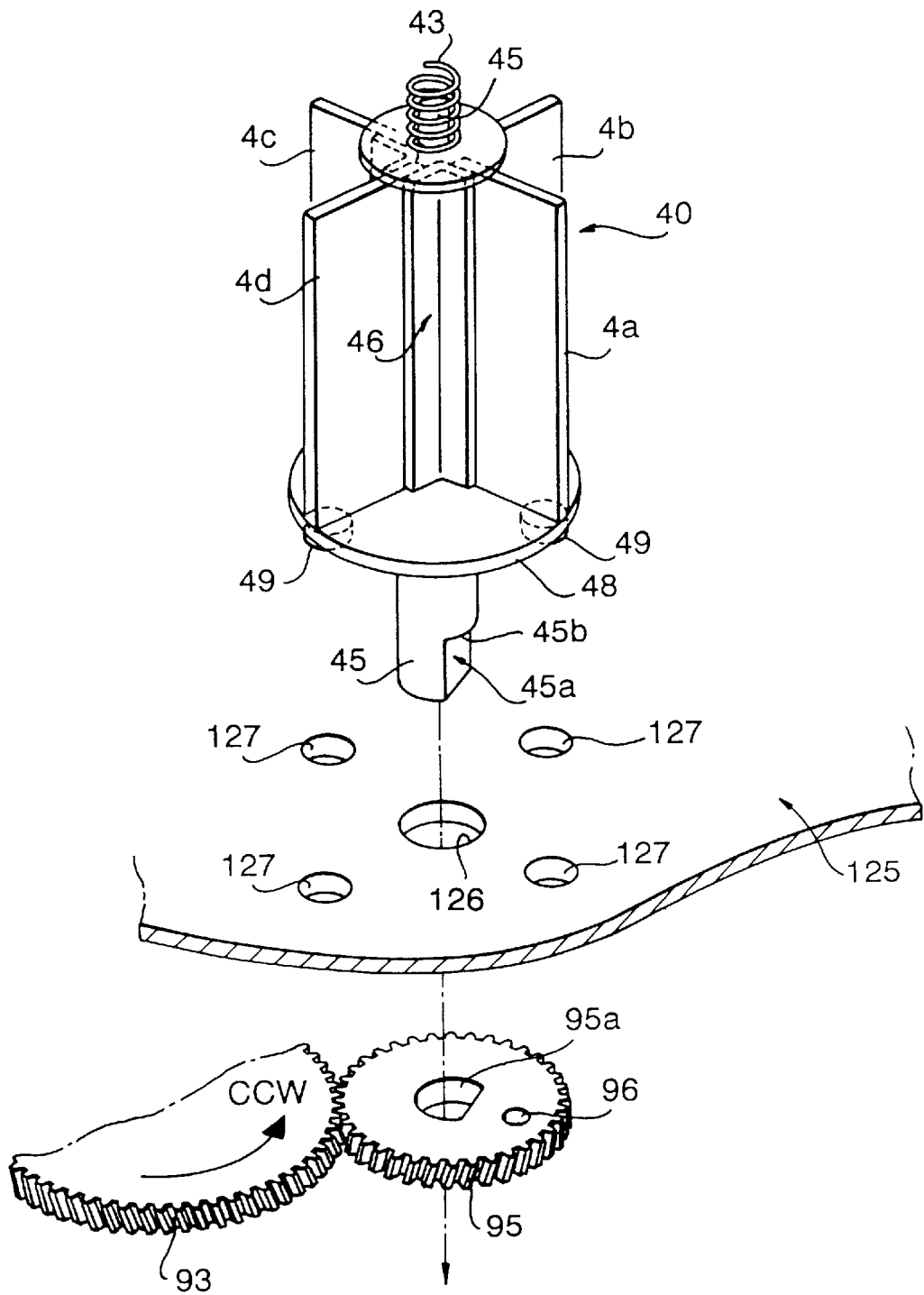
FIG. 15 is a perspective view of a color filter unit.

FIG. 15 shows the color filter unit. The filter holder 40 includes a rotation shaft 45, a disk 48 provided to the rotation shaft 45, and a filter holding portion 46 provided on the disk 48. The filter holding portion 46 holds the four color filters 4a, 4b, 4c and 4d radially and equally displaced at 90° apart on the disk 48. The rotation shaft 45 is provided with a filter gear 95 to be driven by the filter drive gear 93.

The rotation shaft 45 is provided with a cut-away portion 45a. The upper end 45b of the cut-away portion 45a is perpendicular to the axis of the rotation shaft 45. The filter gear 95 is provided with a D-shaped hole 95a. The filter gear 95 is fixed to the bottom end of the shaft 45 in such a manner that the shaft 45 is inserted into the D-shaped hole 95a so that the upper end of the filter gear 95 abuts the upper end 45b of the cut-away portion 45a. Thus, since the filter driving gear 93 and the filter gear 95 are helical gears, the filter gear 95 transmits a thrust force (particularly an upward force) to the shaft 45 as well as a rotational force.

Four projections 49 are provided on the bottom surface of the disk 48, which protrude downward and are equally spaced at 90° around the disk 48. A bottom plate 125 of the housing 120 (FIG. 12) has a center hole 126 to which the shaft 45 fits and four holes 127 to which the four projections 49 fit, respectively.

The upper end of the shaft 45 is provided with a coil spring 43 which abuts a top plate 128 of the housing 120 (FIG. 14) and biases the filter holder 40 downward.

As constructed above, when the filter driving gear 93 rotates counterclockwise (as shown by a CCW arrow), the filter gear 95 rotates clockwise. Since the filter driving gear 93 and the filter gear 95 are helical gears, the engagement of the filter driving gear 93 and the filter gear 95 causes the filter gear 95 to move upward such that the rotation shaft 45 also moves upward and the projections 49 are released from the holes 127, which makes the rotation shaft 45 rotatable in the center hole 126. Thus, the filter holder 40 rotates clockwise. The driving member 80 is arranged such that the filter gear 95 rotates 90° and stops and, thus, after rotating 90°, the thrust force stops and the filter holder 40 moves down by the force of the spring 43, so that the projections 49 engage the holes 127 again. Thus, the filter holder 40 is held in place until the next rotation of the filter driving gear 93. Further, since the projections 49 are rounded, even if the rotation is not exactly 90°, the projections 49 will slide into the holes 127 to position the filter holder 40 precisely.

Figure 16:
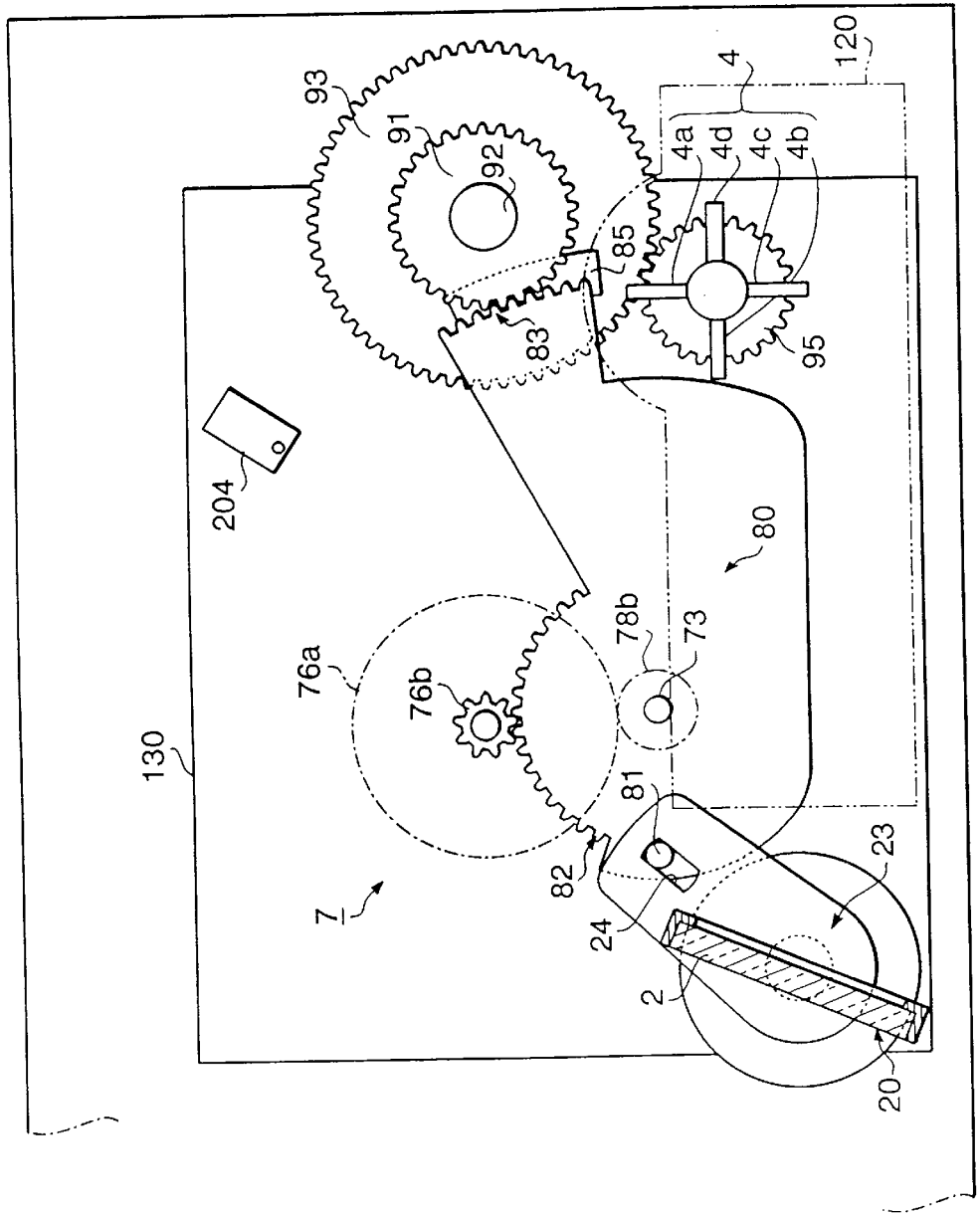
FIG. 16 is a schematic view showing the driving mechanism of FIG. 7 in yet another different state.

The switching of the color filter unit 4 is performed by the rotation of the driving member 80 between states shown in FIGS. 10 and 16. As an example, in the case where the colorless filter 4a is positioned in the light path between the scanning mirror 2 and the image sensor 16, the rotation of the filter holder 40 moves the colorless filter 4a to be replaced by the red filter 4b.

As constructed above, the switching of the color filter 4 and the scanning of the scanning mirror 2 are performed by the same drive source (the scanning motor 70). Further, the structure for stopping the rotation of the filter holder 40 is simple and inexpensive.

In order to allow the identification of which of the filters 4a, 4b, 4c, and 4d is positioned in the light path between the scanning mirror 2 and the image sensor 16, a filter sensor 205 (e.g., a reflection type photo-sensor) is provided to the support frame 130 (FIG. 14), which detects a hole 96 formed on the filter gear 95. When the hole 96 is on the filter sensor 205, the colorless filter 4a is positioned between the scanning mirror 2 and the image sensor 16.

Lens Driving Mechanism

As shown in FIG. 6, the cylindrical portion 121 of the housing 120 is provided with a groove 121a extending along the X-axis direction. The lens barrel 30 has a first arm 32 extending through the groove 121a to the exterior of the cylindrical portion 121. As shown in FIG. 4, the lens barrel 30 is further provided with a second arm 33, which is parallel to the first arm 32. A guide bar 35 is provided to guide the lens barrel 30 along the X-axis. The guide bar 35 is inserted through through-holes 32a and 33a provided to the first and second arms 32 and 33, respectively.

Figure 17:
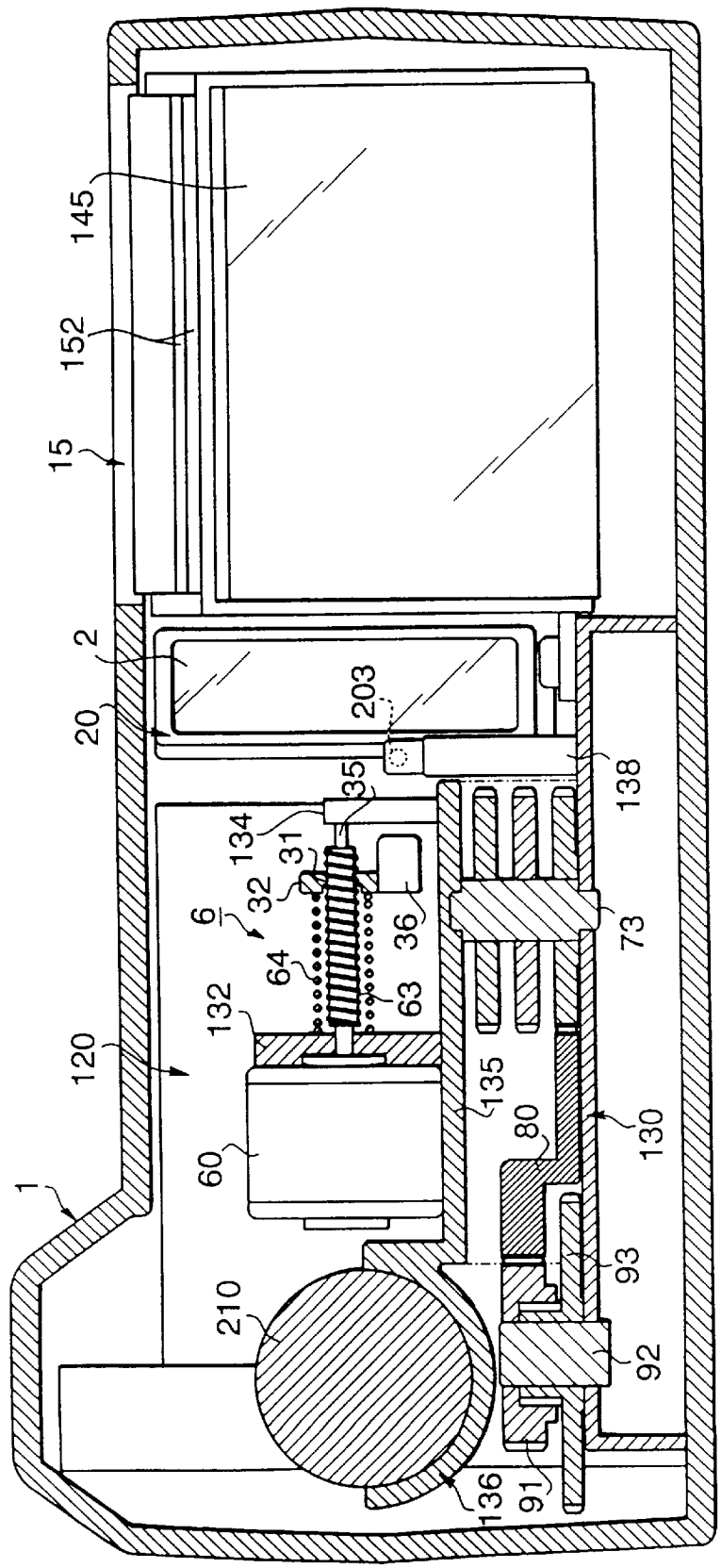
FIG. 17 is a sectional view along a line XVII—XVII in FIG. 4.

FIG. 17 is a sectional view of the scanner 1 taken along a line XVII—XVII of FIG. 4. An upright frame 132 is provided on the motor frame 135, to which a lens driving motor 60 (which is a stepping motor) is secured. A screw gear 63 is fixed to an output shaft 61 of the lens driving motor 60. The screw gear 63 engages a nut 31 provided to the first arm 32. Thus, the rotation of the driving motor 60 moves the lens barrel 30 along the X-axis. In this embodiment, the stroke of the lens barrel 30 is 6 mm.

FIG. 18A is a plan view of the lens barrel 30 and the lens barrel driving mechanism. In order t6 smoothly move the lens barrel 30, a predetermined clearance is provided between the lens barrel 30 and the cylindrical portion 121 and also between the guide bar 35 and the hole 32a and between the guide bar 35 and the hole 33a.

However, in order to ensure that the lens barrel 30 does not incline in the Y-axis direction (i.e., the main-scanning direction), in the embodiment, the lens barrel 30 is biased to incline in the X-axis direction. Thus, a coil spring 64 is provided around the screw 63, between the upright frame 132 and the first arm 32. As shown in more detail in FIG. 18B, the coil spring 64 is attached to the first arm 32 at a fixing point W. As shown in FIG. 18C, the fixing point W and the center of the guide bar 35 are aligned in a plane parallel to the X-axis and perpendicular to the Y-axis, such that the coil spring 64 biases the first arm 32 to rotate in the plane of the X-axis about the Y-axis, as shown by the arrow M of FIG. 18B. In particular, as shown in FIG. 18A, a fulcrum F of the rotation of the lens barrel 30 is located between principal points P1 and P2 of the imaging lens 3.

As constructed above, since the lens barrel 30 is biased to incline in the X-axis direction, inclination of the lens barrel 30 in the main scanning direction (Y-axis direction) is prevented. Further, backlash of the motor 60, screw 63 and the nut 64 can be eliminated.

In order to set the lens barrel 30 at the lens home position, the first arm is provided with a shutter plate 36. When the lens barrel 30 moves to the closest position to the scarring mirror 2, the shutter plate 36 is detected by a lens sensor 203 provided on a pillar 138 provided on the support frame 130. The closest position of the lens barrel 30 with respect to the scanning mirror 2 is defined as a lens home position of the lens barrel.

Projecting Unit

As shown in FIG. 1, the projecting unit 11 is provided adjacent to the imaging lens 3 for projecting the contrast pattern P onto the object O in order to give additional contrast to the object O. As explained in briefly above, and in more detail below, in order to focus the object O, the scanner 1 is arranged to detect the contrast of the object O using data from the image sensor 16. Since the projecting unit 11 provides additional contrast to the object O, it is even possible to focus on an white object O or on an object O on a white surface or any other surface having little contrast.

The projecting unit 11 includes an LED 11a which emits light having a striped contrast pattern P and a lens 11b which projects the striped contrast pattern P onto the object O via the scanning mirror 2. As shown in FIGS. 3 and 6, the projecting unit 11 is provided in the housing 120 and projects the contrast pattern P through the window 12 via the scanning mirror 2.

Electrical Structure

Figure 19:
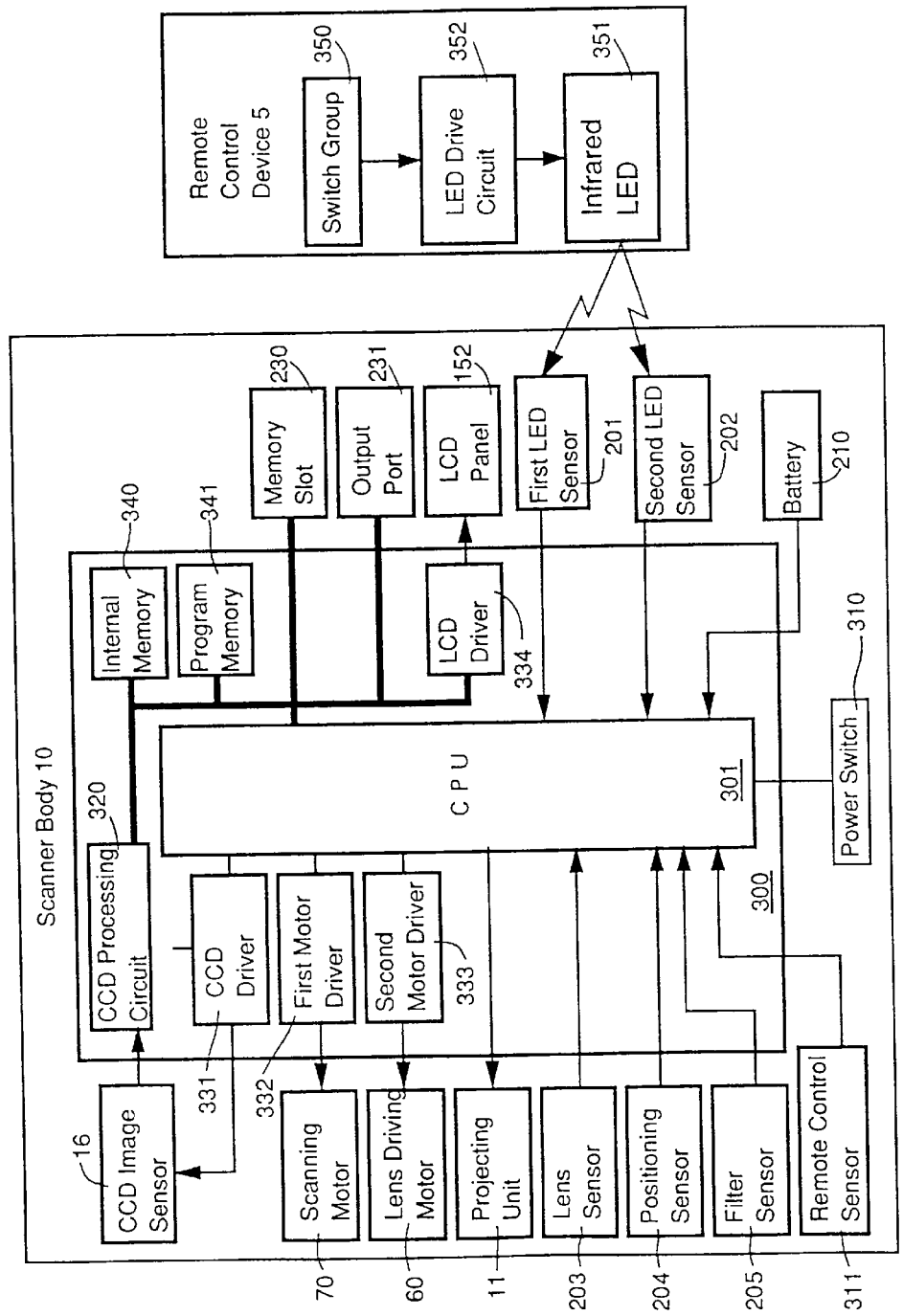
FIG. 19 is a block diagram of the scanner.

FIG. 19 is a block diagram showing electrical systems for the scanner 1 and the remote control device 5. Note that FIG. 19 does not show electrical connections through which power is supplied to elements other than the CPU 301. The electrical system of the scanner 1 will be described first.

The electrical system of the scanner 1 includes at scanner control circuit 300 that is provided with power, either through the power switch 310 or from the battery 210. The electrical system also includes several input elements that provide input to the control circuit 300. The input elements include the image sensor 16, the lens sensor 203, the positioning sensor 204, the filter sensor 205, the first and second LED sensors 201 and 202, and the remote control sensor 311.

The electrical system in the scanner body further includes several output elements that receive output from the control circuit 300. The output elements include the LCD panel 152, the scanning motor 70, the lens driving motor 60, and the projecting unit 11.

The electrical system also includes a memory slot 230 into which a memory card 220 (see FIG. 2) may be inserted for connection to the control circuit 300 and an output port 231 to which an external device (not shown), such as a personal computer or the like, may be attached for connection to the control circuit 300.

The control circuit 300 includes a CPU 301 and an address/data bus (shown as a thick line in FIG. 19). The address/data bus connects the CPU 301 to a program memory 341, an internal memory 340, a CCD processing circuit 320, an LCD driving circuit 334, and to the memory slot 230 and the output port 231. The control circuit 300 also includes a CCD driver 331, a first motor driver 332, and a second motor driver 333.

All of the input elements except the image sensor 16 provide input directly to the CPU 301 which, according to a program stored in the program memory 341, controls the CCD driver 331 to drive the image sensor 16, the first motor driver 332 to drive the scanning motor 70, the second motor driver 333 to drive the lens driving motor 60, and the LCD driver 334 to drive the LCD panel 152 based on data input from the input elements.

Generally, image signals input from the image sensor 16 are processed by the CCD signal processing circuit 320, transferred through the address/data bus, and stored in the internal memory 340 as a digital image. The digital image may then be provided as output to the memory card 220 through the memory slot 230 or to an external device through the output port 231. For example, when the scanner 1 is used in a stand-alone mode, digital images may be captured and recorded on the memory card 220, while when the scanner 1 is operated while connected to a personal computer, digital images may be directly provided as output from the internal memory 340 to the personal computer and recorded in the personal computer memory. Further, if a printer driver is provided in the scanner 1, digital images may be directly provided as output from the internal memory 340 to a printer (not shown).

The electrical system of the remote control device 5 includes the switch group 350 and an LED drive circuit 352 that drives an infrared LED 351 mounted on the transmission part 56 (shown in FIG. 2) according to signals input from each switch of the switch group 350.

CCD Signal Processing Circuit

Figure 20:
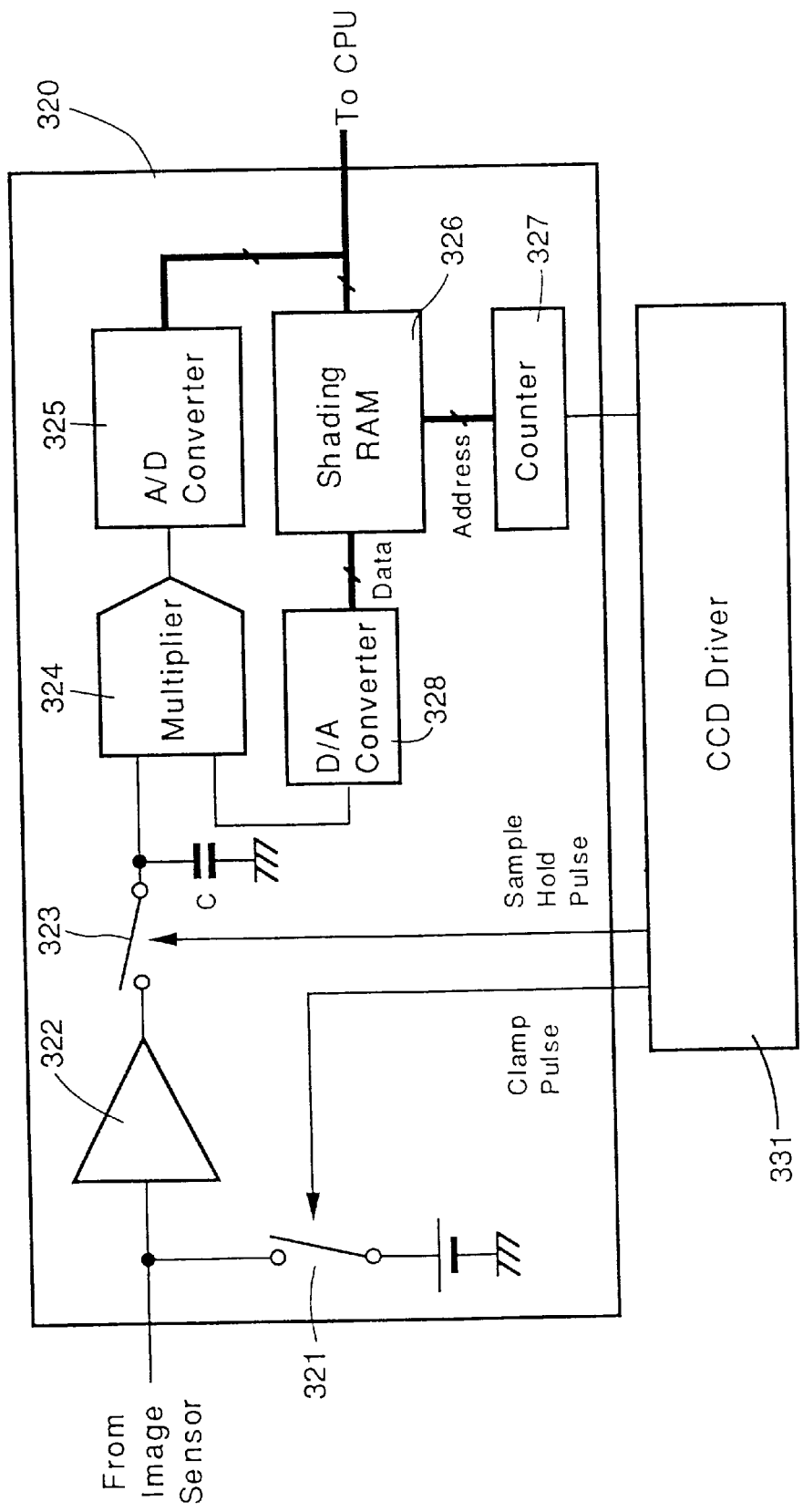
FIG. 20 is a schematic diagram of a CCD processing circuit.

FIG. 20 is a block diagram showing the CCD signal processing circuit 320 that processes image data signals output by the image sensor 16. An image data signal from the image sensor 16 is clamped based on a clamp pulse from the CCD driver 331 which operates clamping switch 321 to fix a standard voltage level of the image data signal and is amplified by a buffer amplifier 322. The output signal from the buffer amplifier 322 is held in a capacitor C as an analog data signal according to operation of a hold switch 323 by a sample-hold pulse and is provided as input to a multiplier 324. The sample-hold pulse is generated in synchronization with the sequential reading of data from each pixel (transmission timing of the accumulated voltage).

The multiplier 324 compensates for any change in the signal intensity due to shading by multiplying the image data by a predetermined coefficient for each pixel or group of pixels depending on a distance from the center pixel (i.e., an image height). Additional shading compensation to compensate for shading due to changes in magnification for each scanning line is also performed, as described below with reference to FIG. 32. In operation, a counter 327 counts a number of pulses output from the CCD driver 331 according to the transmission of each pixel and the counted number is used to read a correction coefficient from a shading RAM 326. The predetermined correction coefficients are stored digitally in the shading RAM 326 and thus a D/A converter 328 is provided to convert the digital correction coefficients to analog correction coefficients before being input to the multiplier 324. The multiplier 324 outputs corrected image data as a product of the image data and the correction coefficient, and then an A/D converter 325 converts the corrected image data into digital image data that is input to the CPU 301.

LCD Panel

Figure 21:
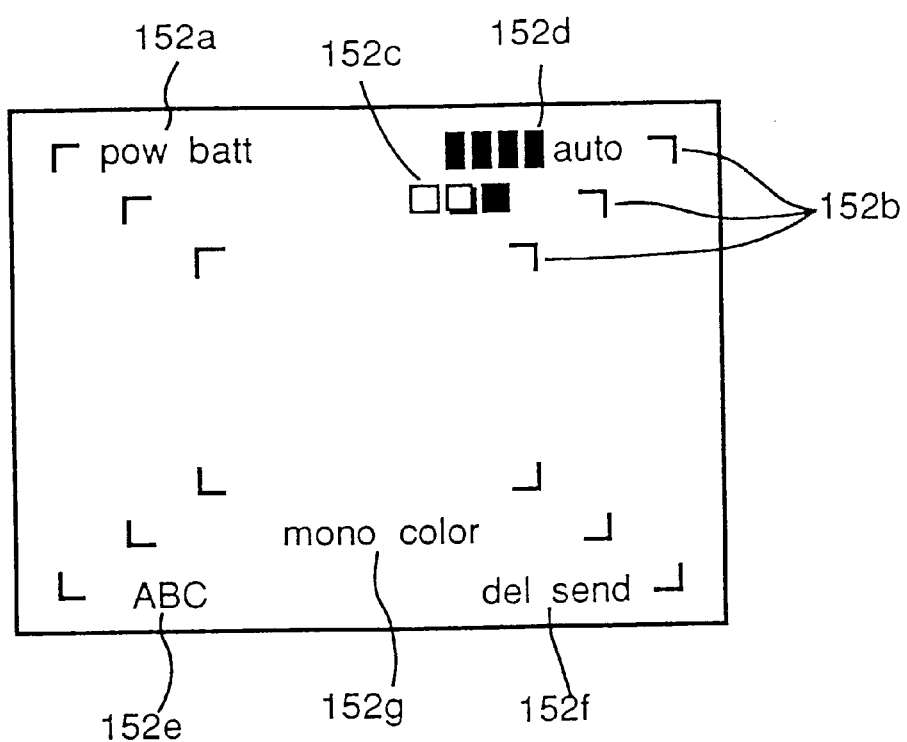
FIG. 21 shows an LCD panel.

As shown in FIG. 21, the LCD panel 152 is provided with first to seventh segment groups 152a to 152g. The LCD panel 152 is arranged in the finder system 150 such that segment groups 152a to 152g may be displayed overlapping with an object image displayed in the finder system 150.

Although FIG. 21 shows a condition when all of the segments in the segment groups 152a to 152g are turned ON for the purposes of description, in actual use, particular segments will only turn ON as required or set.

For example, the first segment group 152a is for indicating information related to power supply. The first segment group 152a includes the segments "pow", which is displayed when the power is turned ON (i.e., power switch 310 is turned ON), and the segment "batt", which is displayed when the voltage of the battery 210 is lower than a predetermined level. The second to seventh segment groups 152b–152h show information that corresponds to the mode set by operation of the remote control device 5. The segments displayed at each of the segment groups 152b–152h is described below.

Scanning Motor Pulses

In the following description, as noted above, a mirror home position of the scanning mirror 2 is defined as the position where the optical axis of the imaging lens 3 and the optical axis as deflected by the scanning mirror 2 form a right angle. Note that, at the home position, the optical axis of the imaging lens 3 is parallel to the optical axis of the finder system 150.

Further, "forward" rotation of the scanning motor 70 moves the scanning mirror 2 in a direction from a start position to an end position and "reverse" rotation of the scanning motor 70 moves the scanning mirror 2 in a direction from the end position to the start position.

Figure 22:
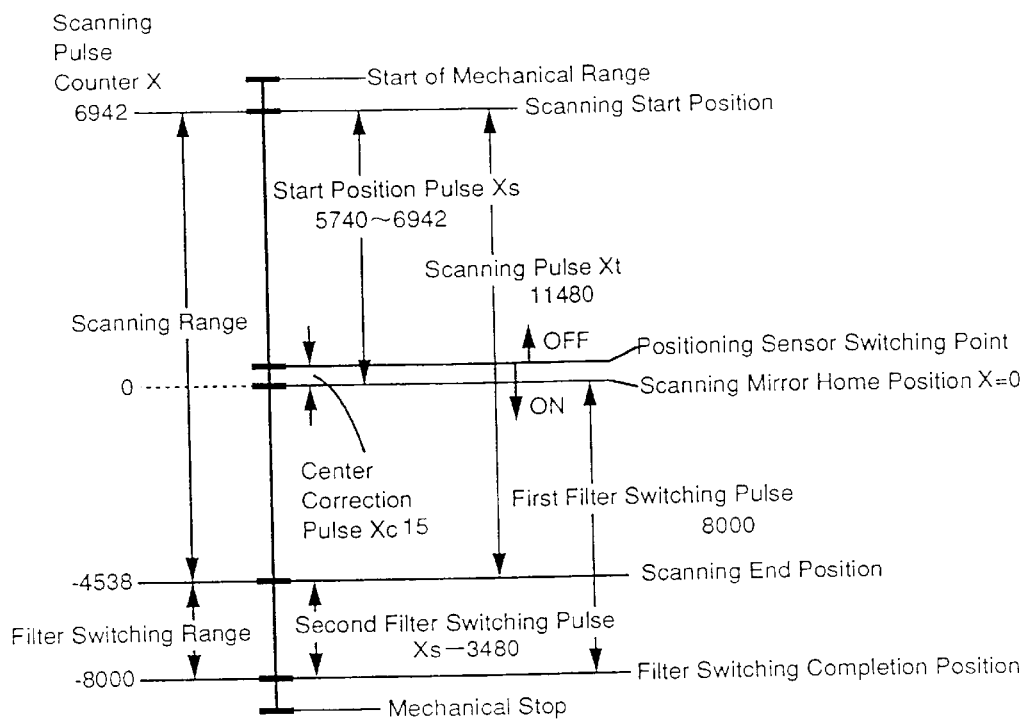
FIG. 22 is a schematic diagram illustrating a relationship between scanning motor drive pulses and scanning mirror positions.

FIG. 22 shows a relationship between driving pulses of the scanning motor 70 and positions of the scanning mirror 2. Thus, each position of the scanning mirror 2 may be defined as a pulse number counted from the mirror home position.

The scanning mirror 2 is designed to rotate within a predetermined mechanical range; however, in operation, the scanning mirror 2 is actually controlled to rotate within a narrower operating range. As mentioned above, the scanning motor 70 is also used for switching the filter 4, and as such, the operating range of the scanning mirror 2 includes a scanning range for capturing an image and a filter switching range. The scanning range is defined between a start position and an end position and, as described below, the scanning range may be adjusted within the operating range to compensate for parallax. The filter switching range is defined as a range between the end position and a filter switching completion position.

As the scanning motor 70 is driven between the end position for capturing an image and a completed position for filter switching, the filter holder 40 rotates by 90 degrees and a subsequent filter is positioned in the optical path between the imaging lens 3 and the image sensor 16.

As described above, the scanning mirror 2 is positioned at the mirror home position using the positioning sensor 204. Referring to FIG. 22, the positioning sensor 204 turns OFF when the scanning mirror 2 is positioned at the start position side of the reference scanning position R, and the positioning sensor 204 turns ON when the scanning mirror 2 is positioned at the end position side of the reference scanning position R. The positioning sensor 204 is positioned such that the switching point of the positioning sensor 204 is offset from the home position of the scanning mirror 2 to the start position side of the scanning range by the center correction pulse Xc. That is, the scanning mirror 2 is set at the home position when the scanning motor 70 rotates in the forward direction by a number of pulses equal to the center correction pulse Xc after the positioning sensor 204 turns ON. The center correction pulse Xc is determined for each scanner 1 in order to compensate for errors in positioning of the positioning sensor 204 and the like. For the current example, an average center correction pulse Xc is about 15. In particular, the position of the positioning sensor 204 is set such that the center correction pulse Xc is always a positive value. That is, the home position of the scanning mirror 2 is always located at the end position side of the scanning range with respect to the switching position of the positioning sensor 204. Thus, the scanning mirror 2 can be accurately set at the home position and, since the rotation of the scanning mirror 2 is based on the home position, the scanning range is also accurately set.

In particular, the start position of the scanning range is defined by driving the scanning motor 70 in the reverse direction by a start position pulse Xs from the home position of the scanning mirror 2. The start position pulse Xs is determined based on a distance to the object O in order to compensate for parallax with respect to the finder system. In this example, the start position pulse Xs can take a value between 5740 pulses and 6942 pulses. The setting of the start position pulse Xs is described below with reference to the flowcharts.

Once the start position has been defined, the end position of the scanning range is a position reached after the scanning mirror 2 is driven by the scanning motor 70 in thee forward direction by a scanning pulse Xt from the start position. The scanning pulse Xt is a fixed number of pulses of the mirror scanning motor 70 between the start position and the end position of the scanning range. The scanning pulse Xt does not vary with respect to individual scanners and/or parallax. In this embodiment, the value of the scanning pulse Xt is set to 11480 in order to correspond to the desired size of object O, as described above.

Accordingly, in the particular case where the value of the start position pulse Xs is equal to 5740, the scanning range will be symmetrical with respect to the home position of the scanning mirror 2. Otherwise, the scanning range at the start position side of the home position (finder-side scanning range) will be larger than the scanning range at the end position side of the home position (lens-side scanning range). Within the scanning range defined by the scanning pulse Xt, the image sensor 16 captures an image for every four pulses of the scanning motor 70 such that 2870 image (scanning) lines are captured during scanning.

In order to define the filter switching range, a first filter switching pulse Xf1 defines a number of pulses to rotate the scanning mirror 2 from the home position to a filter switching completion position (that is, the end position of the filter switching range). Further, a second filter switching pulse Xf2 defines a number of pulses to rotate the scanning mirror 2 from the end position of the scanning range to the filter switching completion position. The first filter switching pulse Xf1 is a constant (8000 pulses, in this example) and the value of the second filter switching pulse Xf2 is calculated using (Xs−3480), thus Xf2 varies between 3500 and 4702 pulses depending on the value of the start position pulse Xs.

If the rotating position of the scanning mirror 2 is represented by a scanning pulse counter X, as shown in the example of FIG. 22, when the value of the start position pulse Xs is 6942, representing the case where the imaging lens is located at the closest position to the scanning mirror 2, the value of the scanning pulse counter X will be equal to 6942 at the start position and will be −4538 at the end position of the scanning range. The value of the scanning pulse counter X will be equal to −8000 at the completed position for filter switching.

Lens Driving Motor Pulses

Figure 23:
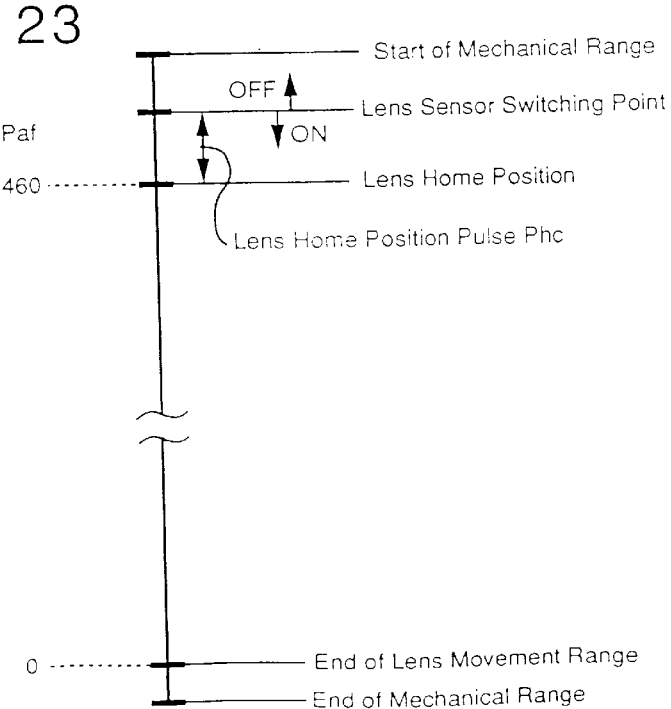
FIG. 23 is a schematic diagram illustrating a relationship between lens drive motor drive pulses and lens positions.

FIG. 23 shows a relationship between driving pulses of the lens driving motor 60 and the position of the imaging lens 3. The imaging lens 3 moves between a near side (i.e., close to the scanning mirror 2) and a far side (i.e., away from the scanning mirror 2 and close to the image sensor 16). The imaging lens 3 has a stroke of 6 nm and 480 pulses are required for moving the imaging lens 3 through the stroke. Accordingly, the imaging lens 3 moves 12.5 μm for each pulse. A "forward" direction is defined as a rotation of the lens driving motor 60 to move the imaging lens 3 toward the near side, and a "reverse" direction is defined as a rotation to move the imaging lens 3 toward the far side.

A home position of the imaging lens 3 is defined as a position where the imaging lens 3 forms an in-focus image of an object that is located at 23 cm from the scanner 1 onto the image sensor 16. The position of the imaging lens 3 is represented by a lens position counter Paf. The value of the lens position counter Paf is set to 460 at the home position and is decreased by one for every driving pulse of the lens driving motor 60, and will be 0 at the far side.

The lens home position of the imaging lens 3 is determined by rotating the lens driving motor 60 by a lens home position correcting pulse Phc from the switching position of the lens sensor 203. That is, the lens driving motor 60 rotates in reverse by the lens home position correcting pulse Phc after the output of the lens sensor 203 changes from OFF to ON in order to position the imaging lens 3 at the lens home position. The lens home position correcting pulse Phc is set for each scanner to compensate for differences in individual scanners. With this construction, the lens home position of the imaging lens 3 can be accurately determined even if the arrangement of the lens sensor 203 or the shutter plate 36 is different in individual scanners.

Flowcharts

The functions of the control circuit 300 (i.e., the CPU 301 operating according to the program stored in the program memory 341) provided in the scanner 1 are now described with reference to the flowcharts in FIGS. 24 through 32. In the description below, each step in a flowchart is represented by "S" plus a reference number and, number, thus, the word "step" has been omitted.

Main Process

Figure 24:
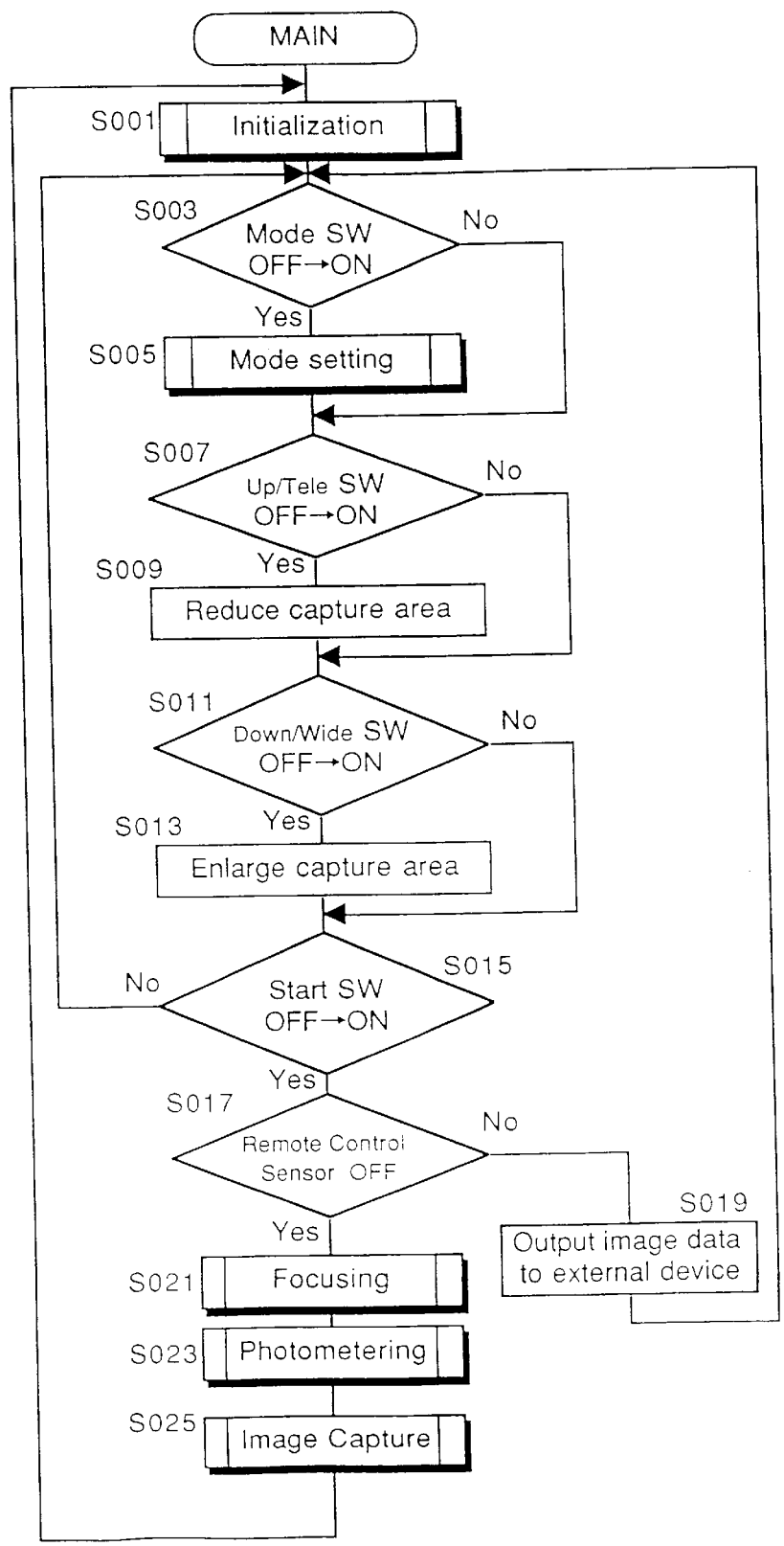
FIG. 24 is a flowchart for a main process.

As the main switch 310 of the scanner body 1 is turned ON, the scanner 1 is controlled in accordance with the main process shown in FIG. 24. At S001 of the main process, an initializing process is executed. The initialization process is described below with reference to FIGS. 25 and 26; however, generally, the scanning mirror 2 is set at the mirror home position, the colorless filter 4a is set in the optical path, and the imaging lens 3 is set at the lens home position.

Figure 27:
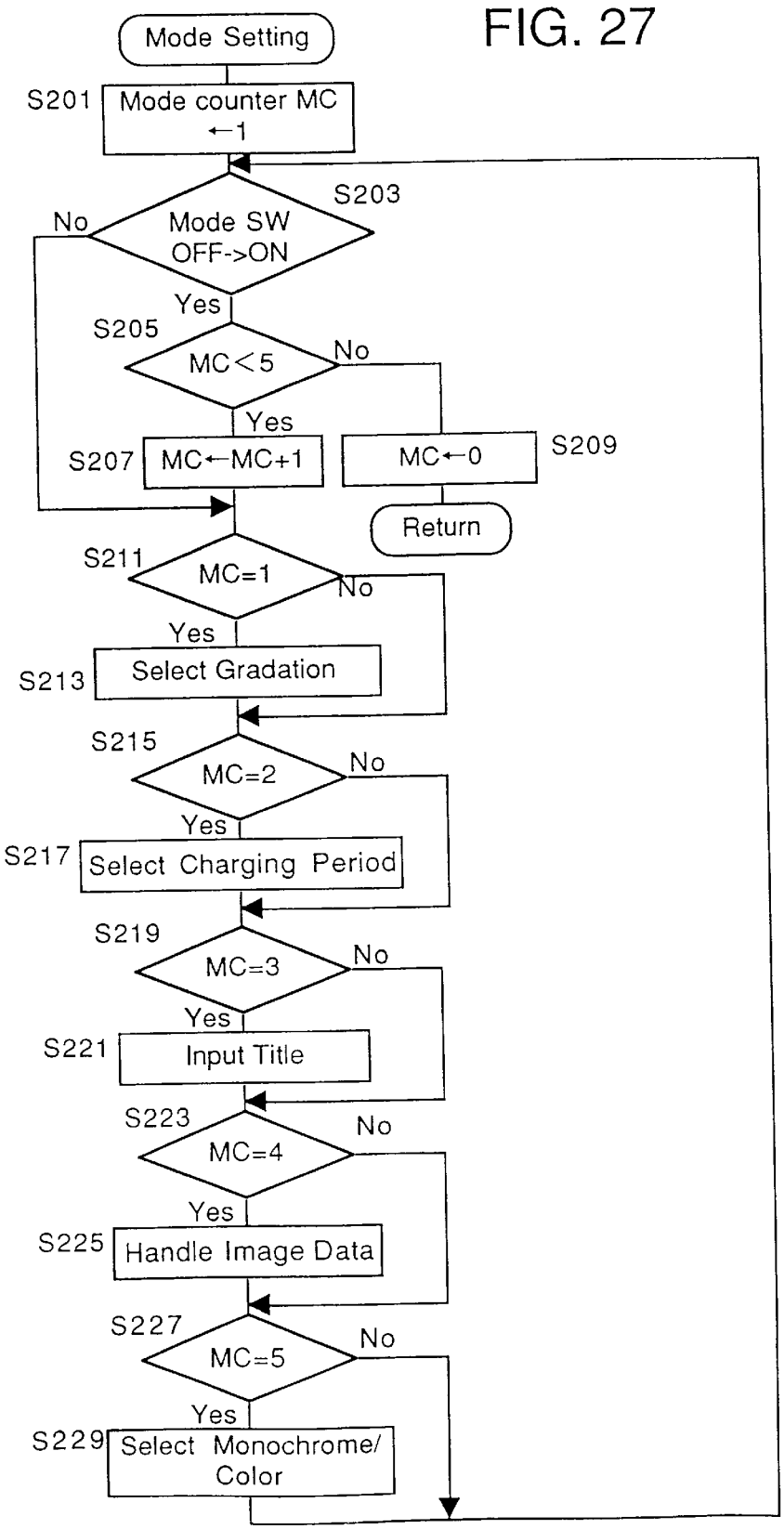
FIG. 27 is a flowchart for a mode setting process.

After the initializing process at S001, the CPU checks the mode button 53 on the remote control device 5. If the CPU detects that the mode button 53 has turned from OFF to ON, a mode setting process shown in FIG. 27 is executed at S005. If the mode button 53 has not turned from OFF to ON, the mode setting process of S005 is skipped.

At steps S007 through S013, the CPU determines the conditions of the up/tele button 54 and the down/wide button 55. If the up/tele button 54 is turned from OFF to ON (Yes at S007), the capture area is reduced at S009. If the down/wide button 55 is turned from OFF to ON (Yes at S011), the capture area is enlarged at S013.

The scanner 1 according to the embodiment includes three capture areas that may be selected using the up/tele button 54 and the down/wide button 55. The capture areas are defined by changing the number of effective pixels of the image sensor 16 in the main scanning direction and the width of the scanning range in the auxiliary scanning direction. The number of pixels in a two dimensional image is determined by the product of the effective pixels of the image sensor 16 and the number of scanning lines. In this embodiment, the largest size image includes 6 million pixels, the middle size image includes 2 million pixels and the smallest size image includes half a million pixels.

The selected capture area is displayed on the LCD panel 152 by the second segment group 152b. The second segment group 152b indicates one of three rectangular areas representing the capture area selected by the operation of the buttons 54 and 55. Each rectangular area is defined by four L-shaped segments that are positioned at each of four corners of the rectangular area. The method of changing the capture area is known and is not described further.

At S015, the CPU determines whether the start button 51 is turned from OFF to ON. If the start button 51 remains OFF, the CPU repeats the processes of S003 through S013. When the start button 51 is turned ON (Yes at S015), the CPU checks the signal from the remote control sensor 311 at S017. If the remote control sensor 311 outputs an ON signal, that is, if the remote control device 5 is attached to the scanner body, at S019 the CPU 301 transfers image data from the memory card loaded in the memory slot 230 or from the inner memory 340 to an external device such as a computer connected to the output connector 231.

If the remote control sensor 311 outputs an OFF signal (Yes at S017), that is, if the remote control device 5 is separated from the device body, the CPU 301 executes a focusing process (FIGS. 28 and 29) at S021, a photometering process (FIG. 30) at S023 and a capturing process (FIGS. 31 and 32) at S025. Generally, the focusing process is to move the imaging lens 3 to an in-focus position with respect to the object O. The photometering process is to detect a brightness of the object O and to determine whether the object O is against a white background or a black background. The capturing process is to capture an image of the object O by scanning the object O using settings determined in the focusing and photometering processes. If the capturing process is completed normally, the CPU repeats the processes from S001.

Initializing Process

Figure 25:
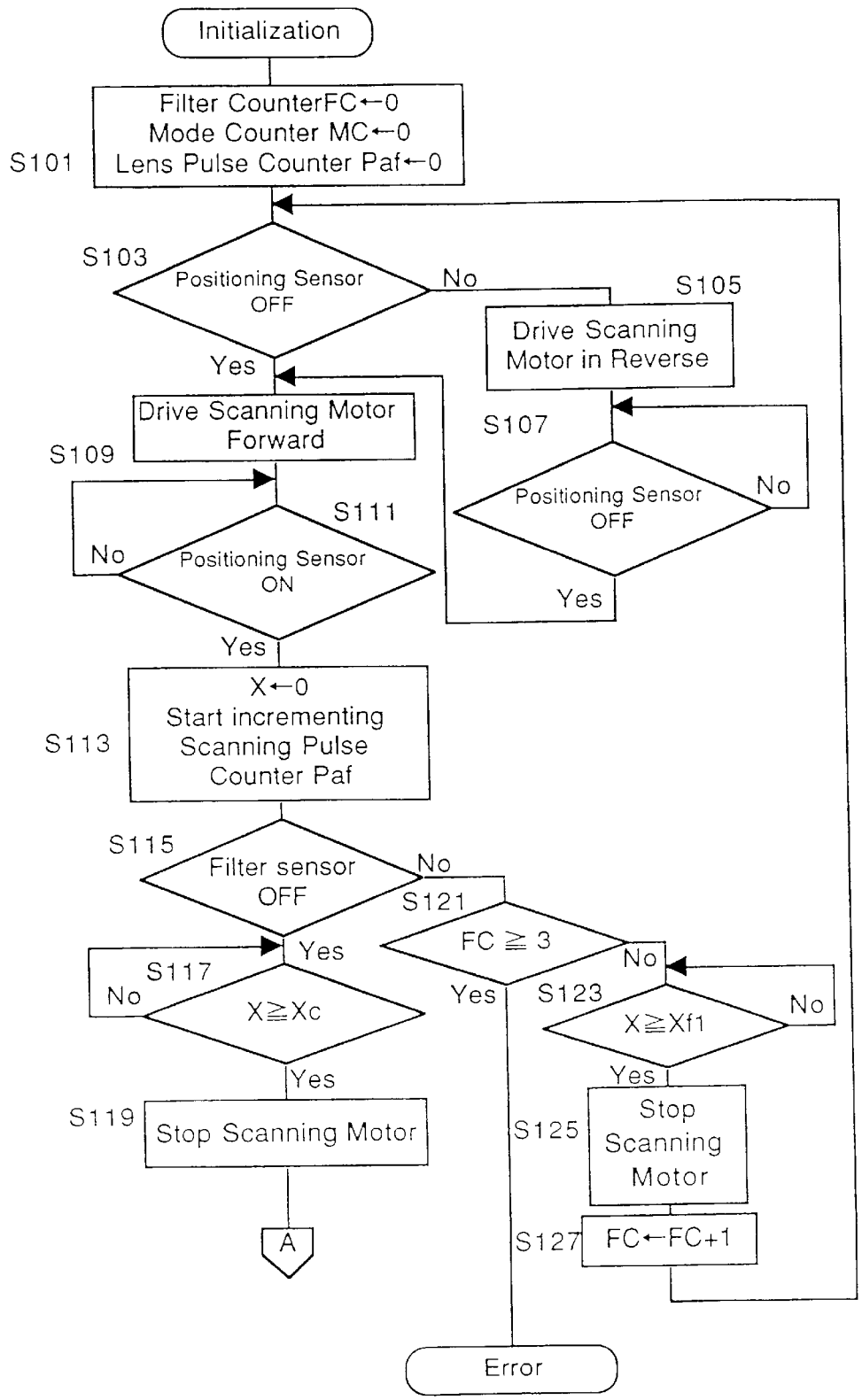
FIG. 25 is a flowchart for an initialization process.
Figure 26:
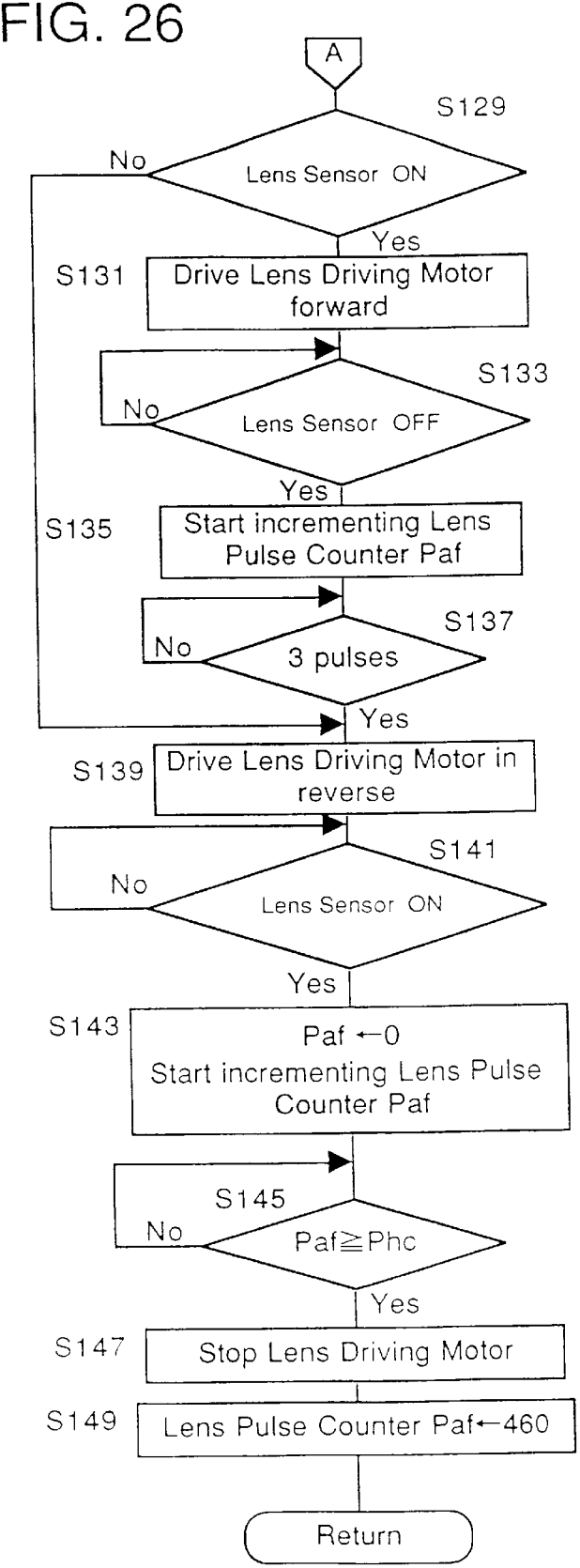
FIG. 26 is a continuation of the flowchart for the initialization process.

FIGS. 25 and 26 show the initializing process that is executed at S001 in the main process.

At S101 of the initializing process, the filter counter FC, the mode counter MC and the lens pulse counter Paf are reset to "0". At S103 through S127, the CPU controls the scanning motor 70 to set the scanning mirror 2 at the mirror home position and the colorless filter 4a in the optical path. At S129 through S149 in FIG. 26, the imaging lens 3 is positioned at the lens home position.

At S103, if the scanning mirror 2 is positioned in the range where the positioning sensor 204 is OFF (Yes at S103), the scanning motor 70 is driven in the forward direction at S109. However, if the scanning mirror 2 is positioned in the range where the positioning sensor 204 is ON (No at S103), the scanning motor 70 is first driven in the reverse direction (S105) until the positioning sensor 204 turns OFF (S107) before the scanning motor 70 is driven in the forward direction at S109. According to these steps, the CPU 301 detects a switching point where the signal from the positioning sensor 204 changes from OFF to ON. This process is performed because it is necessary to accurately set the scanning mirror 2 at the home position, in particular, as described above, the scanning mirror 2 is set at the home position after being driven by the scanning motor 70 in the forward direction by the center correction pulse Xc from the OFF to ON switching point of the positioning sensor 204.

At S111, the CPU determines if the positioning sensor 204 has turned ON during the forward rotation of the scanning motor 70. After the positioning sensor 204 turns ON the scanning pulse counter X starts to count at S113. The counter X increases in response to each driving pulse of the scanning motor 70. If, at S115, the signal from the filter sensor 205 is OFF, that is, the colorless filter 4a is positioned in the optical path, the CPU 301 waits until the value of the scanning pulse counter X is equal to the center correction pulse Xc (S117) and then stops the scanning motor 70 (S119).

If the signal from the filter sensor 205 is ON (No at S115), the CPU checks whether the filter counter FC is smaller than 3 at S121. If the filter counter FC is smaller than 3, the scanning motor 70 is driven in the forward direction until the scanning pulse counter X is equal to the first filter switching pulse Xf1, and then the filter counter FC increases by one (S123 to S127). This operation rotates the filter holder by 90 degrees and the filter is switched to a next filter. After switching the filter, the CPU repeats the process from S103. The processes of S103 to S115 and S123 to S127 are repeated until the signal from the fitter sensor 205 turns OFF. However, if the signal from the filter sensor 205 is not OFF even after the filter counter FC is equal to or larger than 3 (No at S121), the CPU executes an error process assuming that an error has occurred. That is, since there are four filters 4a, 4b, 4c, 4d on the filter holder 40, in a normal condition the signal of the filter sensor 205 must turn OFF before the filter holder 40 has been switched four times.

Continuing from S119 of FIG. 25, at S129 of FIG. 26, if the imaging lens 3 is positioned in the range where the signal from the lens sensor 203 is OFF (No at S129), the lens driving motor 60 is driven in the reverse direction at S139. However, if the imaging lens 3 is positioned in the range where the signal from the lens sensor 203 is ON (Yes at S129), the lens driving motor 60 is first driven in the forward direction (S131) and the CPU waits for the lens sensor 203 to turn OFF (S133). After the lens sensor 203 turns OFF (Yes at S133), the lens driving motor 60 is driven by an additional three pulses in the forward direction (S135 and S137) and then the lens driving motor 60 is driven in the reverse direction at S139.

The CPU 301 waits until the lens sensor 203 turns ON during the reverse rotation of the lens driving motor 60 (S141) and then the lens pulse counter Paf is set to zero and increases in response to each driving pulse of the lens driving motor 60 (S143). The lens driving motor 60 is stopped when the value of the lens pulse counter Paf is equal to the home position correcting pulse Phc (S145 and S146). The imaging lens 3 is thus positioned at the lens home position and the home position count, i.e., "460", is then set to the lens pulse counter Paf (S149).

According to these steps, the CPU detects a switching point where the signal from the lens sensor 203 changes from OFF to ON in order to accurately set the imaging lens 3 at the lens home position. As described above, the imaging lens 3 is set at the lens home position by driving the lens driving motor 60 in the reverse direction by the home position correcting pulse Phc from the switching point of the lens sensor 203.

The initialization process then ends and control returns to the main process of FIG. 24.

Mode Setting Process

FIG. 27 shows the mode setting process executed in S005 in the main flowchart. The segment groups 152c–152h on the LCD panel 152 will also be described. In the mode setting process, settings of each of five items may be adjusted depending on a value of the mode counter MC. The detailed procedure for the setting of each of the items is not shown in the flowchart.

As described above, the mode counter MC is set to "0" at S101 of the initializing process, such that when the CPU detects that the mode button 53 turns from OFF to ON (i.e., when the mode button 53 is pushed) at S003 of the main process, the mode counter MC is first set to "1", at S201. In the mode setting process, the mode counter MC increases by one (S207) each time the CPU detects that the mode button 53 is pushed (S203). If the mode button 53 is pushed (Yes at S203) and the mode counter MC is equal to "5" (No at S205), the mode counter MC is reset to "0" (S209) and the CPU returns to the process of the main flowchart.

If the mode counter MC is set to "1" (Yes at S211), a process for selecting gradation of image data is performed (213). At S213, "1-bit data", "1-bit data (reversed)" and "8-bit data" can be selected by operation of the up/tele button 54 and down/wide button 55. The third segment group 152c of the LCD panel 152 displays the setting of the gradation of image data. A left segment (white filled and not shaded) of the third segment group 152c turns ON when the image data is to be output as 1-bit data, a center segment (white filled with shade) turns ON when the image data as to be output as 1-bit data (reversed), and a right segment (black filled) turns ON when the image data is to be output as 8-bit data.

If the mode counter MC is set at "2", a process for selecting a CCD charging period is performed (S215, S217). At S217, one of 4 manual settings (i.e., four predetermined charging periods for the image sensor 16) or an automatic setting can be selected by operation of the up/tele button 54 and down/wide button 55. The selection of charging period is similar to an exposure compensation procedure in a film camera. The fourth segment group 152d of the LCD panel 152 consists of four black filled segments and a segment for indicating the word "auto". When the charging period is manually set, at least one segment of the four black filled segments turns ON. The number of ON segments represents the manually adjusted charging period. When the charging period is to be set automatically, the segment "auto" turns ON.

If the mode counter MC is set to "3", a process for inputting an image data title is performed (S219, S221). The image data title may include alphabetic characters and/or numerical characters. For example, if the fifth segment group 152e includes three characters, a cursor is positioned at a first character and a user may cycle through the available letters and numbers in ascending order, i.e., A, B, C, etc., by pressing the up/tele button 54 and in descending order, i.e., C, B, A, etc., by pressing the down/wide button 55. Then, when the stop/delete button 52 is operated, the selected character is fixed and the cursor moves to the next character. The process is repeated and then when the stop/delete button 52 is operated when the cursor is positioned at the third character, the cursor moves back to the first character. All of the characters, i.e., the title, is fixed when the mode button 53 is operated.

If the mode counter MC is set at "4", a process for handling captured image data is performed (S223, S225). At S225, a setting concerning the handling of image data stored in the internal memory 340 is changed when the up/tele button 54 or the down/wide button 55 are operated. In this mode, "delete" or "send" can be selected as the setting for the image data. "Delete" means that the image data will be deleted from the internal memory 340 and "send" means that the image data will be transmitted from the inner memory to the memory card 220 or an external device. After the data handling mode is selected, the image data is deleted or sent accordingly when the start switch 51 is operated. The sixth segment group 152f on the LCD panel 152 indicates the setting and displays "del" for data deletion mode and "send" for data transmission mode.

If the mode counter MC is set to "5", a process for changing between a monochrome capturing mode and a color capturing mode is performed (S227, S229). In the monochrome/color selecting process at S229, the CPU 301 toggles between the monochrome capturing mode and the color capturing mode when either the up/tele button 54 or the down/wide button 55 are operated. The seventh segment group 152g on the LCD panel 152 indicates the setting and displays "mono" in the monochrome capturing mode and "color" in the color capturing mode.

Focusing Process

Figure 28:
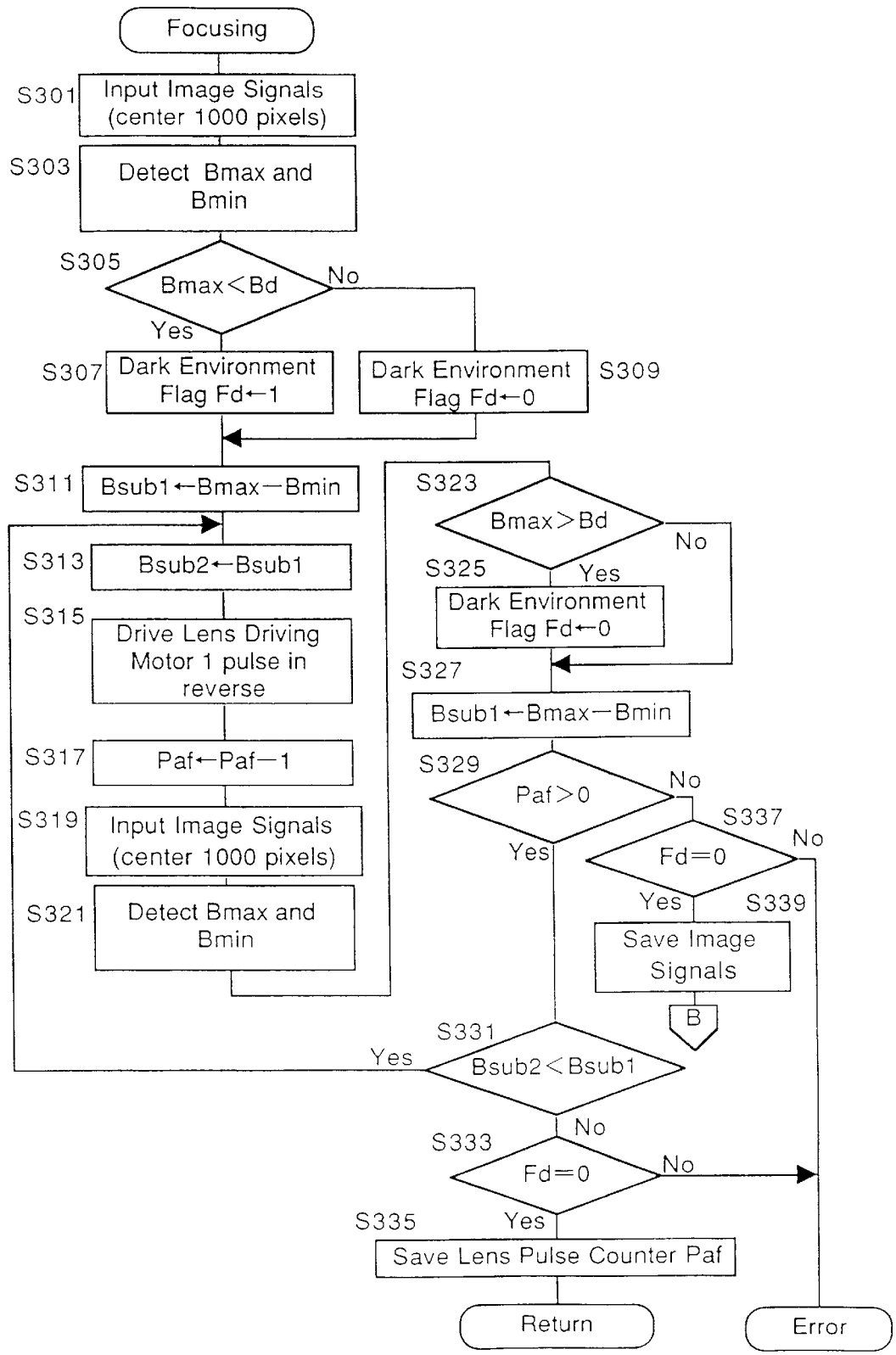
FIG. 28 is a flowchart for a focusing process.
Figure 29:
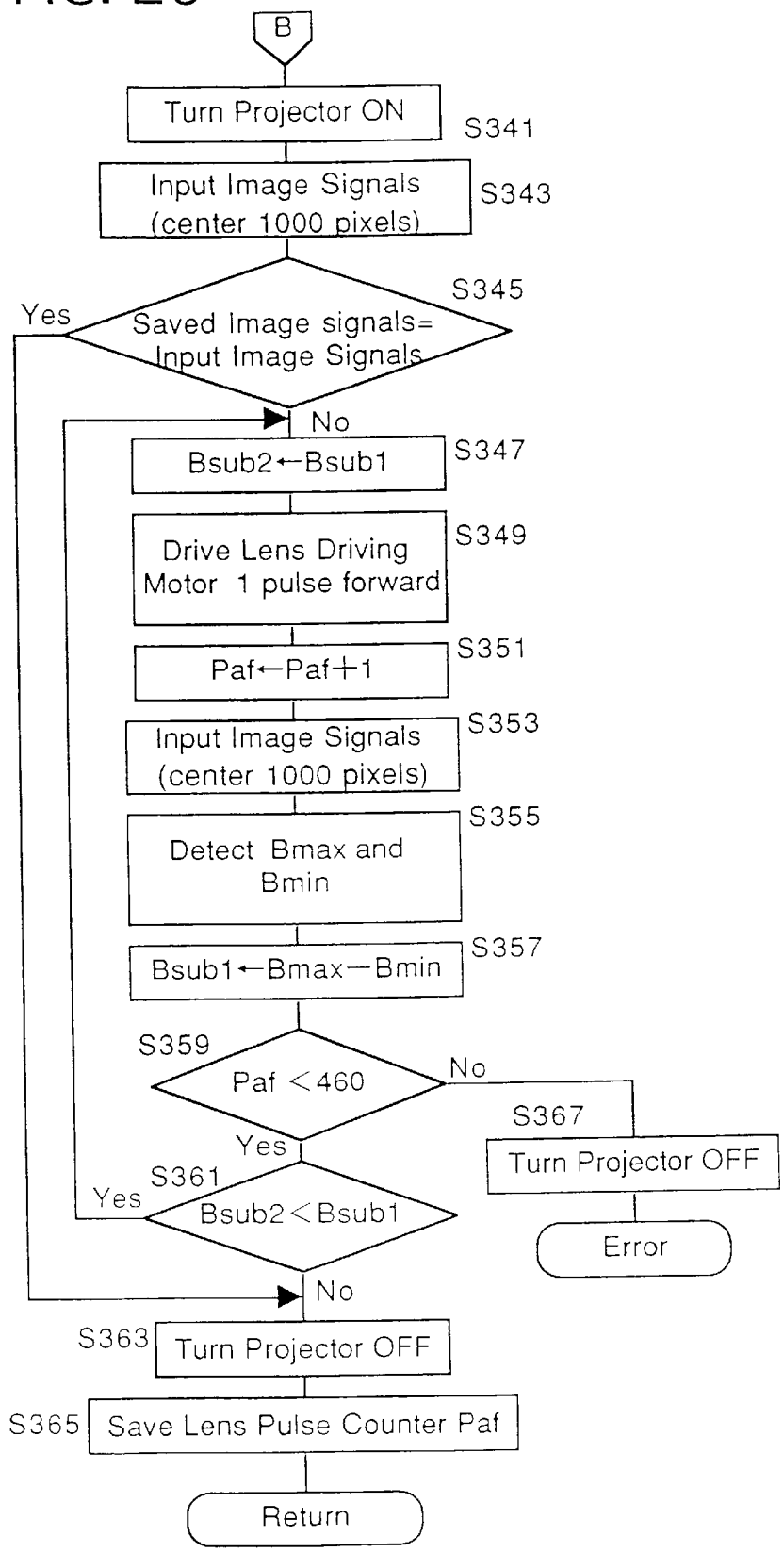
FIG. 29 is a continuation of the flowchart for the focusing process.

FIGS. 28 and 29 show a flowchart illustrating the focusing process which is executed at S021 of the main process. In the scanner 1, photometry data and focusing data for the object are obtained using the image sensor 16. The photometry and the focusing detection are determined in a state when the scanning mirror 2 is located at the home position and a reference scanning line is being read. That is, based on the contrast and brightness for the reference scanning line, the focusing condition and the brightness for the entire image of the object O are determined.

Generally, when adjusting the focusing condition, the focusing lens 3 is moved from the closest position towards the farthest position step by step while the output of the image sensor 16 is read at each step. A difference between a maximum brightness and a minimum brightness is regarded as a contrast for the objective area, and the focusing lens is set at a position which is one step towards the far side with respect to the position at which the contrast is maximum. This method is analogous to a conventional contrast method in which two sensors are located at synmetrical positions with respect to the focal point of the focusing lens. However, in the above method, contrasts at different lens positions are compared to determine the focused position. This method will be referred to as a scanning-contrast method hereinafter.

In the focusing process shown in FIGS. 28 and 29, as well as determining the focusing condition, the CPU also determines whether a brightness of the object is appropriate for capturing an image. Typically, if the maximum brightness of the object O is less than the a predetermined minimum brightness at which image capture is possible, image capture should be prohibited unless a manual charging period has bees set (see the mode setting procedure above). Note that, only one measurement may be necessary to determine whether the minimum brightness is available or not. In particular, if the minimum brightness is not available due to the environment being too dark, it is appropriate to prohibit image capture. However, if the minimum brightness is not available due the object being black, a portion which is sufficiently bright may exist outside of the detected range and, in such a case, it is preferable that the image capture is not prohibited. Therefore, in the embodiment, even if the maximum brightness detected by one measurement that is lower than the minimum brightness at which image capturing is possible, the image capturing is not prohibited and a comparison of the maximum and minimum brightness detected at each movement of the focusing lens is executed.

When the focusing lens is moved long the optical axis towards the image sensor 16, the magnification changes and the angle of view is broadened, and accordingly, the area of the object formed on the image sensor 16 is widened. In this way, an area which might have higher brightness but that is located outside the angle of view when the lens is located at the closer side may be inside the angle of view when the lens is moved towards the image sensor 16.

Further, as the focusing lens approaches an in-focus position, the image formed on the image sensor 16 becomes sharper, which may increase the detected value of the maximum brightness. In particular, if the object O is black, the detected value of the maximum brightness may change as the lens moves. However, if the environment is dark, the detected value of the maximum brightness will not change. Therefore, whether or not the maximum brightness changes while the focusing lens is moved is examined, and the CPU 301 determines whether the object is black or the environment is dark.

It the embodiment, if the detected value of the maximum brightness exceeds the reference minimum brightness at least once within the movable range of the focusing lens 3, before the in-focus position is detected, image capture is permitted. If the maximum brightness does not exceed the reference minimum brightness, image capture is prohibited, except when the a manual charging period has been set (see the mode setting procedure above).

In the focusing process shown in FIG. 28, 1000 pixels of the image signal are obtained for examination (S301). The 1000-pixel data is selected such that the center pixel along the scanning line is located at the center of the image represented by the 1000-pixel data. Note that the electrical charge corresponding to the image incident on the image sensor 16 is accumulated for a predetermined default charge period. At this stage, the scanning mirror 2 is located at the home position, and the focusing lens is located at the lens home position (i.e., the position at which the lens is focused on a subject located at the nearest point within the distance range for image capturing).

The 1000-pixel data is processed, for example, in order to compensate for dark current, and then the maximum brightness Bmax and the minimum brightness Bmin are determined (S303). If the maximum brightness Bmax is less than the minimum reference brightness Bd (Yes at S305), a dark environment flag Fd is set to 1 (S307). If the maximum brightness Bmax is greater than the minimum reference value Bd (No at S305), the dark environment flag Fd is set to 0 (S309).

The dark environment flag Fd indicates whether or not the environment including the object is determined to be too dark for image capture. If the maximum brightness that is detected when the focusing lens is located at the near terminal is less than the minimum reference brightness, the flag Fd is set to 1, and if the maximum brightness which is detected when the focusing lens is moved exceeds the minimum reference brightness at least once, the flag Fd is set to 0 at S325. Note that the minimum reference brightness Bd is, for example, the brightness which causes the accumulated electric charge to be 0.5 volts within the default charge period.

At S311, the difference between the maximum brightness Bmax and the minimum brightness Bmin obtained at S303 is calculated and stored in a first brightness difference variable Bsub1. The brightness difference is used as an index indicating the contrast of the object O. Then, the first brightness difference variable Bsub1 is transferred to the second brightness variable Bsub2 (S313). Thereafter, the lens driving motor 60 is rotated by one pulse in the reverse direction and the lens pulse counter decreases by one (S315 and S317). The value of the lens pulse counter at the start of the focusing process is 460 (as set during the initialization process).

After the focusing lens is driven by one pulse, the central portion (1000-pixel data) of the image sensor 16 is read, and the maximum brightness Bmax and the minimum brightness Bmin are determined (S319, S321). At steps S323 and S325, if the maximum brightness Emax is greater than the minimum reference brightness Bd, the dark environment flag Fd is set to 0. At S327, the difference between the maximum and minimum brightness is stored as the first brightness difference variable Bsub1. By the processes of S313 and S327, the first brightness difference variable Bsub1 stores a brightness difference after the focusing lens is moved to the image sensor 16 side by one pulse with respect to the lens position when the brightness difference stored in the variable Bsub2 is detected.

The process of S313 through S327 is repeated while the lens pulse counter Paf is larger than 0 (S329) and the value of the latest brightness difference variable Bsub1 is larger than that of the previous brightness difference variable Bsub2 (S331). As the imaging lens 3 moves along the optical axis in one direction, typically the contrast of the image will become larger as the imaging lens 3 closes on the in-focus position and then will become smaller after the imaging lens 3 passes over the in-focus position. Therefore, the imaging lens 3 is positioned at an appropriate in-focus position when the latest brightness difference Bsub1 is smaller than the previous brightness difference Bsub2. If the dark environment flag Fd is "0", the CPU saves the value of the lens pulse counter Paf and returns to the main process (S333, S335).

If the lens pulse counter Paf reaches "0" at S331, this indicates that the imaging lens 3 has reached the farthest edge without reaching an in-focus position. In this case, if the dark environment flag Fd is equal to "0" (S337) indicating sufficient brightness, the CPU saves the data from the image sensor 16 (S339) and the process proceeds to S341 in FIG. 29.

If it is determined that the dark environment flag Fd is "1" (i.e., not equal to "0") at either S333 or S337, the CPU determines that the brightness of the object O is too low for image capture and the CPU executes the error process.

The process shown in FIG. 29 is executed when an in-focus position cannot be detected throughout the movement of the imaging lens 3 from the nearest position to the farthest position even though the object O is sufficiently bright. In the process of FIG. 29, the contrast pattern P is projected by the projecting device 11 and a change of the contrast of the image is detected for each lens position corresponding to a single pulse rotation of the lens driving motor 60 moving the imaging lens 3 from the farthest position toward the nearest position.

In the process of FIG. 29, the projecting device 11 is turned ON and projects a contrast pattern P onto the object and an image signal is then provided as input from the image sensor 16 (S341, S343). The CPU then judges at S345 whether the image signal stored at S339 (i.e., an image signal without a contrast pattern) is the same as the image signal provided as input at S343.

If the two image signals are the same (Yes at S345), the contrast pattern projecting device 11 turns OFF, the CPU saves the value of the lens pulse counter Paf and returns to the main process (S363, S365). In this case, it is assumed that the object O is too far and therefore the projected contrast pattern P does not reach the object O. Thus, the present lens position (the farthest position) is the best position for capturing an image.

If the image signal changes after projecting the contrast pattern (No at S345), it is assumed that the object O is located within a range where the projected contrast pattern P can reach the object O. In this case, the contrast is detected from the image signal while rotating the lens driving motor 60 by one pulse in the forward direction to find the point where the contrast starts to decrease at S347 through S357. If, before the value of the lens pulse counter Paf reaches "460", the contrast of the present position of the imaging lens is lower than that of the previous position of the imaging lens (No at S361), the position of the imaging lens is determined as the in-focus position, the contrast pattern projecting device 11 is turned OFF, and the CPU saves the value of the lens pulse counter Paf and returns to the main process (S363, S365).

If it is determined that the lens pulse counter Paf reaches "460" (No at S359) before the in-focus position is found (No at S361), the projecting device 11 is turned OFF and the CPU executes the error process (S359, S367). In this case, the peak of the contrast cannot be detected in spite of the fact that the object has sufficient brightness and the object is located within a range in which the projected contrast pattern can reach the object. In this case, it may be that the object distance is shorter than 23 cm (i.e., the closest limit) or an error has occurred in the scanner 1.

Photometering Process

Figure 30:
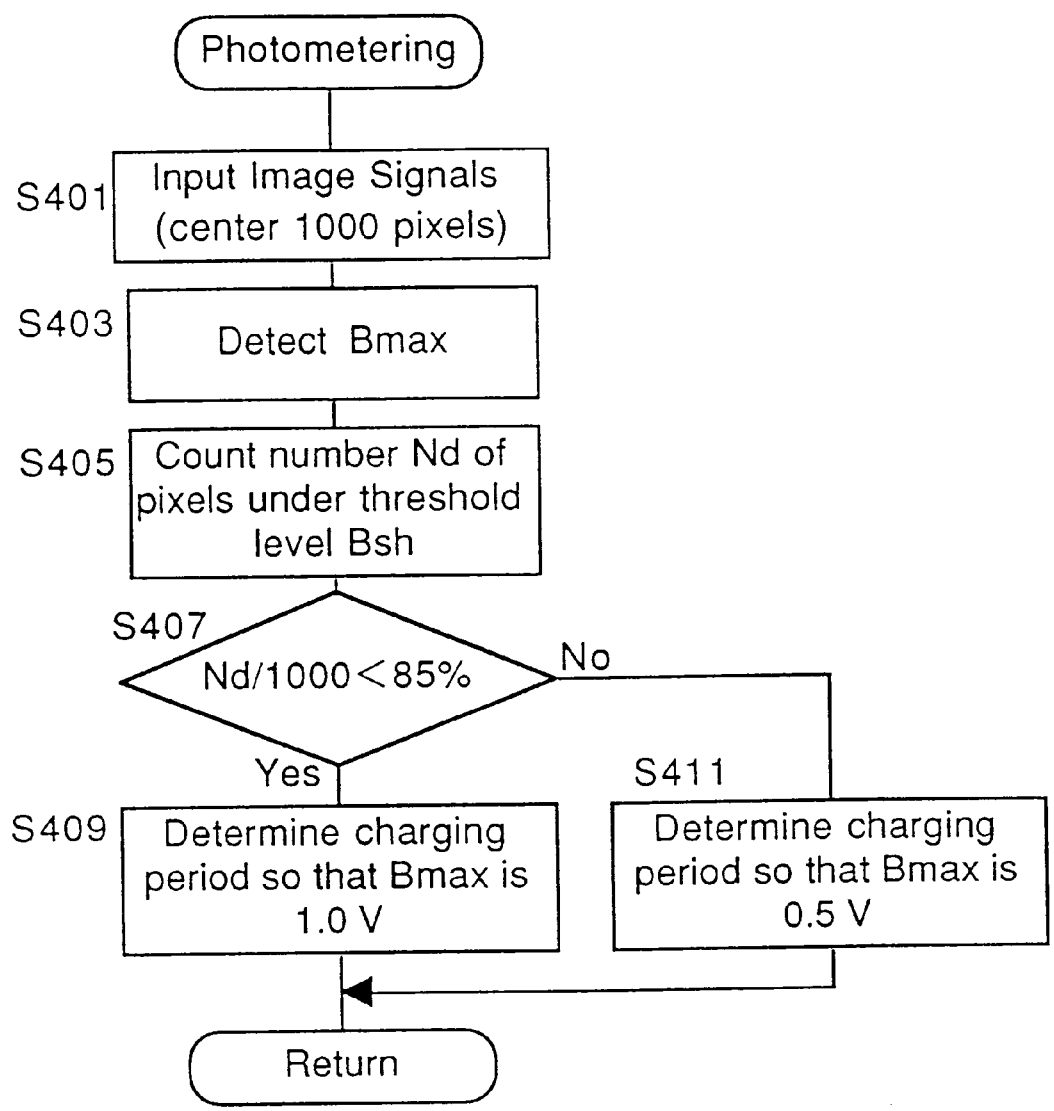
FIG. 30 is a flowchart for a photometering process.

FIG. 30 is a flowchart showing the photometering process executed at S023 of the main flowchart. Here, the term "photometering" means to detect the maximum brightness in a target area on the reference scanning line. In the photometering process, a charging period of the image sensor 16 for each line during image capturing is selected based on the maximum brightness at which pixels will not be saturated. The rotating speed of the scanning motor 70 is then determined to correspond to the charging period.

Generally, in an image capturing device using a CCD sensor, the charging period is controlled in response to brightness so that the most suitable image signal can be obtained. The scanner 1 of the embodiment also determines the charging period in response to the brightness of the object. However, since the charging period is constant and is determined based on the maximum brightness on the reference scanning line, some high brightness pixels on scanning lines other than the reference scanning line may be saturated. Thus, in this embodiment, the scanner 1 determines whether the object is against a white background or a black background, and then determines the charging period based on the type of background. This process is performed to attempt to reduce the number of saturated pixels as much as possible and thereby obtain as large a signal level as possible.

The CPU initially reads an image signal from the image sensor 16 at a default charge period and the center 1000 pixels of data are input to the CPU at S401 and processed to compensate for dark current and the like. Then, the maximum brightness Bmax is detected from the 1000 pixels of data (S403). At S405, a dark pixel number Nd of pixels which have a brightness that is lower than a reference brightness Bsh is determined by comparing the brightness of every pixel of the compensated 1000-pixel data with the reference brightness Bsh. The reference brightness Bsh is, for example, $16/256$ when a quantization level for A/D conversion as 256 steps.

If the dark pixel number Nd is lower than 85% of the 1000 pixels on the reference scanning line, it is assumed that the object is against a white background such as a white board. In this case, the charging period is set so that the output of the pixel that output the maximum brightness Bmax at S403 will be 1.0 V (S407, S409) and the CPU returns to the main process. If the dark pixel number Nd is higher than 85% of the 1000 pixels, it is assumed that the object is against a black background such as a black board. In this case, the charging period is determined so that the output of the pixel that output the maximum brightness Bmax at S403 will be 0.5 V (S407, S411) and the CPU returns to the main process.

The method of photometering described above is now described in more detail. In the image sensor 16, an electrical charge, which is stored in a photodiode for each pixel in response to a received light amount, is transformed to a transmission part through a shift gate. The transmitted electrical charge is sequentially input into a floating capacitor in response to a transmission pulse and then converted to a voltage. The received light amount at each of the pixels is detected as a voltage drop of a source follower using a MOS transistor. Under a condition when a photodiode is not saturated, an output voltage from each pixel of the image sensor 16 is in direct proportion to the received light amount.

To provide the best image, the charging period should be controlled so that all photodiodes in the image sensor 16 will not be saturated, since, if a photodiode is saturated, overflow electric charge may flow into peripheral photodiodes and causes blooming, disturbing the output signal. On the other hand, it is also desirable that the output signal level be as high as possible in order to improve a S/N ratio. The saturation voltage of the image sensor 16 of the embodiment is 2.0 V, and thus, the charging period should be controlled so that the output voltage from the maximum brightness pixel is about 1.0 V to satisfy the above requirements. That is, the peak voltage should be about a half of the saturation voltage.

Furthermore, as briefly explained above, since the charging period of the image sensor 16 for the entire scanning range is determined based on the image signal at the reference scanning line, the charging period should be determined while estimating a brightness for the entire scanning range so that pixels in scanning lines other than the reference line will not be saturated. Thus, the charging period is determined using two different standards, that is, assuming either a black background or a white background.

In using these standards, there are two assumptions that are made, the first is that, when the object is against a white background, there will be a relatively small possibility of finding a pixel on scanning lines other than the reference scanning line that is brighter than the maximum brightness pixel on the reference scanning line. The second assumption is that, when the object is against a black background, there is a relatively large possibility of finding a pixel on scanning lines other than the reference scanning line that is brighter than the maximum brightness pixel on the reference scanning line.

If, based on the brightness distribution at the reference scanning line, the object is determined to be against a white background, the charging period is determined so that the output of the pixel that output the maximum brightness will be 1.0 V (i.e., the peak voltage for this example). In this case, the charging period is determined to be suited to the maximum brightness because it is assumed that there is only a low possibility that any pixels on scanning lines other than the reference scanning line will be saturated.

If the object is determined to be against a black background, the charging period is set so that the output of the pixel that output the maximum brightness will be 0.5 V (i.e., half of the peak voltage). In this case, the charging period is determined to be a half of the above period to the maximum brightness because there is a high possibility that some pixels on scanning lines other than the reference scanning line will be saturated if the charging period is determined in the same way as for the white background case.

Since the output voltage of each pixel of the image sensor 16 may be considered to be in direct proportion to the charging period when the intensity of the received light is constant, the charging period for a black background object is half of that for a white background object for a given maximum brightness.

When quantizing the image data signal, for example, quantization levels may be set having 256 steps such that the range of 1 V is divided into 256 gradations. The quantization process is identical for both the white and black background objects. Thus, if the object is against a white background, the signal from the maximum brightness pixel at the reference scanning line is allotted to the 256 level (i.e., the maximum level), whereas, if the object is against a black background, the signal from the maximum brightness pixel is allotted to the 128 level (i.e., half of the maximum level).

For the white background object, all steps of the gradation can be effectively used and the brightness gradation of the object can be accurately detected since it is assumed that there is a low possibility of finding a pixel on scanning lines other than the reference scanning line that is brighter than the maximum brightness pixel at the reference scanning line. That is, since there are few pixels that have a larger output level than that of the maximum brightness pixel on the reference scanning line, it is not necessary to distinguish the output level of the maximum brightness pixel on the reference scanning line and the brighter pixels on other scanning lines.

On the other hand, for the black background object, if there are some pixels on scanning lines other than the reference scanning line that are brighter than the maximum brightness pixel at the reference scanning line, those pixels can be appropriately quantized as long as a voltage from those pixels does not pass over 1 V.

Moreover, the gradation level of all pixels having an electrical charge that is larger than 1 V are allotted to the 256th step regardless of the background of an object. Although the 1 V level is lower than the saturation level of the photodiodes of the image sensor 16, these pixels are considered to be saturated in view of the quantization. However, since the standard for determining the charge period in the photometering process is different for the white background object and the black background object, the possibility of having saturated pixels in the quantization is reduced.

As described above, the initial charging period in the photometering process is the default charge period. This default charge period is also used in the focusing process of FIG. 28. Thus, for example, if a voltage from the maximum brightness pixel is 0.8 V, and the object is determined as being against a white background, a charging period for scanning is set so that the voltage from that pixel is 1.0 V, that is, the charging period for scanning is longer than the default period. On the other hand, if the object is determined as being against a black background, a charging period for scanning is determined so that the voltage from that pixel is 0.5 V, that is, the charging period for scanning is shorter than the default period.

Capturing Process

Figure 31:
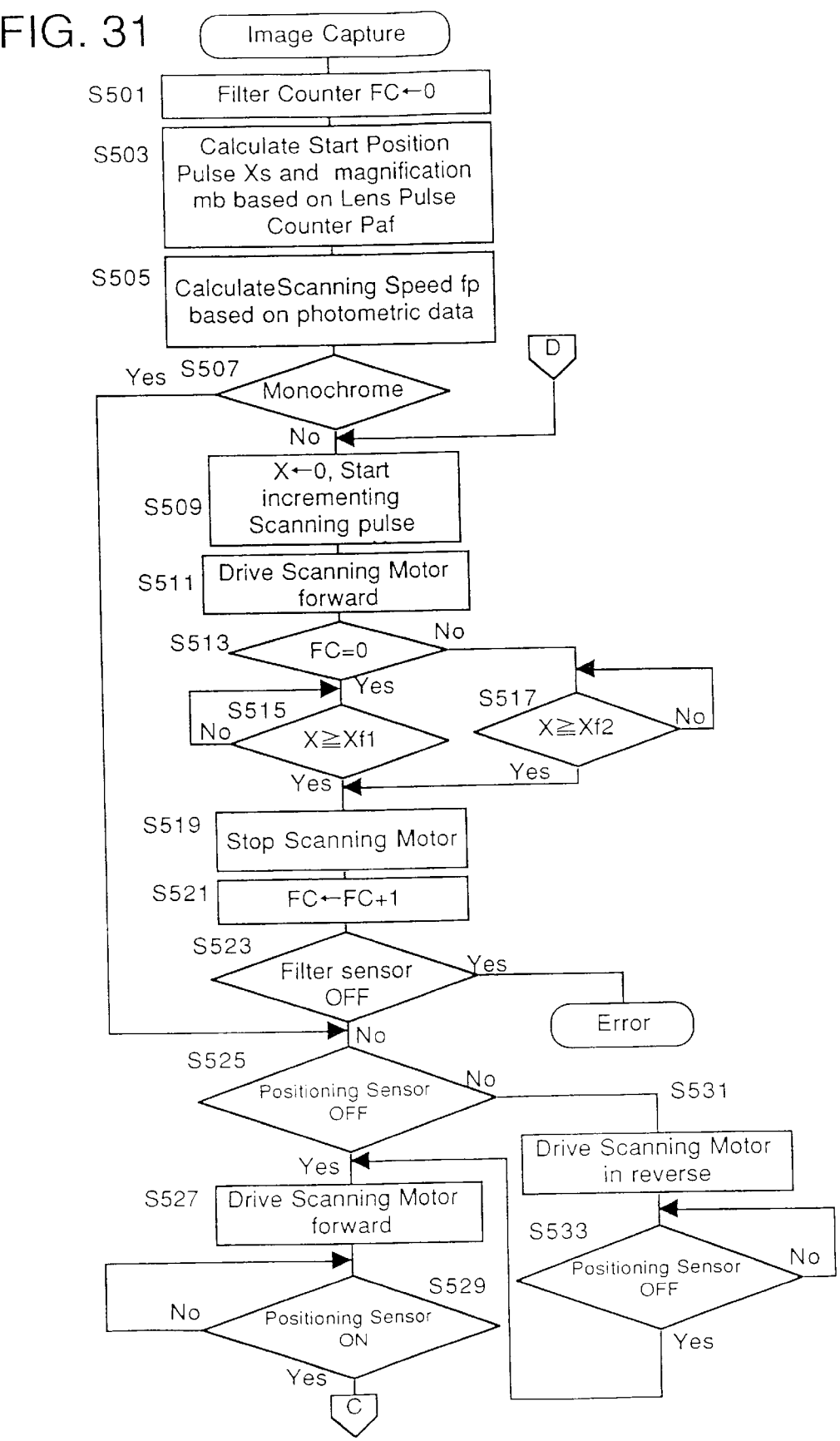
FIG. 31 is a flowchart for a capture process.
Figure 32:
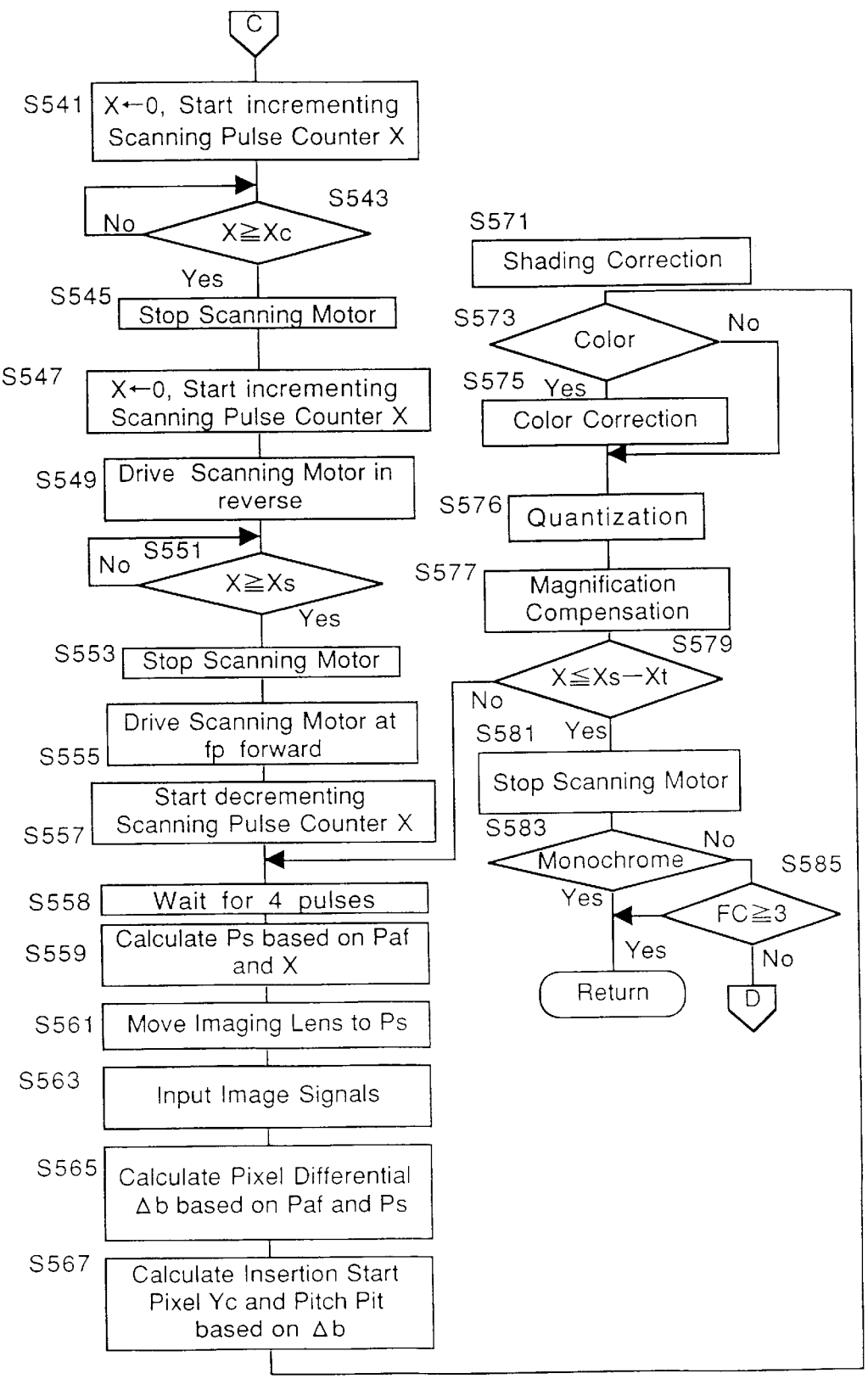
FIG. 32 is a continuation of the flowchart for the capture process.

FIGS. 31 and 32 are flowcharts showing the capture process that is executed at S025 of the main process. During the capture process, image data are sequentially captured by the image sensor 16 as the scanning mirror 2 rotates. The scanning mirror 2 is rotated at a rotating speed based on the charging period determined in the photometering process. The in-focus position detected in the focusing process is used as a base position for driving the imaging lens.

In the capture process, at S501, the filter counter FC is initialized to "0" and, at S503, a standard magnification mb and a start position pulse Xs are calculated based on the value of the lens pulse counter Paf at the in-focus position using the approximation formulas (10) and (11):

$$mb = 0.00036 \, Paf + 0.000009 \quad (10)$$

$$Xs = INT(-0.0057 \, Paf^2 + 2.8706 \, Paf + 5741.1) \quad (11)$$

Then, at S505, a scanning speed fp for the scanning motor 70 is determined. The scanning speed fp is defined as a motor driving pulse cycle calculated to provide the charging period determined in the photometering process. For example, in the present embodiment, since an image signal is captured every 4 driving pules of the scanning motor 70, the scanning speed fp is determined by dividing the charging period by 4.

As described above, the scanning range is changed in response to an object distance so as to reduce parallax between the finder optical system 150 and the imaging optical system 1a. Rather than detect the object distance directly, the CPU 301 uses the value of the lens pulse counter Paf at the in-focus position to determine an object distance. Generally, when the in-focus position of the imaging lens 3 is close to the home position of the imaging lens 3, the imaging lens 3 focuses an object located at a short distance and the object distance can be considered short. Also, when the in-focus position of the imaging lens 3 is close to the image sensor 16, the imaging lens 3 focuses an object located at a long distance and the object distance can be considered long.

Thus, parallax can be reduced by changing the start position Xs of the scanning range in response to the number of driving pulses of the lens driving motor 60 required to move the imaging lens 3 from its home position to an in-focus position. If the pulse number from the home position is small, the parallax is considered to be large and therefore, the start position Xs of the scanning range shifts so that the center of the scanning range is positioned at the finder side of the reference scanning line. As a result of this shift, the finder side scanning range is wider than the lens side scanning range.

The difference between the center of the scanning range and the reference scanning line reduces as the pulse number from the home position increases. When the in-focus position of the imaging lens 3 is at the farthest position, it is assumed that there is no parallax and the scanning range is symmetric with respect to the reference scanning line.

The following TABLE 1 shows back focus fb of the imaging lens 3, the standard magnification mb at the reference scanning line, and the value of the start position pulse Xs based on the value of the lens pulse counter Paf at the in-focus position.

TABLE 1

| Paf | fb | mb | Xs |
|---|---|---|---|
| 460 | 35.009 | 0.165 | 6942 |
| 437 | 34.722 | 0.157 | 6887 |

TABLE 1-continued

| Paf | fb | mb | Xs |
|---|---|---|---|
| 414 | 34.434 | 0.149 | 6832 |
| 391 | 34.147 | 0.141 | 6777 |
| 368 | 33.859 | 0.132 | 6720 |
| 345 | 33.572 | 0.124 | 6664 |
| 322 | 33.284 | 0.116 | 6606 |
| 299 | 32.997 | 0.108 | 6548 |
| 276 | 32.709 | 0.099 | 6490 |
| 253 | 32.422 | 0.091 | 6431 |
| 230 | 32.134 | 0.083 | 6371 |
| 207 | 31.847 | 0.074 | 6311 |
| 184 | 31.559 | 0.066 | 6250 |
| 161 | 31.272 | 0.058 | 6189 |
| 138 | 30.984 | 0.050 | 6127 |
| 115 | 30.697 | 0.041 | 6064 |
| 92 | 30.409 | 0.033 | 6001 |
| 69 | 30.122 | 0.025 | 5936 |
| 46 | 29.834 | 0.017 | 5872 |
| 23 | 29.547 | 0.008 | 5806 |
| 0 | 29.259 | 0.000 | 5740 |

Returning to the flowchart of FIG. 31, since the operation of the filter unit 4 will be different for monochrome mode and color mode, the CPU 301 checks if monochrome mode is set at S507. Note that, after the initializing process, the colorless filter 4a is positioned in the optical path and is appropriate for the monochrome mode. Thus, if the CPU judges that the monochrome mode is set at S507, the scanning mirror 2 is again set at its home position at S525 through S545 (similar to the process at S103 through S119 of the initializing process). Otherwise, if the CPU judges that the monochrome mode is not set at S507 (i.e., color mode), the filter holder 40 is driven to rotate such that the filter in the optical path is changed at S509 through S523.

In the filter changing process of S509 through S523, the scanning pulse counter X is first reset to "0" and set to increment for each driving pulse at S509. The scanning motor 70 starts to rotate in the forward direction at S511. The driving amount of the scanning motor 70 in the filter changing process varies according to the value of the filter counter FC. If the value of the filter counter FC is "0", the scanning mirror 2 is positioned at the home position. In this case, the scanning motor 70 is driven until the value of the scanning pulse counter X reaches the first filter switching pulse Xf1 (=8000 pulses) at S513 and S515, i.e., driven to move to the filter changing range and then rotate the filter unit 40 by 90 degrees. When the value of the filter counter FC is not "0", the scanning mirror 2 is assumed to be positioned at the end position of the scanning range since the scanning mirror 2 will have just completed a scan (see S579–S585 below). In this case, the scanning motor 70 is driven until the value of the scanning pulse counter X equals the second filter switching pulse Xf2 (=Xs−3480) at S513 and S57, i.e., driven to rotate the filter holder 40 by 90 degrees.

When the driving pulse of the scanning motor 70 equals the predetermined pulse number (Yes at S515 or S517), the scanning motor 70 is stopped at S519 and the filter counter FC is increased by 1 at S521. As a result of the filter changing process, the filter holder 40 rotates by 90 degrees and the filter is switched to a subsequent filter.

At S523, the signal from the filter sensor 205 is checked. Since the filter sensor 205 turns OFF only when the colorless filter 4a is set in the optical path, if the signal from the filter sensor 205 is OFF, it means that the filter holder 40 did not rotate or the filter holder 40 rotated more than the required amount. In this case, the CPU executes the error process.

At S525 through S545, if the scanning mirror 2 is positioned in the range where the positioning sensor 204 is OFF, the scanning motor 70 is driven in the forward direction, or, if the scanning mirror 2 is positioned in the range where the positioning sensor 204 is ON, the scanning motor 70 is once driven in the reverse direction until the positioning sensor 204 turns OFF and then the scanning motor 70 is driven in the forward direction. After the positioning sensor 204 turns ON during the forward rotation of the scanning motor 70, the scanning pulse counter X starts to count. The scanning motor 70 stops when the value of the scanning pulse counter X is equal to the center correction pulse Xc. After these steps, the scanning mirror 2 is positioned at the mirror home position.

The scanning motor 70 then rotates in the reverse direction and stops when the value of the scanning pulse counter X is equal to or larger than the value of the start position pulse Xs (calculated at S503) from the mirror home position in order to define a scanning range after compensating for parallax (S547, S549, S551 and S553). Then, at S555, the scanning motor 70 starts to rotate in the forward direction from the start position Xs of the scanning range at the scanning speed fp (determined at S505). The scanning pulse counter X starts to decrement in response to the driving pulses of the scanning motor 70 at S557.

The process of S558 through S579 is the actual capture of an image of the object O. Basically, the scanning motor 70 is driven through the scanning range, i.e., until the value of the scanning pulse counter X amounts to (Xs−Xt) and, during this driving, image signals are read from the image sensor 16 every 4 driving pulses (S558). In this example, the number of driving pulses corresponding to the scanning range is equal to 11480 pulses and image signals from 2870 scanning lines are captured. That is, the object O within the scanning range is divided into 2870 lines in the auxiliary scanning direction.

In the present embodiment, it is assumed that the object O to be captured is substantially a flat surface that is perpendicular to the optical axis at the mirror home position of the scanning mirror 2. On the basis of this assumption, the object distance at the periphery of the scanning range will be different from that at the reference scanning position. Thus, the scanner 1 compensates for changes of object distance and resulting changes in magnification as the scanning mirror 2 rotates. The focusing state and the magnification are compensated for by an open-loop control using approximation formulas described below.

Generally, at S559 and S561, the imaging lens 3 is driven along the optical axis to change the focusing state in order to maintain the in-focus condition.

Then, at S563, image signals for the current scanning line are read from the image sensor 16.

As described in more detail below, any distortion of the image due to a change of the magnification must be digitally compensated for by adding compensating pixels to scanning lines as necessary. Thus, at S565 and S567, a pixel differential Δb, an insertion start pixel Yc, and a pitch Pit used for magnification compensation (at S577 below) are calculated. A detailed description of these calculations is provided below with reference to FIGS. 33 to 36.

At S571, the light quantity distribution of the image data is corrected to remove an effect of shading. The shading correction at S571 is in addition to the hardware shading correction described above with respect to FIG. 20 in order to correct in more detail for changes caused by the change in magnification along the scanning range. In particular, the shading correction is performed before the magnification compensation of S577 and is a known process to remove unevenness of the light quantity distribution in the main scanning direction due to the cosine fourth law or the like.

If the color mode is selected, at S573 and S575, the brightness signal of each pixel is also adjusted in order to correct for color shift due to differences in the incident angle to the color filter. That is, since a band of the transmission wavelength of the filter varies corresponding to the change of incident angle and such a color shift can be considered as a change of light amount for each color, the effect of the color shift can be corrected by compensating the level of the signal that corresponds to the received light amount.

After the shading correction (S571) and the color correction (S575) are finished, a quantization is performed at S576. In the quantization, the output voltage of the image sensor, corresponding to the maximum brightness Bmax, is set to be Ebmax (i.e., the voltage level determined in the photometry process described above). If the number of quantization levels is 256, the value of the voltage Ebmax is set to a value representing "256". Further, the value between the voltage Ebmax and a theoretical minimum voltage, or a voltage corresponding to the dark current of the image sensor is divided evenly into 256 levels (i.e., in this example, 8 bits). As a practical example, a quantization coefficient Ks may be obtained for each frame in accordance with the formula Ks=256/Ebmax, and, each pixel output from the image sensor 16 is multiplied by the quantization coefficient Ks.

At S577, the magnification compensation is performed based on the values calculated at S565 and S567. Then, at S579, the CPU 301 checks if the scanning pulse counter X has reached the end position of the scanning range. If not (No at S579), the process returns to S558 to check that their are 4 pulses of the scanning motor 70 before reading the next scanning line (i.e., repeating S559–S579).

When the value of the scanning pulse counter X reaches the value indicating the end position of the scanning range (Yes at S579), the scanning motor 70 stops at S581 and the CPU 301 judges whether the mode is set to monochrome or not at S583. If the mode is set to the monochrome mode, the CPU 301 returns to the main process. Otherwise, the mode is the color mode, and the CPU 301 checks the value of the filter counter FC at S585. If the value of the filter counter FC is smaller than 3, the CPU 301 returns to the process of S509 in FIG. 31 to change the filter and scan the object with a different color filter. If the value of the filter counter FC is equal to or larger than 3, the image capturing for three colors has been completed and the CPU 301 returns to the main process.

Note that, in the process above, the compensation for the focusing condition and the magnification are performed for each scanning line, the compensation for shading is performed for each pixel, and the color correction is performed for each pixel or for each color group that includes a plurality of pixels.

The focusing condition compensation and the magnification compensation described above with respect to the flowchart of FIG. 32 are now described in detail.

Generally, since the scanning mirror 2 is rotated to scan the object O forming an image of the object O scanning line by scanning line on the image sensor 16, an imaginary object surface that is formed by scanning a line that is conjugate with the image sensor 16 is a cylindrical surface having a center axis that coincides with the rotation axis of the scanning mirror 2. Thus, if the object O is a flat surface such as a white board or a blackboard, the difference between the cylindrical imaginary object surface and the flat object surface causes focusing error. In the present embodiment, the imaging lens 3 is initially moved to a position where an in-focus image of the reference scanning line is formed on the image sensor 16, however, the object distance increases as the distance of the present scanning line from the reference scanning line increases on the object surface. Thus, it is necessary to adjust the position of the imaging lens 3 when the image sensor 16 captures scanning lines other than the reference scanning line.

The position of the imaging lens 3 for scanning lines other than the reference scanning line is calculated using the value of the lens pulse counter Paf at the in-focus position for the reference scanning line and the scanning position represented by the value of the scanning pulse counter X. The lens position pulse Ps for compensating for the change of the object distance is also represented by a number of driving pulses for the lens driving motor 60. The compensating pulse number Ps is determined at S559 of FIGS. 32 by the approximation formula (12);

$$Ps = \mathrm{INT}\left[1 \Big/ \left\{\left(\frac{0.000415}{Paf} \times X^2 - 0.00004 \times X + \frac{100000}{Paf}\right) \times 10^{-5}\right\}\right] \quad (12)$$

For example, if the value of the lens pulse counter Paf at the reference scanning line is 460, that is, the imaging lens 3 focuses an object at a distance of 23 cm, the lens position pulse Ps varies as shown in TABLE 2 in accordance with a change of the value of the scanning pulse counter X. The values $\Delta b$, Pit and Pt are used in magnification compensation and are described in detail below.

TABLE 2

| X | Ps | $\Delta b$ | Pit | Pt |
|---|---|---|---|---|
| 6948 | 383 | 174 | 6 | 0 |
| 6310 | 395 | 147 | 7 | 15 |
| 5672 | 406 | 122 | 8 | 68 |
| 5034 | 416 | 99 | 10 | 54 |
| 4396 | 426 | 77 | 13 | 43 |
| 3759 | 434 | 59 | 17 | 41 |
| 3121 | 442 | 40 | 26 | 4 |
| 2483 | 448 | 27 | 38 | 18 |
| 1845 | 453 | 15 | 69 | 9 |
| 1208 | 457 | 6 | 174 | 0 |
| 570 | 459 | 2 | 522 | 0 |
| −68 | 460 | 0 | — | — |
| −706 | 458 | 4 | 261 | 0 |
| −1344 | 456 | 9 | 116 | 0 |
| −1981 | 452 | 18 | 58 | 0 |
| −2619 | 447 | 29 | 36 | 0 |
| −3257 | 440 | 45 | 23 | 9 |
| −3895 | 432 | 63 | 16 | 36 |
| −4532 | 423 | 83 | 12 | 48 |

If the scanning lens 3 is moved to the position represented by the lens position pulse Ps in accordance with the value of the scanning pulse counter X, the imaging lens is able to form an in-focus image on the image sensor 16 at any scanning line, as long as the object can be approximated as a flat surface perpendicular to the optical axis at the mirror home position of the scanning mirror 2.

Figure 33A:
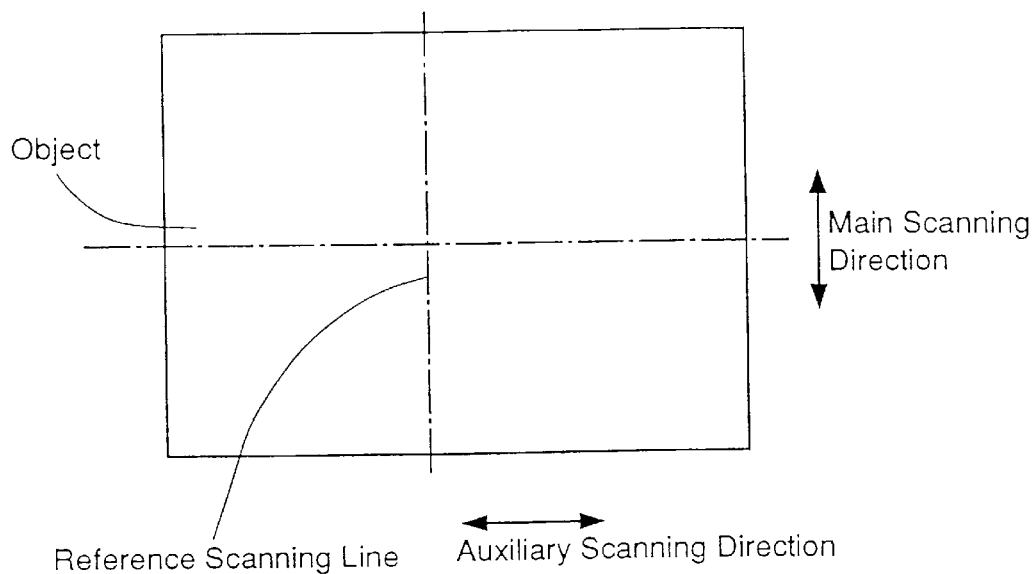
FIGS. 33A and 33B illustrate a reason that magnification compensation is required.
Figure 33B:
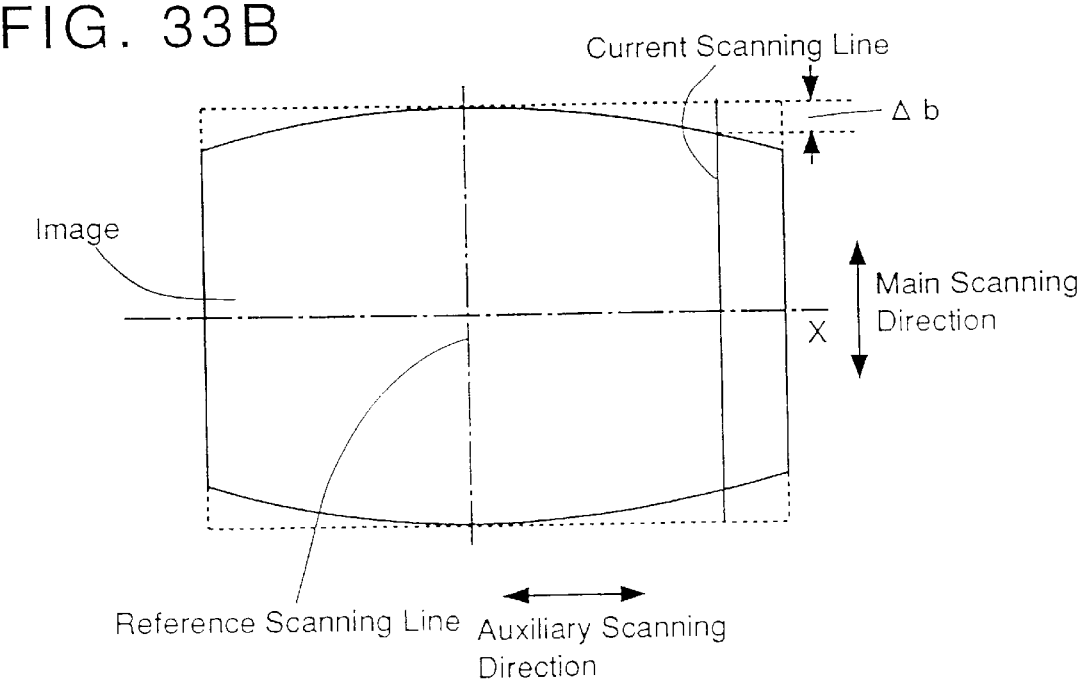

In changing the in-focus position, the magnification is also changed and the change of the magnification is compensated for by inserting a predetermined number of compensation pixels into the image signal. The magnification varies due to the change of the object distance and the change of the position of the imaging lens. The magnification decreases as the distance of the scanning line from the reference scanning line increases. For example, when a rectangular object having long sides that are aligned in the auxiliary scanning direction (as shown in FIG. 33A) is scanned, the captured image includes barrel distortion and as shown in FIG. 33B. That is, the short sides become shorter.

In order to compensate for the distortion of the image due to the change of the magnification, the CPU 301 determines a pixel differential $\Delta b$ based on a ratio of the magnification on the present scanning line to that on the reference scanning line. The pixel differential $\Delta b$ is a difference between a number of effective pixels of the image sensor 16 and a number of pixels that capture a predetermined length of the object.

Since the change in magnification can be calculated based on the value of the lens pulse counter Paf at the reference scanning line and the value of the lens position pulse Ps, the pixel differential $\Delta b$ (and related variables: an insertion start pixel Yc, a pitch Pit, and a remainder pitch Pt) may also be calculated from the values of Paf and Ps using the following equations:

$$\Delta b = \frac{Km}{2}\left(1 - \frac{Ps}{Paf}\right) \quad (13)$$

$$Yc = \frac{K - Km}{2} + \Delta b \quad (14)$$

$$Pit = \frac{Km}{2\Delta b} \quad (15)$$

$$Pt = \frac{Km}{2} - Pit \times \Delta b \quad (16)$$

where Km is the number of effective pixels of the image sensor 16, and K is the maximum number of pixels of the image sensor 16. These calculations are performed at S565 and S567 of FIG. 32. The magnification compensation for pixels for the upper half of the image sensor 16 can also be applied to pixels for the lower half, and thus, the following description is directed to the pixels for the upper half only.

Figure 34:
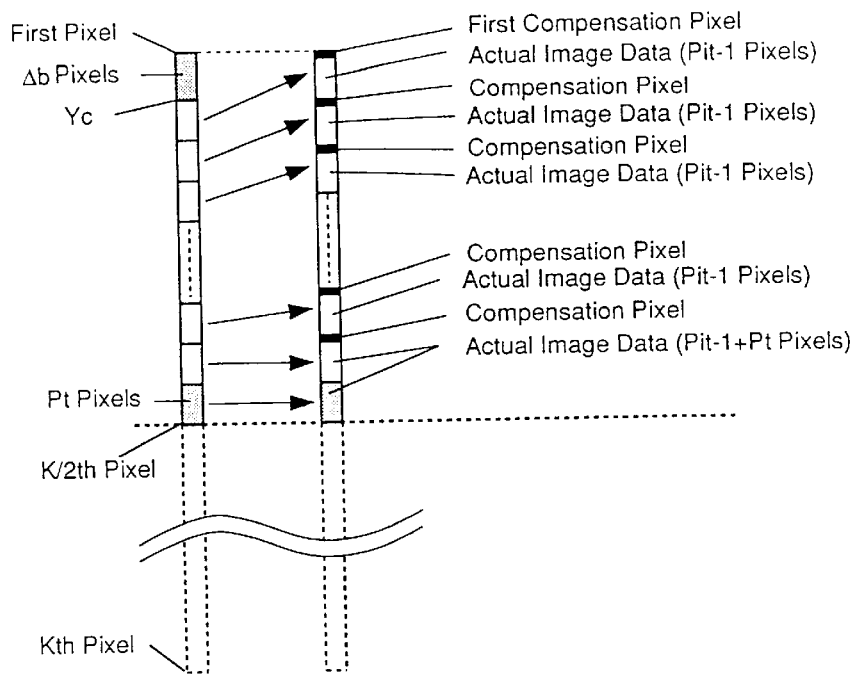
FIG. 34 illustrates a method of magnification compensation.

In the magnification compensation at S577, the top $\Delta b$ pixels of the actual image data are discarded and an equivalent number of compensating pixels are inserted into the image data one by one at a predetermined pitch Pit. FIG. 34 is a schematic, showing a relationship between actual image data and corrected image data. In FIG. 34, a left bar shows pixels of the actual image data from the image sensor 16 and a right bar shows corrected image data after magnification compensation. In principle, the first pixel of the corrected image data is filled by a first compensation pixel, then Pit-1 pixels of the actual image data counted from the insertion start pixel Yc fill the corrected image data from the second pixel, then a second compensation pixel is inserted and another Pit-1 pixels of the actual image data are inserted.

For the upper half of the corrected image data, Km/2 pixels of the image data, 1044 pixels in this example, are produced by repeating insertion of a compensation pixel at every Pit pixels toward the center of the actual image data. The values of the pitch Pit and the insertion start pixel Yc are determined by the above equations (14) and (15). In this embodiment, since K=Km=2088, Yc is equal to $\Delta b$. Note that the number of effective pixels Km varies depending on the capturing area that is set in the mode setting process.

The remainder pitch Pt is a difference between the product of the pitch Pit and the pixel differential $\Delta b$ and half the number of effective pixels Km/2. The remainder pitch is also equal to the remainder of Km/2Pit. If the remainder Pt is not equal to zero, at the center side, Pit-1+Pt pixels of the actual image data fill the corrected image data without a compensation pixel.

Generally, the value of the compensation pixel is set to have the same value as the previous pixel of the actual image data. However, as an exception, if there is a group of adjacent pixels that output identical level signals and the group represents over 30% of the number of pixels in one pitch Pit, the compensation pixel is inserted as the next pixel of the group. The value of the compensation pixel is set to be identical to that of the pixel in the group.

For example, if the pitch Pit is equal to 100 and 35 adjacent pixels form a group within the pitch Pit, the next pixel of the group, that is, the 36th pixel, is filled by a compensation pixel having a value that is identical to the 35th pixel in the group. In this case, the compensation pixel is not inserted at the 100th pixel. Note that an "identical level" means 0 or 1 in the 1-bit data mode, but means within a full step in the 8-bit data mode. That is, in the 8-bit data mode, if the values of the pixels fall within a step having a width of 16 values, it is considered that these pixels have the identical value.

Figure 35:
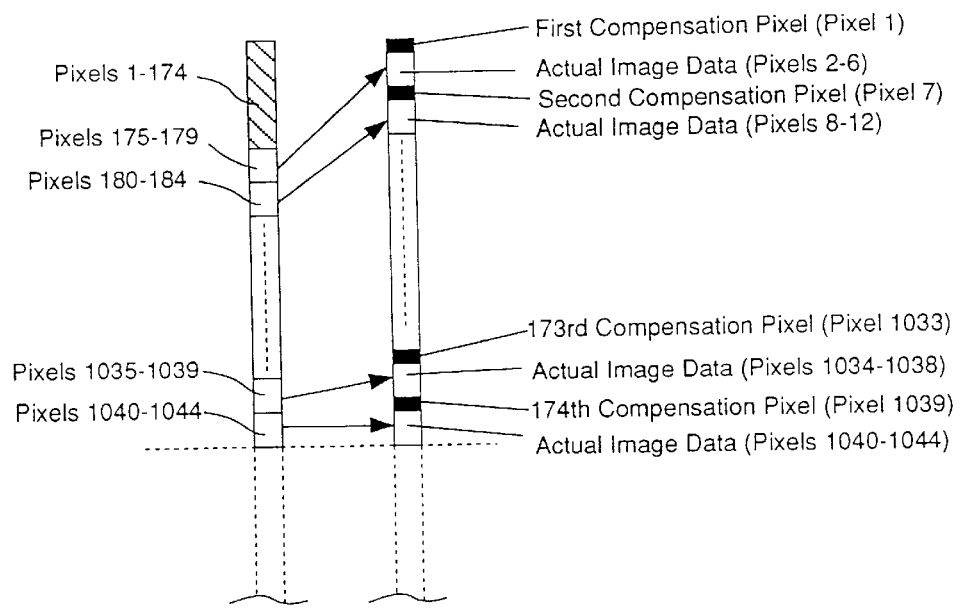
FIGS. 35 and 36 illustrate an actual example of magnification compensation.
Figure 36:
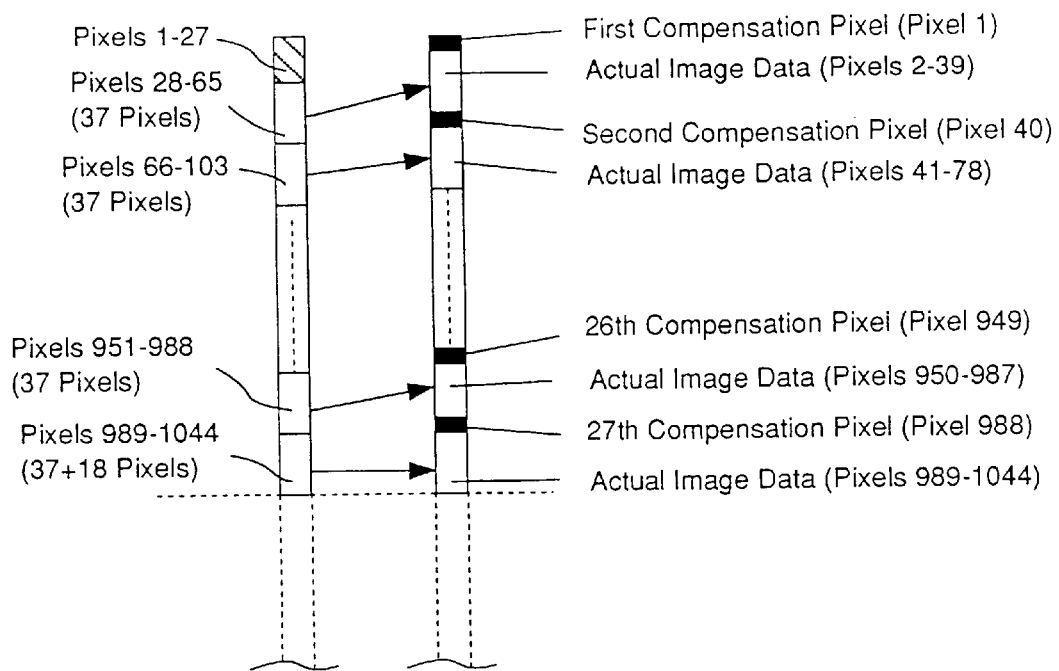

FIGS. 35 and 36 show an example of the magnification compensation when the value of the lens pulse counter Paf at the reference scanning line is 460. FIG. 35 shows the compensation for the scanning line at X=6948, that is, the start position of the scanning range. For this scanning line, Δb=Yc=174, Pit=6 and Pt=0. The first pixel of the corrected image data is filled by the first compensation pixel. The first to 174th pixels of the actual image data are not used. The second to sixth pixels of the corrected image data are filled by the 175th to 179th pixels of the actual image data. The seventh pixel of the corrected image data is filled by the second compensation pixel and the eighth to 12th pixels of the corrected image data are filled by the 180th to 184th pixels of the actual image data. In a similar way, a compensation pixel is inserted at every 5-pixel interval of the actual image data. The 1033rd pixel of the corrected image data is filled by the 173rd compensation pixel, and the 1034th to 1038th pixels of the corrected image data are filled by the 1035th to 1039th pixels of the actual image data. Finally, the 1039th pixel of the corrected image data is filled by the 174th compensation pixel, and the 1040th to 1044th pixels of the corrected image data are filled by the 1040th to 1044th pixels of the actual image data.

FIG. 36 shows the compensation for the scanning line at X=2483. In the example of FIG. 36, Δb=27, Pit=38 and Pt=18. In this case, the effective actual image data starts from the 28th pixel and, therefore, 1017 pixels of actual image data are expanded to 1044 pixels by inserting 27 compensation pixels. The first pixel of the corrected image data is filled by the first compensation pixel, and the second to 39th pixels are filled by the 28th to 65th pixels of the actual image data. In a similar way, 1 pixel of the compensation data and 37 pixels of the actual image data alternatively fill the corrected image data. At the center of the corrected image data, 55 (=Pit−1+Pt) pixels of the actual image data fill the corrected image data without adding any compensation data.

Since the magnification is compensated for by the above mentioned process, barrel distortion of the image is prevented as long as the object is a flat surface perpendicular to the optical axis at the home position of the scanning mirror 2.

As described above, in the embodiment, shading correction is performed, in combination, by first, the CCD signal processing circuit 320 and, then, by the CPU 301 at S571 in the capture process of FIGS. 31 and 32. One reason that shading is further corrected in the capture process is that, since the scanner according to the present embodiment uses a rotating-mirror scanning system, for the object O having a substantially flat surface, the magnification of the image formed on the image sensor 16 and the angle of view may vary depending on the position of the scanning mirror 2. As such, shading correction should also be carried out in accordance with the magnification and the position of the scanning mirror. This is difficult to perform using only the CCD signal processing circuit 320.

Alternatively, the shading correction may be performed only by the CPU 301, without correction by the CCD signal processing circuit 320. In such a case, the gain of the amplifier 324 in the CCD signal processing circuit 320 is fixed (i.e., does not change according to the pixel position) and the shading correction is entirely performed at S571 of the capture process.

This alternative shading correction is now described in more detail.

In particular, the shading correction in the embodiment corrects for the shading effect in accordance with the cosine fourth law. In this process, based on an incident angle θ of light from the imaging lens to each pixel, a correction coefficient Kc may be determined. Then, by multiplying a pixel image signal Ey of the corresponding pixel with the coefficient Kc, a shading corrected image signal Esy is obtained.

It should be noted that, although not required, for the purposes of the embodiment, the scanner 1 does not include a light source for illuminating the object O when the image thereof is captured, and accordingly any unevenness due to the light source is not taken into account, i.e., the illumination is regarded as even.

Further, the shading correction is performed on the assumption that the object is a flat surface which is perpendicular to an optical axis between the scanning mirror 2 and the object O when the scanning mirror 2 is located at the home position. In this case, a distance between the object and the scanner varies depending on the rotation angle of the scanning mirror 2. Therefore, the coefficient Kc for shading correction also changes in accordance with the rotation position of the scanning mirror 2. Thus, for a given pixel on the image sensor 16, shading amounts, in accordance with the amount of light when the mirror is located at the home position (standard magnification; mb) and when the mirror is located at a position other than the home position, are different.

In the embodiment, the correction coefficient is obtained based on the following formula (17):

$$Kc=(-10.5\ ms+4.6)*10^{-7}\ Yn^2+(2.17\ ms-0.67)*10^{-4}\ Yn+1 \qquad (17)$$

where ms is a current magnification and Yn is a bit number with respect to the central pixel of the image sensor 16.

As described above, in the embodiment, the shading correction is performed by the CPU 301 at S571 in the capture process to obtain the shading corrected image signal Esy=(Kc*Ey).

Figure 37:
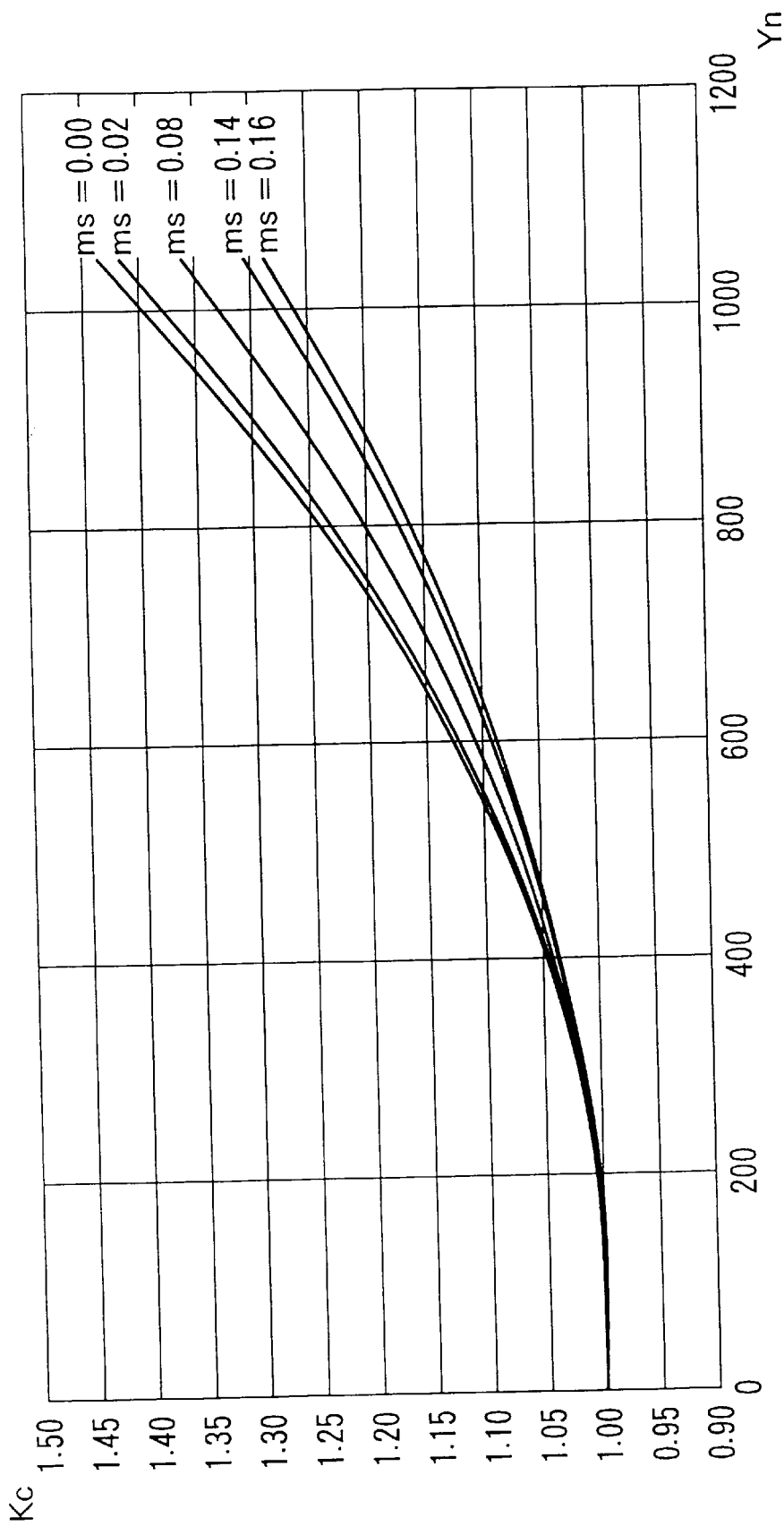
FIG. 37 is a graph showing a relationship between a correction coefficient and pixel number for various magnification values.

FIG. 37 is a graph showing a relationship between the correction coefficient Kc and the pixel number Yn for various magnification values ms.

As described above, in the capture process of FIGS. 31 and 32, as well as being corrected for shading at S571, for a color image (Yes at S573), each pixel is also color corrected at S575. The color correction at S575 is now described in more detail.

Generally, in evaporation coating filters, as the incident angle of light increases, the transmission wavelength becomes shorter. Accordingly, if evaporation coating filters are used for extracting color components in the embodiment (i.e., as the filters 4b, 4c or 4d), the incident angle varies in accordance with the image height in the main scanning direction (i.e., in accordance with the pixel number Yn), and due to this change of the incident angle, the transmission wavelength changes.

Figure 38:
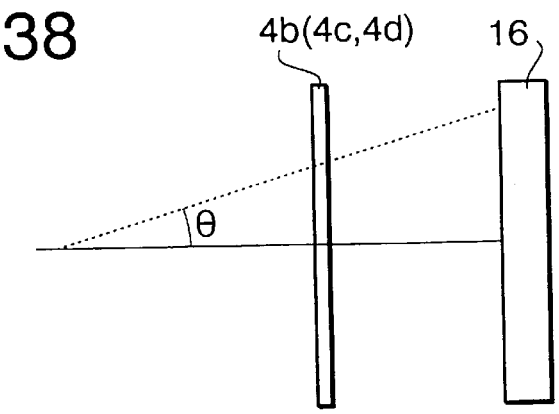
FIG. 38 is a schematic view of light rays contacting a color filter.
Figure 39A:
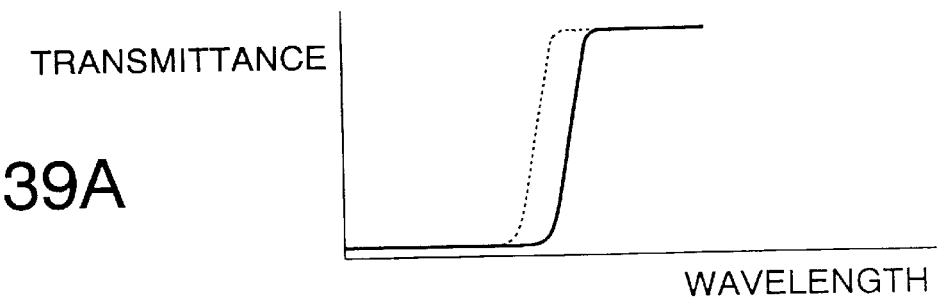
FIGS. 39A, 39B, and 39C are graphs showing a wavelength transmittance of a red filter, a green filter, and a blue filter, respectively.
Figure 39B:
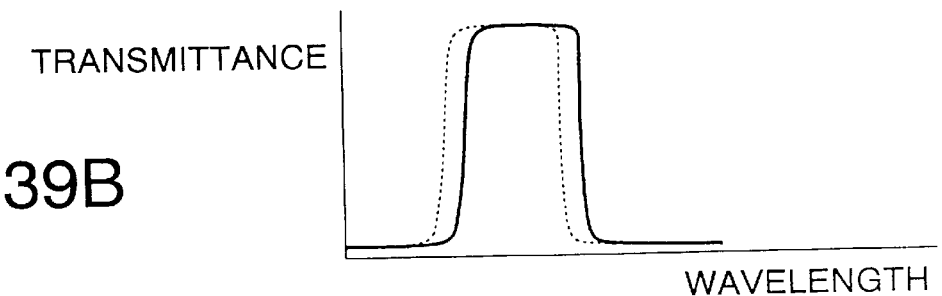
Figure 39C:
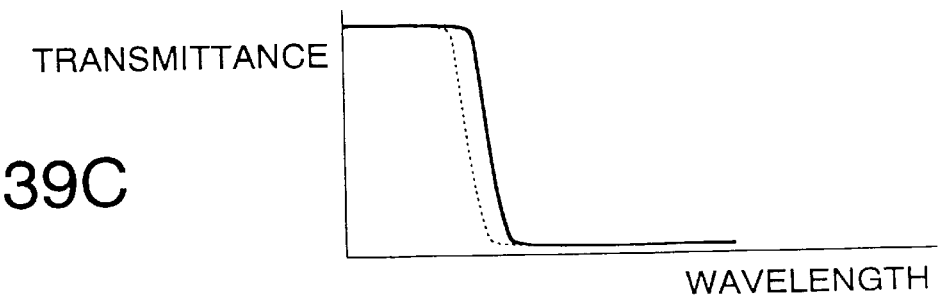

FIG. 38 shows light rays for which incident angles are 0 (normal to the filters 4b, 4c or 4d) and θ. FIGS. 39A–39C show wavelength transmittance when the incident angle is 0 (solid lines) and θ (broken lines) for the red filter 4b, green filter 4c, and blue filter 4d.

Figure 40:
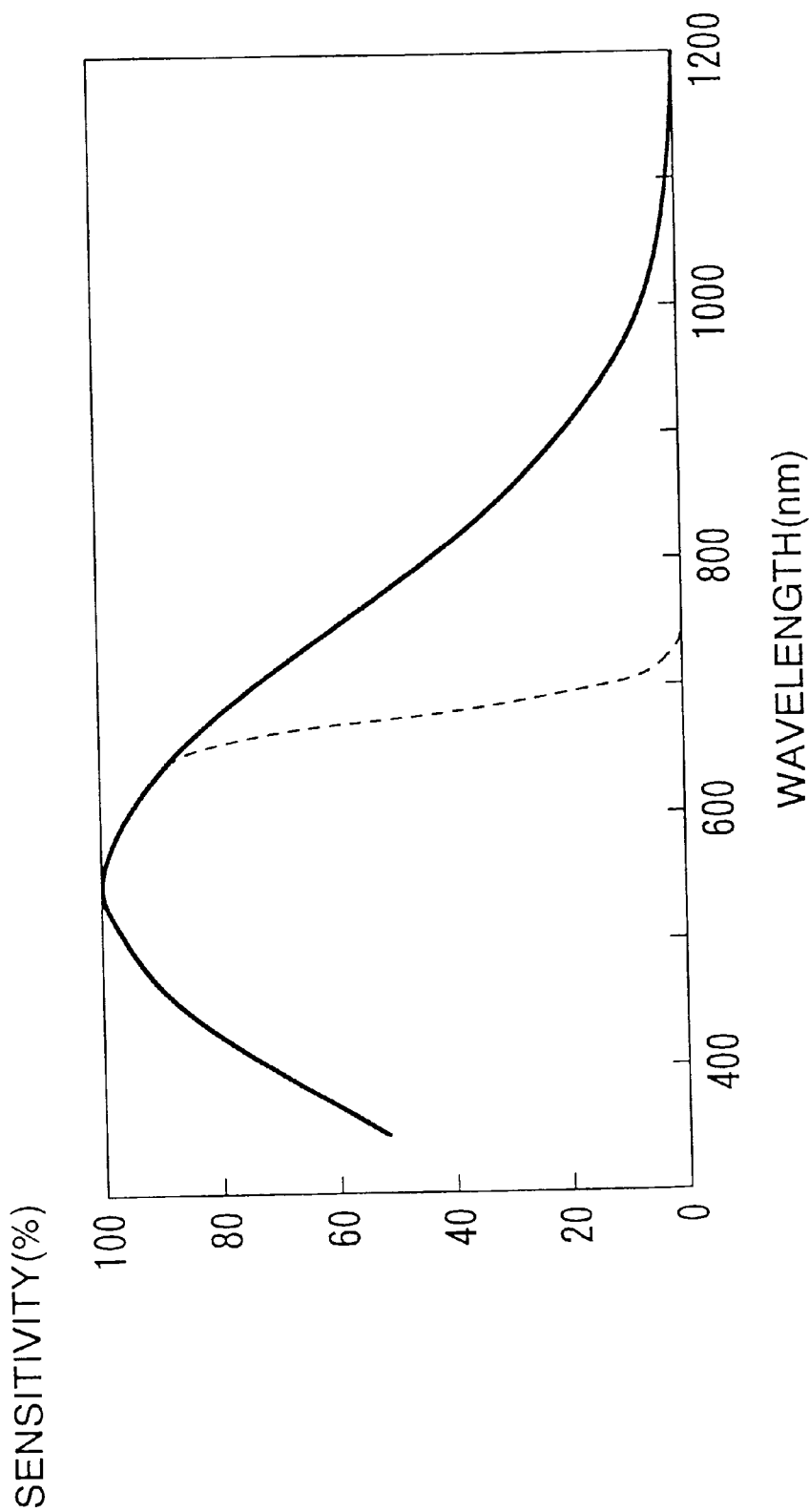
FIG. 40 is a graph showing the effect of an optical system on the wavelength range of light transmitted to the image sensor.

Further, a spectral range of light reaching the image sensor 16 is also affected by the optical system (i.e., the imaging lens 3 and the scanning mirror 2). As shown in FIG. 40, even though the sensitivity of the image sensor 16 may cover a broader range (solid line), the effect of the optical system reduces the spectral range, as shown by the broken line.

Figure 41A:
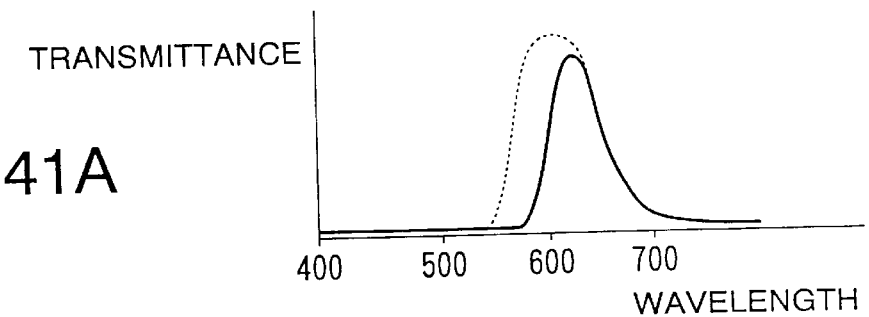
FIGS. 41A, 41B, and 41C are graphs showing a resulting transmittance for a red filter, a green filter, and a blue filter, respectively.
Figure 41B:
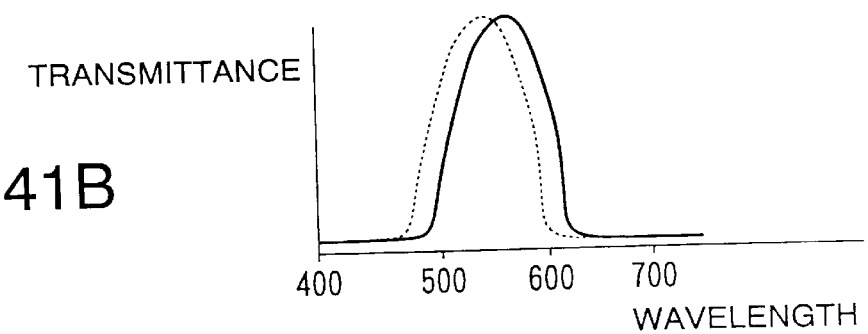
Figure 41C:
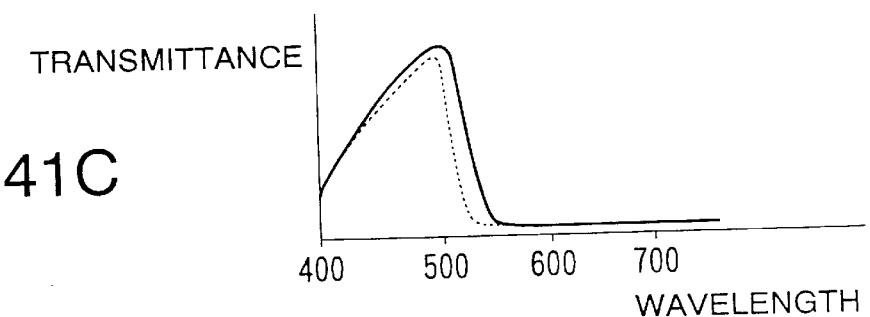

The resulting transmittance, after the effect of the optical system on spectral range, for the filters 4b, 4c, and 4d is shown in FIGS. 41A–41C, respectively. A solid line represents the overall transmittance to the image sensor 16 at an incidence angle of 0 degrees and a broken line represents the overall transmittance at an incidence angle of θ degrees (see FIG. 38).

As shown in FIG. 41A, when the red component image is scanned, the transmittance range changes such that, even if the brightness of the object O is actually the same, the output of the image sensor 16 may indicate that the peripheral pixels receive a brighter image than the central pixels.

As shown in FIG. 41C, when the blue component image is scanned, due to the change of the transmittance range, the output of the image sensor 16 indicates that the pixels at the peripheral portion of the image sensor 16 are less bright than the central pixels.

As shown in FIG. 41B, for the green component image, even though the transmittance range changes, the amount of light transmitted to the image sensor 16 remains substantially the same, and, as a result, no substantial change occurs.

Based on the above, color correction is performed in accordance with the following formulas:

when the red filter 4b is used, $$Ersy = Esy * \cos \theta \quad (18);$$

when the green filter 4c is used, $$Egsy = Esy \quad (19);$$

and when the blue filter 4d is used, $$Ebsy = Esy / \{\cos \theta + (1 - \cos \theta)/2\} \quad (20),$$

where, as above, Esy represents the output of the image sensor after shading correction, and θ is the incident angle. Thus, Ersy, Egsy and Ebsy are corrected image signals corresponding to the corrected color components, respectively Based on the corrected image signals Ersy, Egsy and Ebsy, a color image signal may be generated.

It should be noted that, since the incident angle θ changes depending on the position of the pixel on the image sensor 16 and depending on the position of the imaging lens 3, the incident angle θ can be determined from the magnification ms (which directly corresponds to the lens position) and a pixel number Yn on the image sensor 16 which represents image height.

As an alternative, it is possible to divide the image sensor 16 into, for example, groups of three pixels, and then determine the incident angle θ for each group and correct accordingly. In this case, the color correction may be performed more quickly Although the structure and operation of an image scanning device is described herein with respect to the preferred embodiments, many modifications and changes can be made without departing from the spirit and scope of the invention.

The present disclosure relates to subject matter contained in Japanese Patent Application No. HEI 08-181405, filed on Jun. 20, 1996, which is expressly incorporated herein by reference in its entirety.

What is claimed is:

1. An image scanning device, comprising:
    an imaging lens;
    an image sensor comprising image receiving elements extending in a line along a longitudinal direction of the image sensor, each image receiving element outputting a pixel image signal;
    a scanning mirror located between an object and said image sensor;
    a scanning system for rotating said scanning mirror about a scanning axis parallel to the longitudinal direction of the image receiving elements to scan successive line images onto said image sensor via said imaging lens to form a two-dimensional image of said object; and
    a shading correction system for correcting each pixel image signal for shading in accordance with an image height of a corresponding image receiving element on said image sensor and a magnification of said imaging lens.

2. The image scanning device according to claim 1, further comprising a quantization system for determining a maximum brightness pixel image signal and for quantizing said pixel image signals based on said maximum brightness pixel image signal.

3. The image scanning device according to claim 2, further comprising:
    at least one color filter; and
    a color correction system for correcting said pixel image signals for changes of wavelength transmittance of said color filter in accordance with image height.

4. The image scanning device according to claim 3, wherein said color correction system further corrects said pixel image signals for changes of wavelength transmittance of said color filter in accordance with said magnification of said imaging lens.

5. The image scanning device according to claim 4, wherein said imaging lens has a predetermined focal length and said magnification of said imaging lens is determined in accordance with said focal length, a distance of said object, and a rotational position of said scanning mirror.

6. The image scanning device according to claim 2, further comprising:
    at least one color filter located between said imaging lens and said image sensor, light rays from said imaging lens contacting said at least one color filter at a plurality of incidence angles; and
    a color correction system for correcting said pixel image signals for changes of wavelength transmittance of said color filter in accordance with said plurality of incidence angles.

7. The image scanning device according to claim 3, said at least one color filter comprising at least one of a red, blue and green color filter, wherein, when said red filter is used, said color correction system reduces said pixel image signals as image height increases, when said blue filter is used, said color correction system increases said pixel image signals as image height increases, and, when said green filter is used, said color correction system makes no changes to said pixel image signals.

8. The image scanning device according to claim 3, wherein said color correction system first divides said pixel image signals into a plurality of groups in accordance with image height and identical correction is performed for said pixel image signals within each group.

9. An image scanning device, comprising:

an imaging lens;

an image sensor comprising image receiving elements extending in a line along a longitudinal direction of the image sensor, each image receiving element outputting a pixel image signal;

a scanning mirror located between an object and said image sensor;

a scanning system for rotating said scanning mirror about a scanning axis parallel to the longitudinal direction of the image receiving elements to scan successive line images onto said image sensor via said imaging lens to form a two-dimensional image of said object;

at least one color filter; and a color correction system for correcting said pixel image signals for changes of wavelength transmittance of said color filter in accordance with an image height of a corresponding image receiving element on said image sensor.

10. The image scanning device according to claim 9, wherein said color correction system further corrects said pixel image signals for changes of wavelength transmittance of said color filter in accordance with said magnification of said imaging lens.

11. The image scanning device according to claim 10, wherein said imaging lens has a predetermined focal length and said magnification of said imaging lens is determined in accordance with said focal length, a distance of said object and a rotational position of said scanning mirror.

12. The image scanning device according to claim 9, said at least one color filter comprising at least one of a red, blue and green color filter, wherein, when said red filter is used, said color correction system reduces said pixel image signals as image height increases, when said blue filter is used, said color correction system increases said pixel image signals as image height increases, and, when said green filter is used, said color correction system makes no changes to said pixel image signals.

13. The image scanning device according to claim 9, wherein said color correction system first divides said pixel image signals into a plurality of groups in accordance with image height and identical correction is performed for said pixel image signals within each group.

14. An image scanning device, comprising:

an imaging lens;

an image sensor comprising image receiving elements extending in a line along a longitudinal direction of the image sensor, each image receiving element outputting a pixel image signal;

a scanning mirror located between an object and said image sensor;

a scanning system for rotating said scanning mirror about a scanning axis parallel to the longitudinal direction of the image receiving elements to scan successive line images onto said image sensor via said imaging lens to form a two-dimensional image of said object; and a shading correction system for correcting each pixel image signal for shading in accordance with an image height of a corresponding image receiving element on said image sensor and a magnification of said imaging lens;

wherein said imaging lens has a predetermined focal length and said magnification of said imaging lens is determined in accordance with said focal length, a distance of said object, and a rotational position of said scanning mirror.

* * * * *